(12) United States Patent
Advincula et al.

(10) Patent No.: US 8,936,833 B2
(45) Date of Patent: Jan. 20, 2015

(54) ANTI-REFLECTION COATINGS AND METHODS OF PREPARING AND USING SAME

(75) Inventors: Rigoberto Advincula, Friendswood, TX (US); Rebecca Tsai, Houston, TX (US); Kazuya Katoh, Arlington, MA (US); Roderick Pernites, Houston, TX (US)

(73) Assignee: The University of Houston System, Houston, TX (US)

( * ) Notice: Subject to any disclaimer, the term of this patent is extended or adjusted under 35 U.S.C. 154(b) by 799 days.

(21) Appl. No.: 12/380,763

(22) Filed: Mar. 2, 2009

(65) Prior Publication Data

US 2009/0233077 A1 Sep. 17, 2009

Related U.S. Application Data

(60) Provisional application No. 61/032,573, filed on Feb. 29, 2008.

(51) Int. Cl.
| | |
|---|---|
| *B32B 3/26* | (2006.01) |
| *B05D 1/00* | (2006.01) |
| *B05D 3/00* | (2006.01) |
| *B05D 3/12* | (2006.01) |
| *C08J 9/35* | (2006.01) |
| *G02B 1/04* | (2006.01) |
| *C09D 5/00* | (2006.01) |
| *C09D 7/12* | (2006.01) |
| *G02B 1/11* | (2006.01) |
| *C08K 3/36* | (2006.01) |

(52) U.S. Cl.
CPC *G02B 1/04* (2013.01); *C09D 5/006* (2013.01); *C09D 7/1216* (2013.01); *C09D 7/1266* (2013.01); *C09D 7/1275* (2013.01); *G02B 1/111* (2013.01); *C08K 3/36* (2013.01)
USPC .......... 427/256; 427/209; 427/240; 427/350; 427/373; 427/385.5

(58) Field of Classification Search
None
See application file for complete search history.

(56) References Cited

U.S. PATENT DOCUMENTS

| | | | |
|---|---|---|---|
| 6,210,858 B1 * | 4/2001 | Yasuda et al. | 430/270.1 |
| 2004/0121017 A1 | 6/2004 | Ishii et al. | |
| 2004/0188661 A1 | 9/2004 | Tsutsui et al. | |
| 2005/0031791 A1 | 2/2005 | Sasaki et al. | |
| 2005/0106333 A1 * | 5/2005 | Lehmann et al. | 428/1.6 |
| 2005/0244571 A1 * | 11/2005 | Walheim et al. | 427/162 |
| 2006/0269724 A1 * | 11/2006 | Ohashi et al. | 428/143 |
| 2007/0042174 A1 | 2/2007 | Rao et al. | |

FOREIGN PATENT DOCUMENTS

| | | |
|---|---|---|
| EP | 1235108 A1 | 8/2002 |
| EP | 1887059 A1 | 2/2008 |
| JP | 2005 243319 A | 9/2005 |

OTHER PUBLICATIONS

Ossipov D A; Brannvall K; Forsberg-Nilsson K; Hilborn J: "Formation of the first injectable poly (vinyl alcohol) hydrogel by mixing of functional PVA precursors" Journal of Applied Polymer Science 20071005 John Wiley and Sons Inc, US, vol. 106, No.' 1, Oct. 5, 2007, pp. 60-70, XP002546762.
PCT ISR (two copies).
PCT Written Opinion.
PCT IPER.

* cited by examiner

*Primary Examiner* — William Phillip Fletcher, III
(74) *Attorney, Agent, or Firm* — Robert W Strozier

(57) ABSTRACT

Three dimensional anti-reflection porous films or coated substrates and method for forming the films or coated substrates are disclosed, where the films or coatings have optical transmittances of at least 86% or a reflectance of at most 4%. The 3D anti-reflection porous film or coating compositions (a) one polymer or a plurality of network polymers, (b) one particles and/or a plurality particles, (c) optionally one crosslinking agent or a plurality of crosslinking agents, (d) optionally one oligomer or a plurality of oligomers, (e) optionally one polymerized monomer or a plurality of polymerized monomers, and (f) optionally void spaces, where the composition has a transmittance value of at least 86% or a reflectance value of at most 4%.

32 Claims, 50 Drawing Sheets

SCHEME 1B

Spin Coated Film 2

Benzophenone on PAA

SCHEME 2

US 8,936,833 B2

ANTI-REFLECTION COATINGS AND METHODS OF PREPARING AND USING SAME

CROSS-REFERENCES TO RELATED APPLICATIONS

The present invention claims the benefit and priority to U.S. Provisional Patent Application Ser. No. 61/032,573, filed Feb. 29, 2008.

GOVERNMENTAL SPONSORSHIP

Not Applicable.

REFERENCE TO A SEQUENTIAL LISTING

Not Applicable.

BACKGROUND OF THE INVENTION

1. Field of the Invention

Embodiments of the present invention relates generally to films, compositions, articles and methods for making same, where the film compositions comprise anti-reflection three dimensional (3D) porous films and/or coatings. In certain embodiments, the film compositions comprise nanostructured films and/or coating. The film or coating substrates can include plastics, polymers, glasses, ceramics, metal oxide solids such as silica, and other transparent, semi-transparent, non-transparent non-metals, metal oxide sheets and/or glasses.

More particularly, embodiments of the present invention relate to compositions and methods for preparing three dimensional (3D) anti reflection (ATR) porous films, coatings and/or layered compositions, which can be deposited on substrates or substrate surfaces, where the compositions have optical transmittance values of at least (greater than or equal to ($\geq$)) 86% or reflection values of at most (less than or equal to ($\leq$)) 4% and where the film compositions comprise 3D polymeric networks including polymers (e.g., polyelectroytes), oligomers and/or monomers in the absence or presence of polymerization initiators, crosslinking agents, and particles in desired ratios to achieve desired composition properties and characteristics. The compositions can then be cured via crosslinking and/or template particle can be dissolved or removed from the compositions to form more open 3D polymeric network films or coatings. This invention is particularly well suited for use in the fabrication of multilayered displays, packaging, optical parts, and other applications that involves viewing articles at various viewing angles and optimized light transmission. Other applications include forming composite compositions that combine anti-reflection film composition with electrostatic coatings, self-cleaning surfaces, catalytic surfaces, and sensing layers.

2. Description of the Related Art

Antireflection coatings are widely used to reduce the surface reflection of optical devices, display screens, photovoltaic devices, etc. Poisson and Fresnel defined the phenomenon as destructive interference between the light reflected from a substrate and the light reflected from a thin film coating that substrate. The air-film interface reflection for normal incident light can be described by the simplified Fresnel's equation:

$$R=(n_2-n_1)^2/(n_2+n_1)^2$$

where $n_1$, equal to 1, is the refractive index of air, and $n_2$ is the refractive index of the film. For normal incident light, an ideal homogeneous single-layer antireflection coating should satisfy two conditions: 1) the thickness of the coating should be $\lambda/4$ where $\lambda$ is the wavelength of the incident light, 2) $n_c=(n_a \times n_s)^{0.5}$, where $n_c$, $n_a$ and $n_s$ are the refractive indices of the coating, air, and substrate, respectively Natural and synthetic materials having such low refractive indices are either rare, expensive to obtain or to synthesize, or difficult to manipulate in thin film form.

However, porous or microscopically layered dielectric materials can easily achieve an effective refractive index approaching 1.23. For a porous film, the effective refractive index is given by an average over the film if the pore size is smaller than the wavelengths of interest Low refractive index metal oxides, such as $SiO_2$, which could be negatively charged can be suitable materials for generating a porous film of lowered reflectance on a surface. In terms of characterization, absolute reflection can be obtained using an integrating sphere set-up, whereas simple absorbance/transmittance measurements can be made to characterize anti-reflection properties. In general, as the transmittance increases towards 100%, an increase in anti-reflection properties is observed.

There is an increasing interest in the layer-by-layer template assisted assembly. The fact that a large variety of different materials can be layered in controllable thickness and in desired order makes this approach almost universal especially with the growth of applications since it was first introduced by Decher and coworker in the early 1990s. The materials typically used in layer-by-layer assembly are small organic molecules or inorganic compounds, macromolecules, biomacromolecules or even colloids. The adsorption of alternating polyelectrolytes or nanoparticles is based on electrostatic or other non-covalent inter-molecular forces.

The layer-by-layer technique is thus a good candidate for a simple, and relatively fast, environmentally benign, and potentially economical process for generating anti reflection coatings. For multilayers containing multiple interfaces, multiple reflections take place. In such cases, a matrix theory can be applied. In this theory, the layers are modeled using a stratified medium theory and the light is assumed to be either s- or p-polarized. The overall effect of layers on reflectance of the surface takes the function of each layer into account To fabricate an antireflection coating, the layer-by-layer method can be utilized but is much slower than spin coating. It consumes a bulk volume of the chemicals even though the layer-by-layer method provides accurate control of the deposition density and thickness of the film.

Spin coating is yet another widely used process for applying a thin, uniform film to flat substrates. Final dry film thickness can be predicted using a model in terms of the primary process variables, spin speed, and initial polymer concentration After applying a simple approximation using a similarity boundary-layer analysis, the final film thickness can be approximated to be directly proportional to the number of unity, initial polymer concentration, one fourth of the multiplication of the kinematic viscosity and solute diffusivity, and to be reversibly proportional to the square root of spin speed.

A large number of applications of spin coating in anti reflection films have been reported, and the porous structure of film is a key factor to form an anti reflection film. Steiner and coworkers first reported the nanophase-separated polymer films as high-performance antireflection coatings using spin coating technique. More recently, spin-coated block copolymer film with sponge-like nanoporous structures have been reported followed by the first highly porous spin-coated polymer latex film. The porosity of film is affected by spin speed and by the concentration and particle size of polymethylmethacrylate latex. Different approaches of incorporate silica nanoparticles in the spin coatings have been reported Silica-incorporated layer-by-layer films show that a single layer of silica nanoparticle-incorporated film does not result in a large transmittance increase. Only after a specific number of silica nanoparticle layers, the porosity and film thickness of the layer-by-layer film are enough to generate significant improvement in transmittance.

Patent JP 06172428 shows that in the presence of aqueous NaOH, polyacrylic acid (PAA) is crosslinked by $AlC_3$ solution. A metal ion bridge formed as the polymer is settled. PAA and polyvinylalcohol (PVOH) have been intensely studied for their intermolecular crosslinking both chemically by esterification with specific treatments and physically by forming H-bondings. At room temperature H-bonding between PAA and PVOH predominates.

Thus, there is a need in the art for a novel and facile method for making three dimensional anti-reflection (ATR) porous films onto substrates from porous 3D network films, nanocomposite structures, 3D structured gels, 3D structured hydrogels, or 3D structured aerogels comprising polymers, oligomers, monomers, polymerization initiators, cross-linking agents, particles, optionally template particles or materials and a solvent system.

SUMMARY OF THE INVENTION

Embodiments of the present invention provide methods for preparing three dimensional (3D) anti reflection porous network films, and/or 3D nanocomposite structured films, where the films have optical transmittance values of at least (greater than or equal to ($\geq$)) 86% or optical reflectance values of at most (less than or equal to ($\leq$)) 4%, within desired wavelength ranges. In many embodiments, the films are deposited or formed on substrates or substrate surfaces to form a coated substrate or a subtract having a coated surface. The films comprise 3D polymeric networks including a polymer or a plurality of polymers, optionally a crosslinking agent or a plurality of crosslinking agents (e.g., metal ion or a plurality of metal ions for ionically crosslinked films), and a particle or a plurality of particles of various sizes or compositions, where the network is held together by a combination of physical and/or chemical interactions including covalent bonds, hydrogen bonds, electrostatic interactions, dipole-dipole interactions, ionic bonds, or mixtures or combinations thereof. The methods for making the networks can also include forming void spaces in the original compositions or creating the spaces in-situ. The method can also include adding template particles and then dissolving or destroying the added template particles. The methods can also include the step of crosslinking the network chemically, radiochemically, photochemically, and/or thermally before, during or after solvent removal and/or before, during or after template particle removal.

Embodiments of the present invention also provide films having optical transmittance values of at least 86% or reflectance values of at most 4%, where films comprise a 3D polymeric networks including a polymer or a plurality of polymers and optionally a crosslinking agent or a plurality of crosslinking agents (e.g., a metal ion or a plurality of metal ions for ionically crosslinked films), where the networks are held together by a combination of physical and/or chemical interactions including covalent bonds, hydrogen bonds, electrostatic interactions, dipole-dipole interactions, ionic bonds, or mixtures or combinations thereof. The networks can also include particles and/or void spaces and a post-film deposition curing step.

Embodiments of the present invention provide articles including a substrate having formed or deposited thereon a composition of this invention. The articles of this invention are particularly well suited for mutilayered displays, packaging, optical parts, and other applications involving a variety of viewing angles and optimized light transmission. Other applications include combinations of anti-reflection properties with electrostatic coatings, self-cleaning surfaces, catalytic surfaces, and sensing films.

Embodiments of this invention provide methods for forming coatings or films on a substrate or on a surface of a substrate, where the coatings or films comprise a three dimensional (3D) polymeric matrix or network. The method includes contacting or mixing one polymer or a plurality of network polymers in a suitable solvent to form a non-crosslinked network or matrix, which is held together by polymer affinity and/or by non-covalent interaction including H-bonding interactions, attractive dipole-dipole interactions and/or attractive electrostatic interactions. The method also includes adding to the non-crosslinked network or matrix one particle or a plurality of particles, where the particles can be the same or different and can be of various sizes and shapes. The method can also include adding one polymerizable oligomer and/or monomer or a plurality of oligomers and/or monomers and optionally one polymerization initiator or a plurality of polymerization initiators. The polymers, particles, oligomers or monomers and initiators are contacted under mixing conditions, which can include mechanical mixing, sonic mixing, vortex mixing or other mixing techniques. In certain embodiments, the particles become entangled in the non-crosslinked network or matrix and can be held in place via H-bonds, ionic interactions, dipole-dipole interactions, and/or electrostatic interactions. The method can also include adding a crosslinking agent or a plurality of crosslinking agents to the particle filled, non-crosslinked network or matrix. The method also includes evaporating or otherwise removing the solvent to form a coating or a film of this invention. The method can also covalently crosslinking the coating or film, where the covalent crosslinking can be radiochemically crosslinking (irradiating with ionizing radiation), photochemically crosslinking (where the network polymers include photoactive moieties or photoactive crosslinking agents are added and crosslinking is affected by irradiating with radiation sufficient to activate the photoactive moieties and/or photoactive crosslinking agents), thermally crosslinking (heating the network to a temperature sufficient to thermally crosslinking thermal crosslinkable moieties in the polymers or added thermal crosslinking agents) and/or initiated crosslinking (activating an initiator to affect crosslinking, polymerizing, and/or co-polymerization). The method can also include the step of adding one template material or particle or a plurality of template materials or particles to the network prior to adding the non-covalent crosslinking agent, where the template particles are removable from the network before, during or after solvent removal. The template materials can be removed via solvent dissolution, vacuum removal and/or decomposition, thermal decomposition, or via other treatments designed to remove template material or mixtures or combinations of these treatments. In certain embodiments, the template materials can be chemically decomposable such as carbonates or bicarbonates that out gas when exposed to aqueous acid treatment. The method can also include adding other components that are designed to augment, change, enhance, or alter the properties of the network to provide the network with such properties as electrostatic properties, catalytic properties, electro-optical properties, magneto-optical properties, electric properties, magnetic properties, optical properties, and/or other physical and/or chemical properties.

Embodiments of this invention provide coatings or films including a three dimensional (3D) polymeric matrix or network. The 3D polymeric matrix or network include (a) one polymer or a plurality of network polymers, (b) one particle and/or a plurality particles, and (c) one ionic crosslinking agent or a plurality of ionic crosslinking agents, which combine to form an ionically crosslinked network or matrix, where the network polymers are held together by polymer affinity and/or by non-covalent interaction including H-bonding interactions, attractive dipole-dipole interactions and/or attractive electrostatic interactions and where the particles become entangled in the non-crosslinked network or matrix and are held in place via H-bonds, ionic interactions, dipole-dipole interactions, and/or electrostatic interactions. Embodiments of the coatings and films of this invention can also include covalent crosslinks formed after film formation, before or after solvent removal. Embodiments of the coating and films of this invention can also include void volumes or spaces formed in the coatings or films by removing removable or template materials/particles added to the matrix or network prior to solvent removal.

Embodiments of this invention provide coatings or films including a three dimensional (3D) polymeric matrix or network. The 3D polymeric matrix or network include (a) one polymer or a plurality of network polymers, (b) one oligomer and/or monomer or a plurality of oligomers and/or monomers in the absence or presence of one polymerization initiator or a plurality of polymerization initiators, (c) one particle and/or a plurality particles, (d) one crosslinking agent or a plurality of crosslinking agents, and (e) optionally one template particle or material or a plurality of template particles or materials. In certain combination, the crosslinking agents are ionic crosslinking agents to form ionically crosslinked networks or matrixes, where the network polymers are held together by polymer affinity and/or by non-covalent interaction including H-bonding interactions, attractive dipole-dipole interactions and/or attractive electrostatic interactions and where the particles become entangled in the non-crosslinked network or matrix and are held in place via H-bonds, ionic interactions, dipole-dipole interactions, and/or electrostatic interactions. In certain embodiments, the coatings and films of this invention are covalent crosslinked. In other embodiments, the coatings and films of this invention are ionically and covalently crosslinked. In other embodiments, the template particles or materials are removed from the coatings or films to increase the void volume of the coating or film or to increase void spaces in the coatings or films.

The compositions can also include one oligomer or a plurality of oligomers and/or one monomer or a plurality of monomers and a polymerization initiator or mixtures or combinations thereof, or the polymeric matrix or network can also be composed only of oligomer(s) and/or polymerizable monomer(s) and polymerization initiators, where the film is formed after polymerization. The oligomers or monomers can be any oligomer or monomer adapted to add a desired property or characteristic to the compositions.

BRIEF DESCRIPTION OF THE DRAWINGS

The invention can be better understood with reference to the following detailed description together with the appended illustrative drawings in which like elements are numbered the same.

Section II

Figure 14:
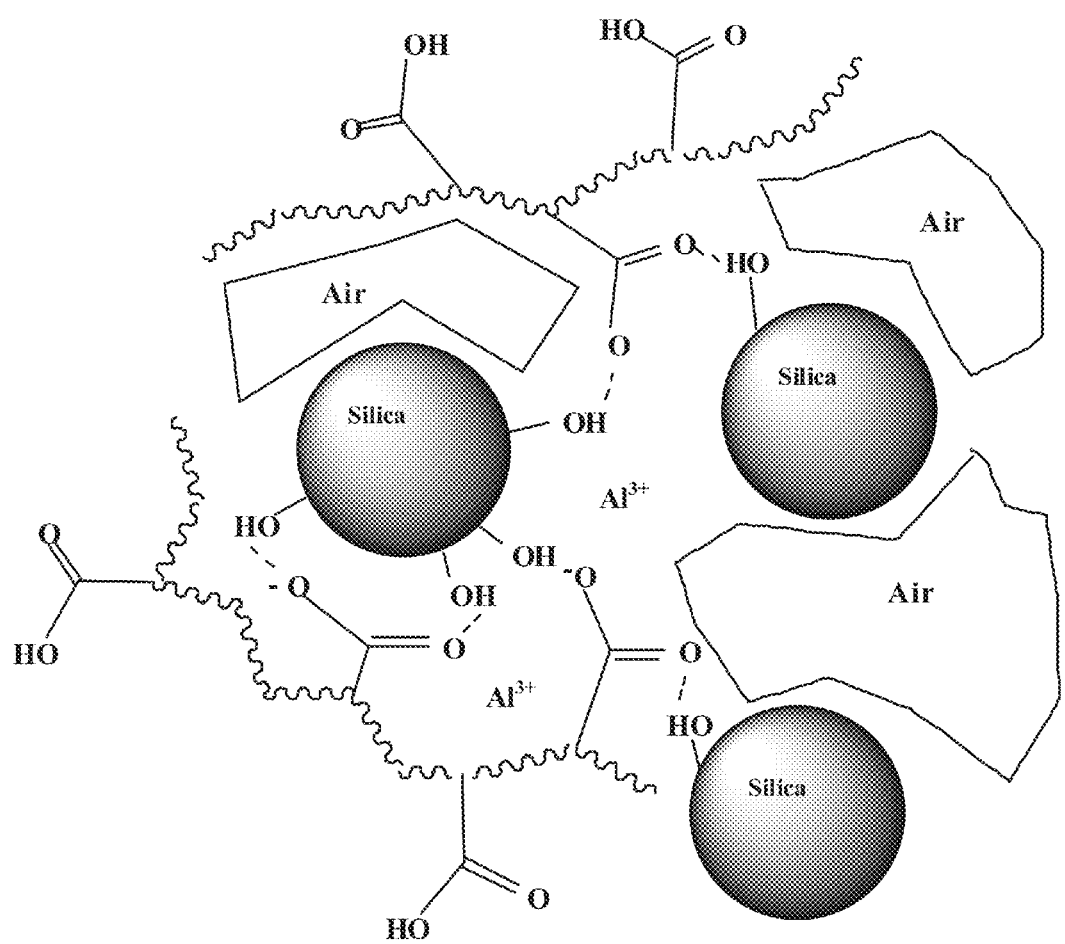

FIG. 14 depicts a pictorial representation of an ATR coated film of this invention form by Scheme 1A including PAA, silica particles, and metal cation (e.g., $Al^{3+}$) designated Spin Coated Film 1.

Figure 15:
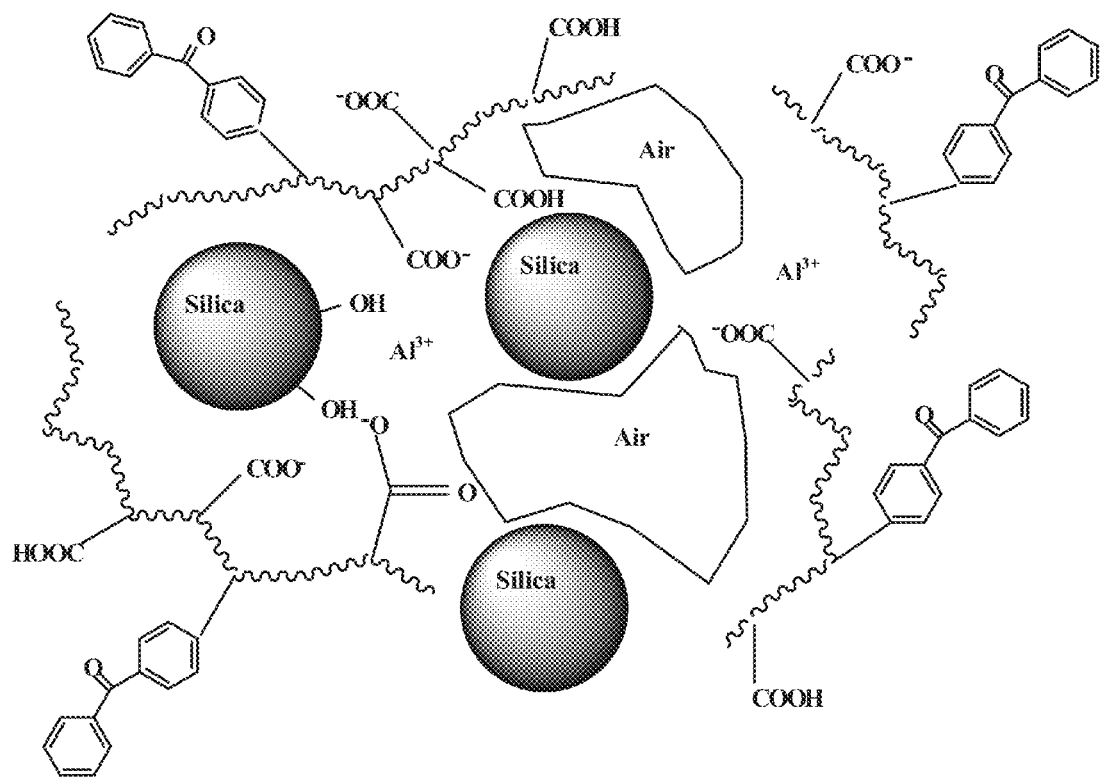

FIG. 15 depicts a pictorial representation of another ATR coated film of this invention Scheme 1B including BP modified PAA (PB-PAA), silica particles, and metal cation (e.g., $Al^{3+}$) designated Spin Coated Film 2.

Figure 16:
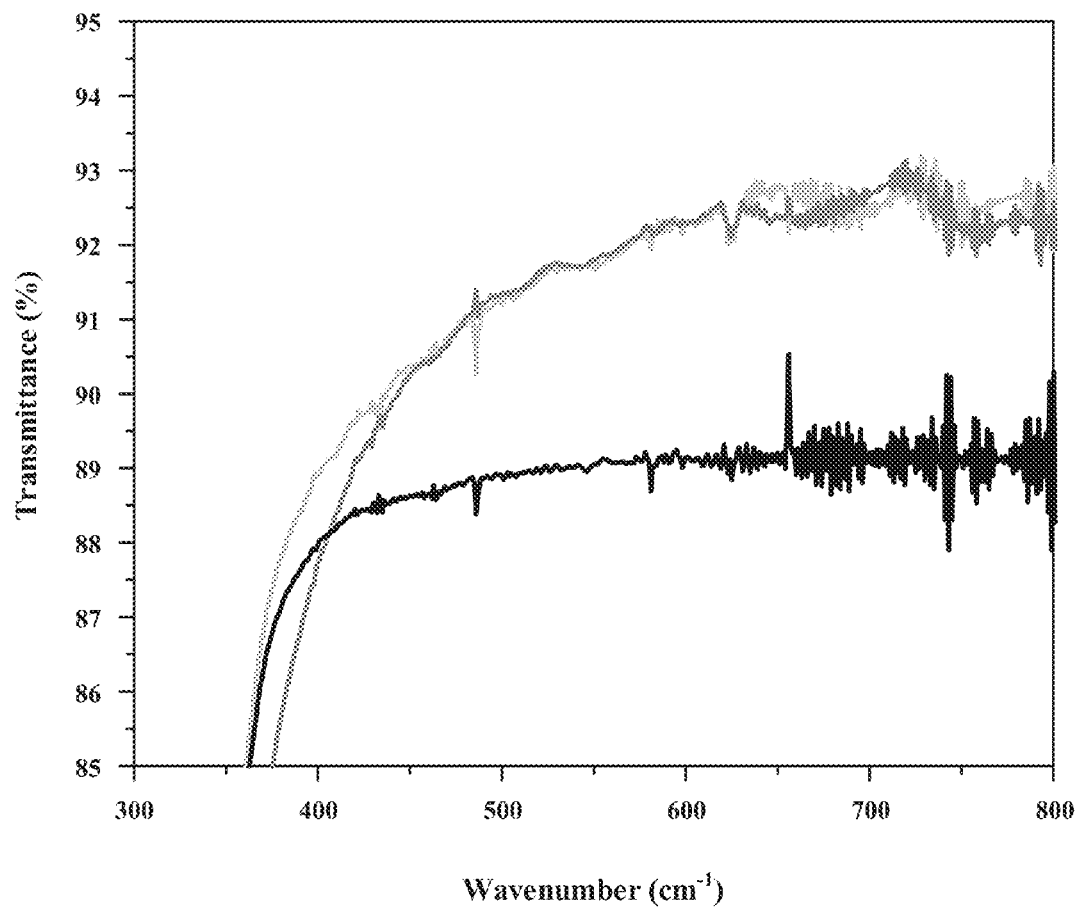

FIG. 16 depicts transmittance chromatograms of two ATR 1-layer spin coated (60 sec) films on an PET substrate: (light gray) PAA:$SiO_2$:Al ratio 4:1:1, 8000 rpm; (dark gray) BP-PAA:$SiO_2$:Al ratio 4:1:1, 2000 rpm, 3 hr-UV irradiation; and (black) bare PET (control film).

Figure 17:
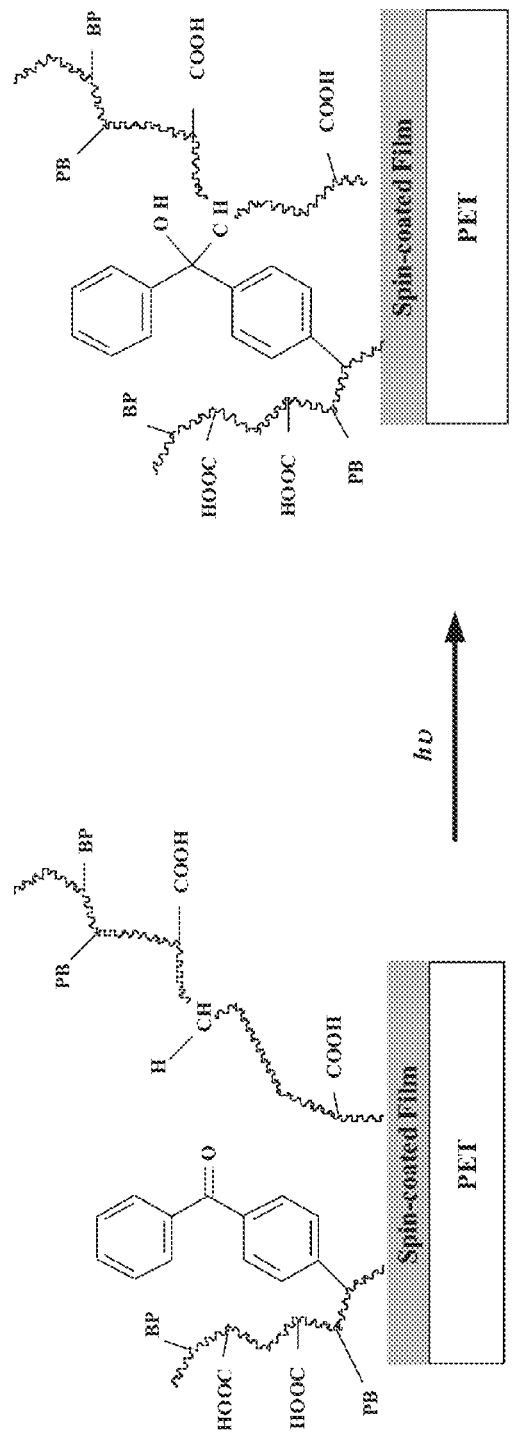

FIG. 17 depicts a pictorial representation Scheme 2 illustrating the photo cross-linking of a BP-PAA:$SiO_2$:Al film by UV irradiation of the spin coated film.

Figures 18A, 18B:
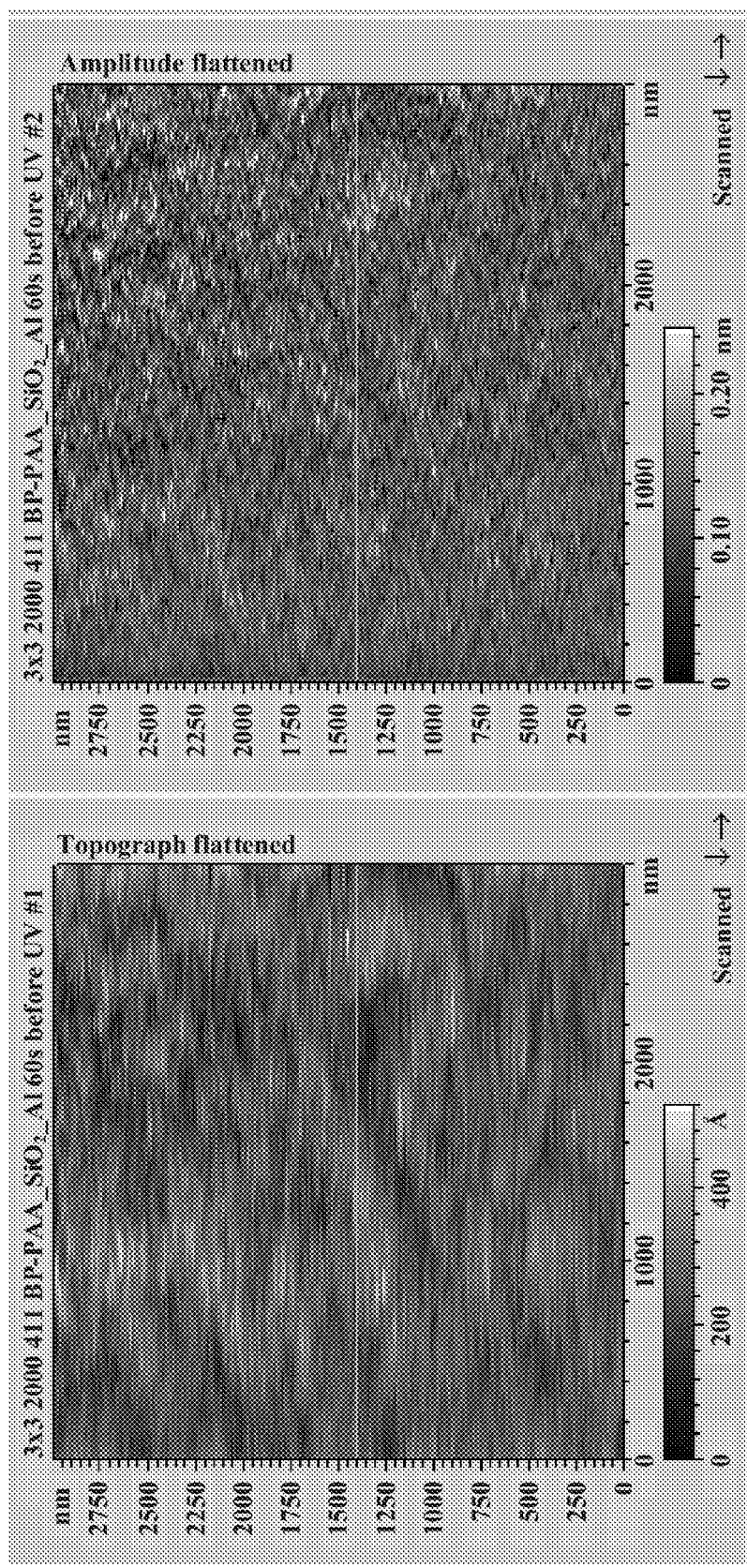

FIGS. 18A&B depict topography and amplitude AFM images of the film (BP-PAA:$SiO_2$:Al ratio 4:1:1, 2000 rpm) before UV irradiation, respectively.

Figures 19A, 19B:
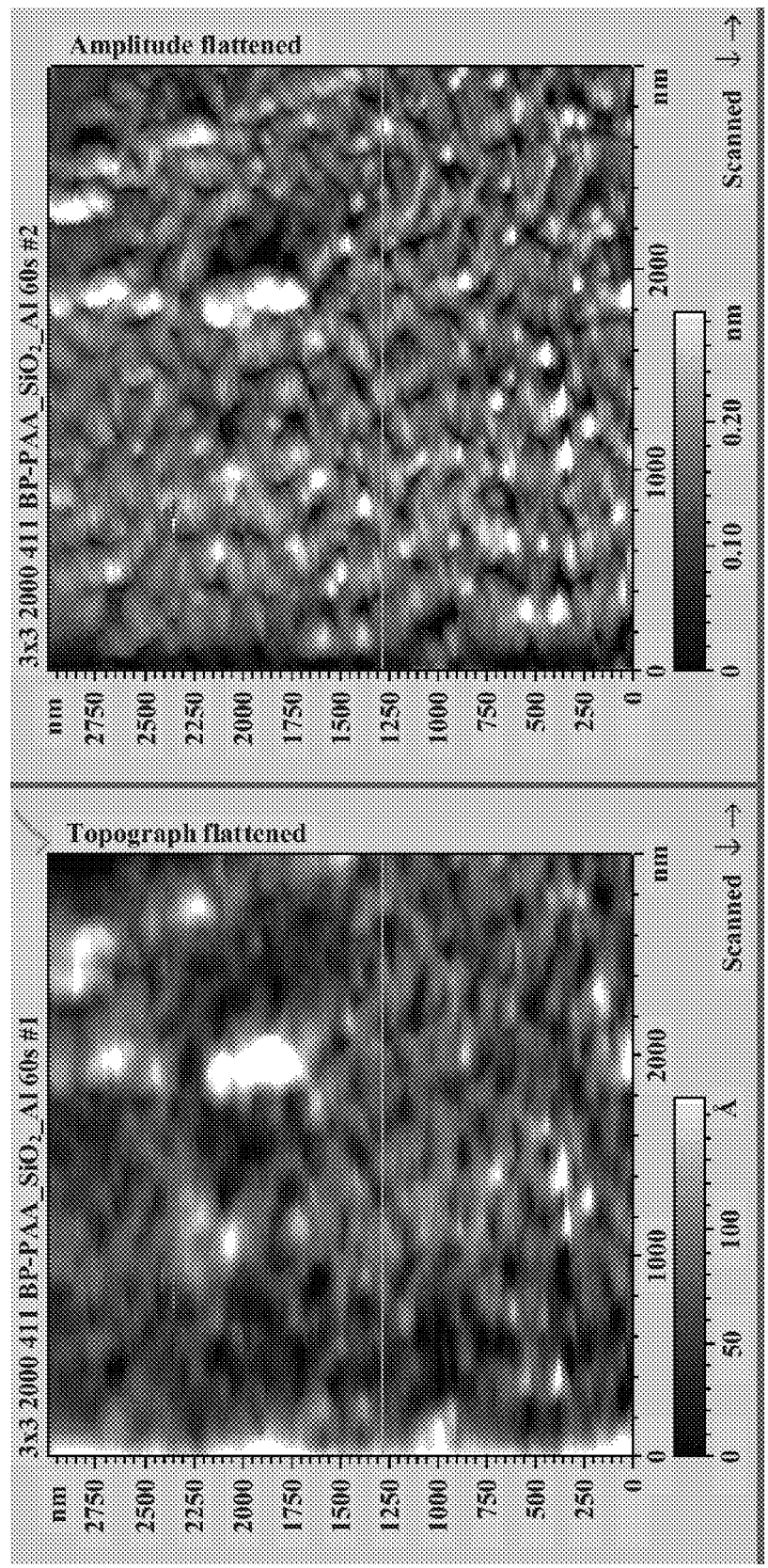

FIGS. 19A&B depict topography and amplitude AFM Images of the film (BP-PAA:$SiO_2$:Al ratio 4:1:1, 2000 rpm) after UV irradiation, respectively.

Figure 20:
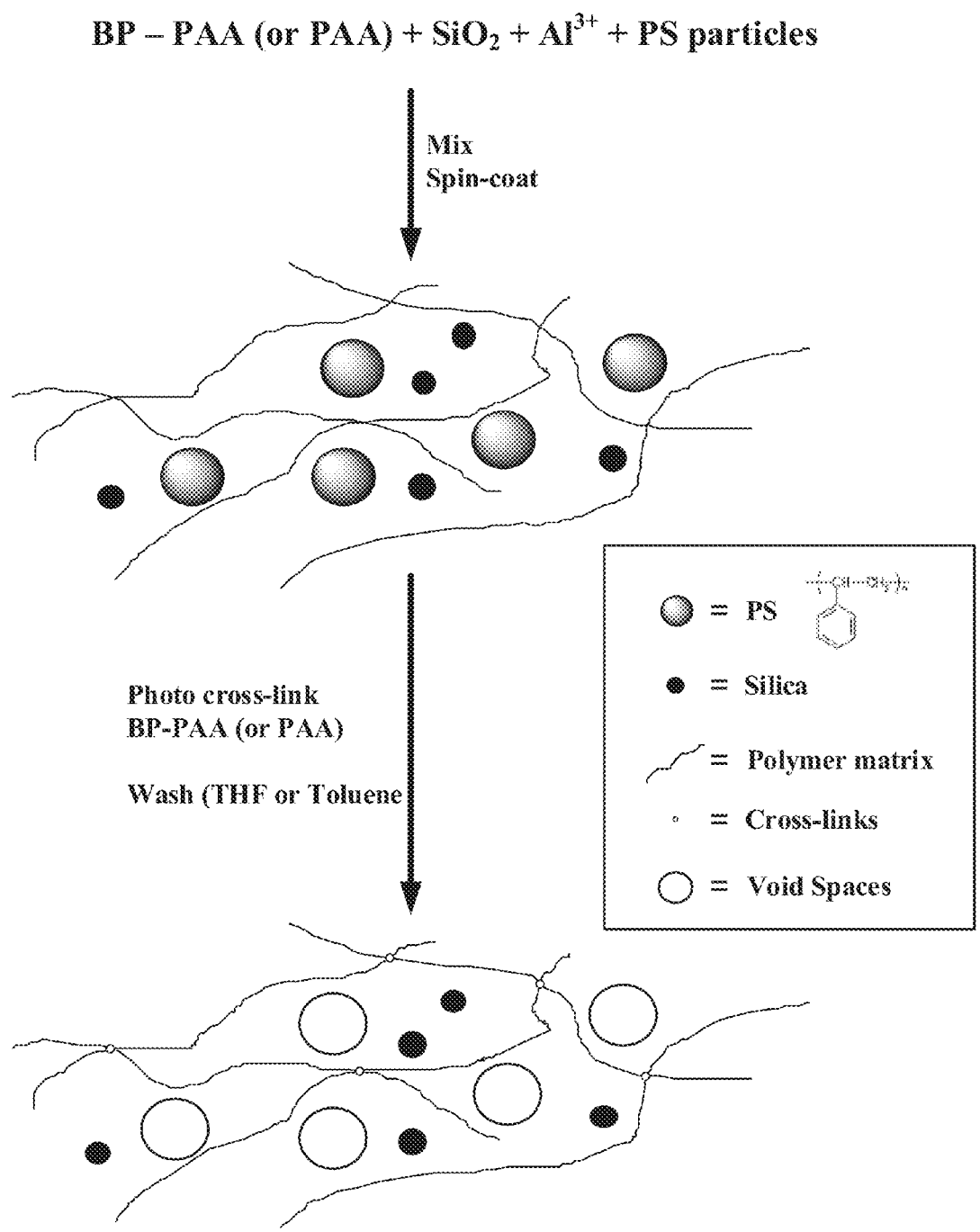

FIG. 20 depicts a pictorial representation illustrating the formation and photo cross-linking of a BP-PAA:$SiO_2$:Al film with polystyrene (PS) particles by UV irradiation of the spin coated film.

Figure 21:
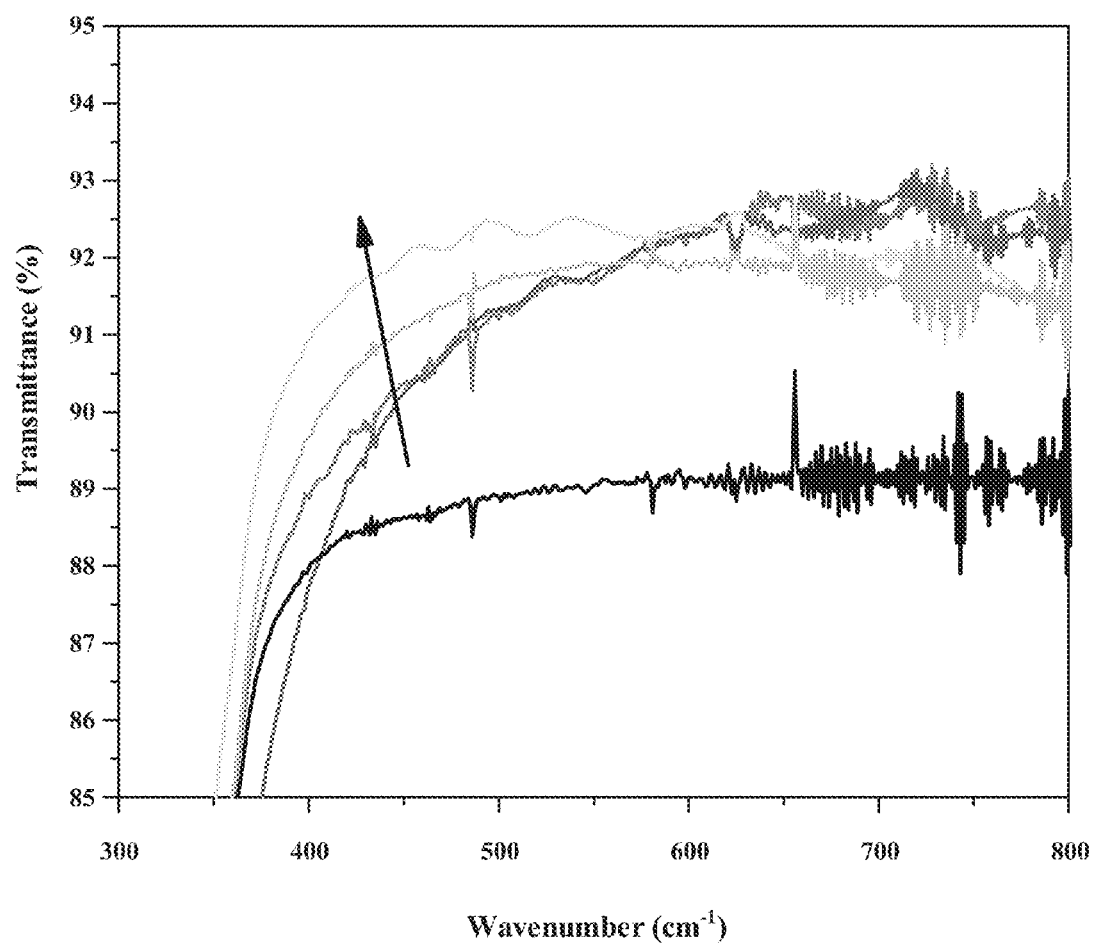

FIG. 21 depicts transmittance chromatographic measurements comparing the ATR 1-layer spin coated (60 sec) film with PS versus without PS particles (100 nm): (very light gray) PAA:SiO$_2$:Al:PS ratio 4:1:1:3, 8000 rpm; (light gray) BP-PAA:SiO$_2$:Al:PS ratio 4:1:1:1, 2000 rpm; (medium dark gray) PAA:SiO$_2$:Al ratio 4:1:1, 8000 rpm; (dark gray) BP-PAA:SiO$_2$:Al ratio 4:1:1, 2000 rpm, 3 hr-UV irradiation; (black) bare PET (control film).

Figure 22A:
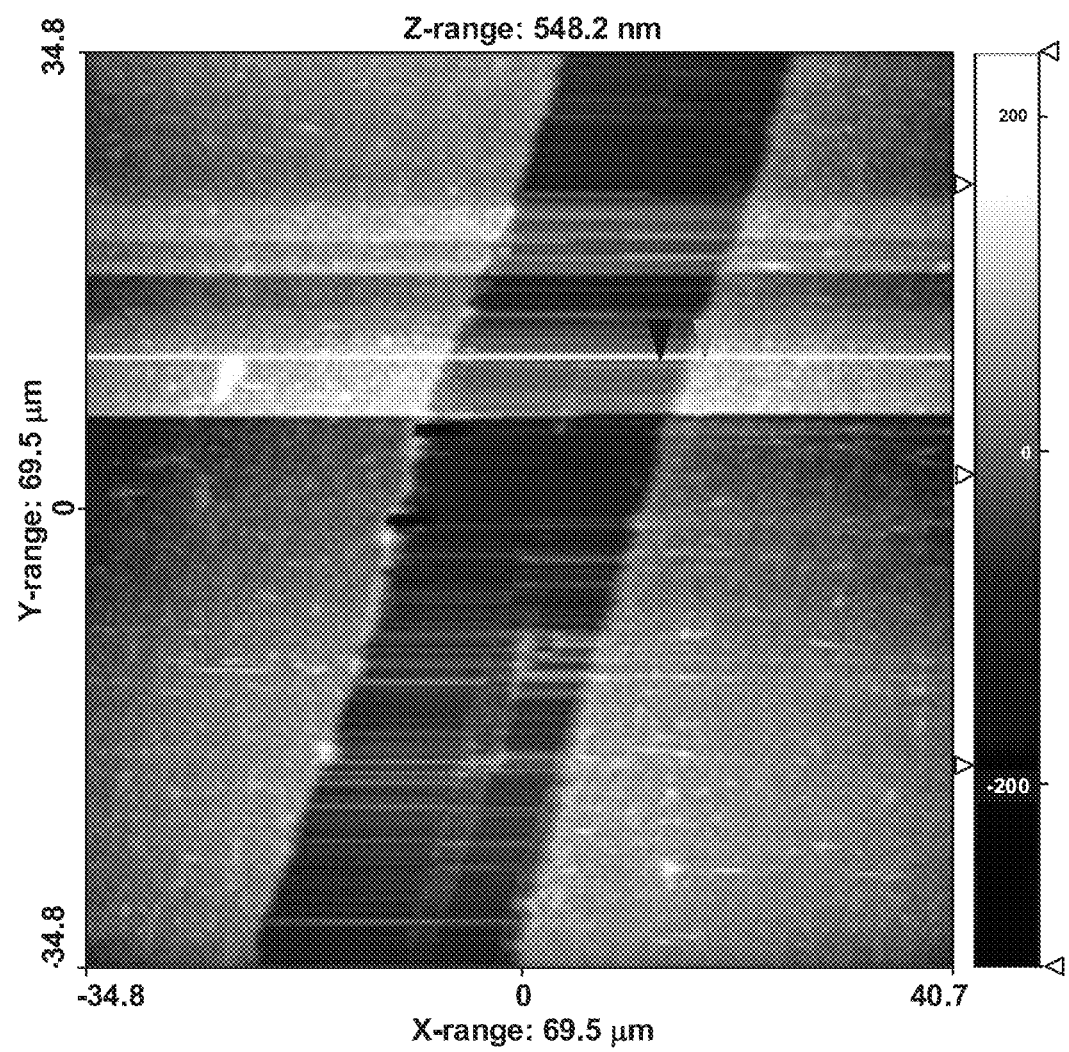
Figure 22B:
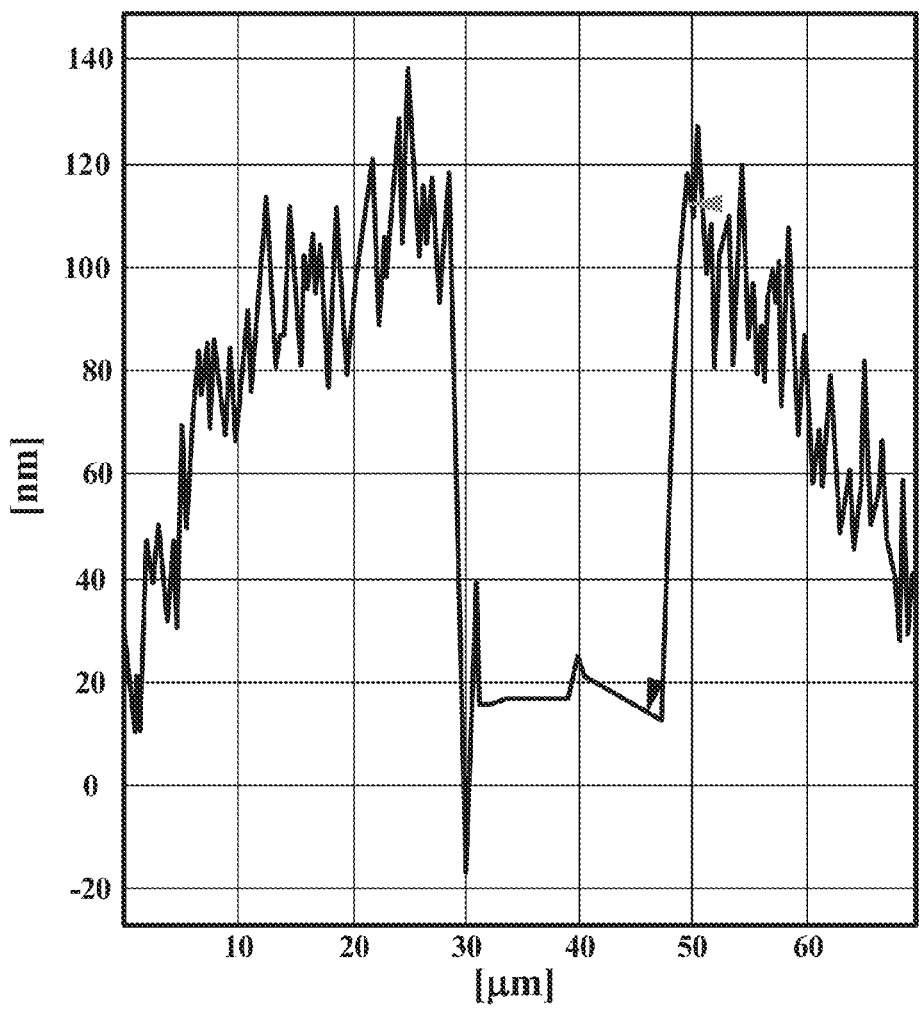

FIG. 22 depicts an AFM Line Profile of PAA:SiO$_2$:Al ratio 4:1:1, 8000 rpm, 60 sec, 1 Layer.

Figure 23A:
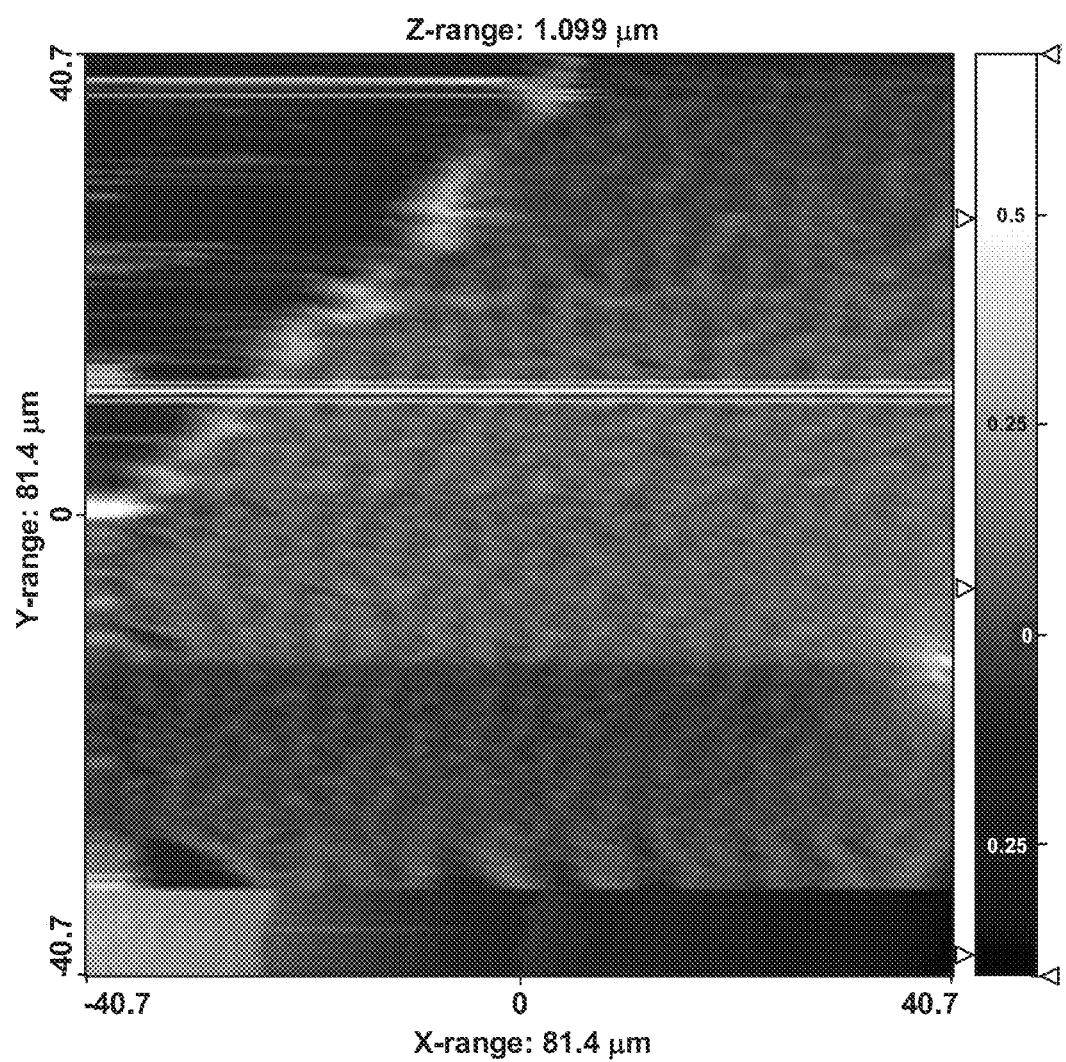
Figure 23B:
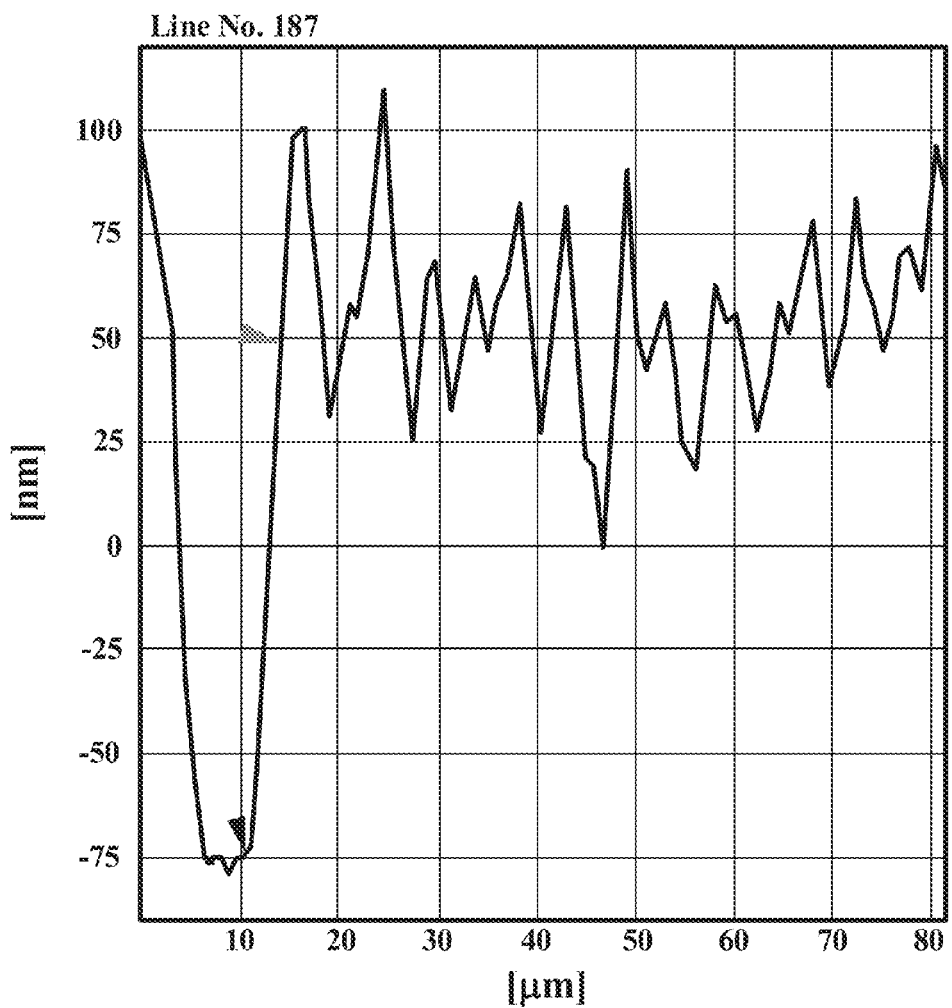

FIG. 23 depicts an AFM Line Profile of BP-PAA:SiO$_2$:Al ratio 4:1:1, 2000 rpm, 60 sec, 1 Layer.

Figure 24:
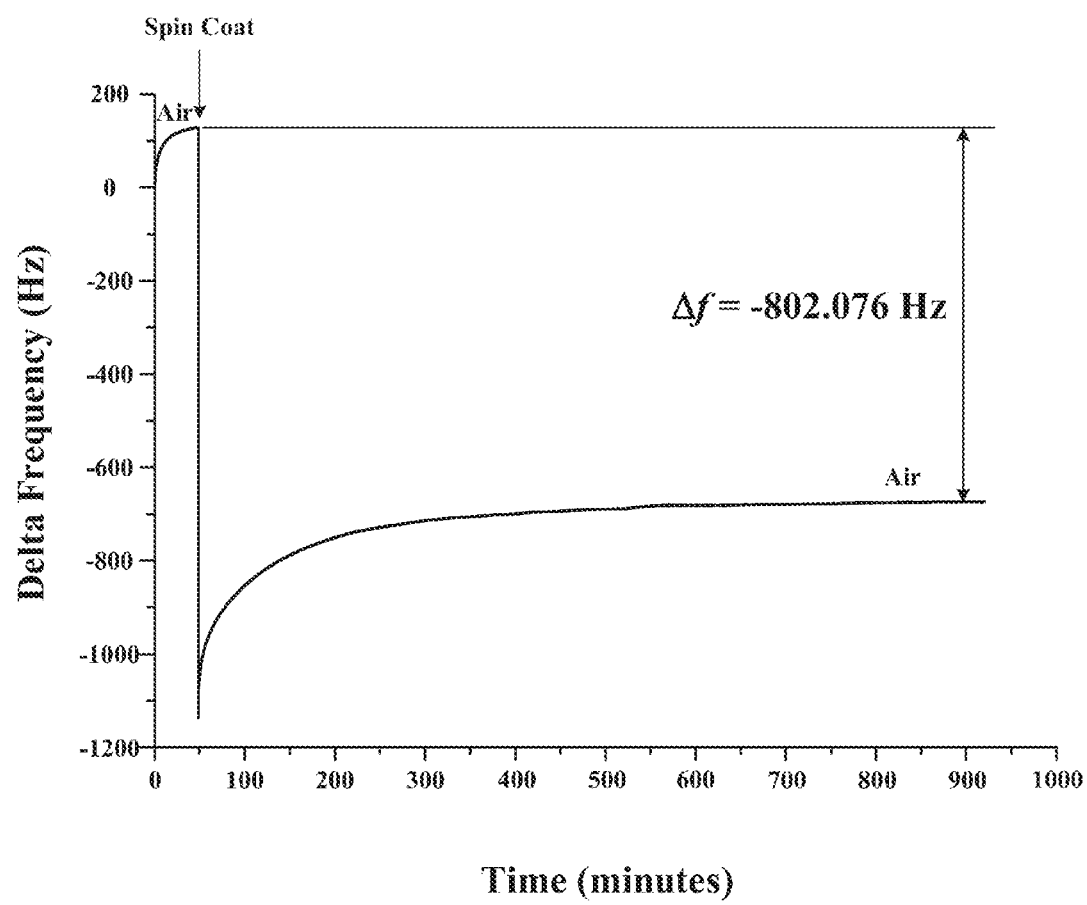

FIG. 24 depicts QCM measurements of PAA:SiO$_2$:Al ratio 4:1:1, 8000 rpm, 60 sec, 1 Layer.

Figure 25:
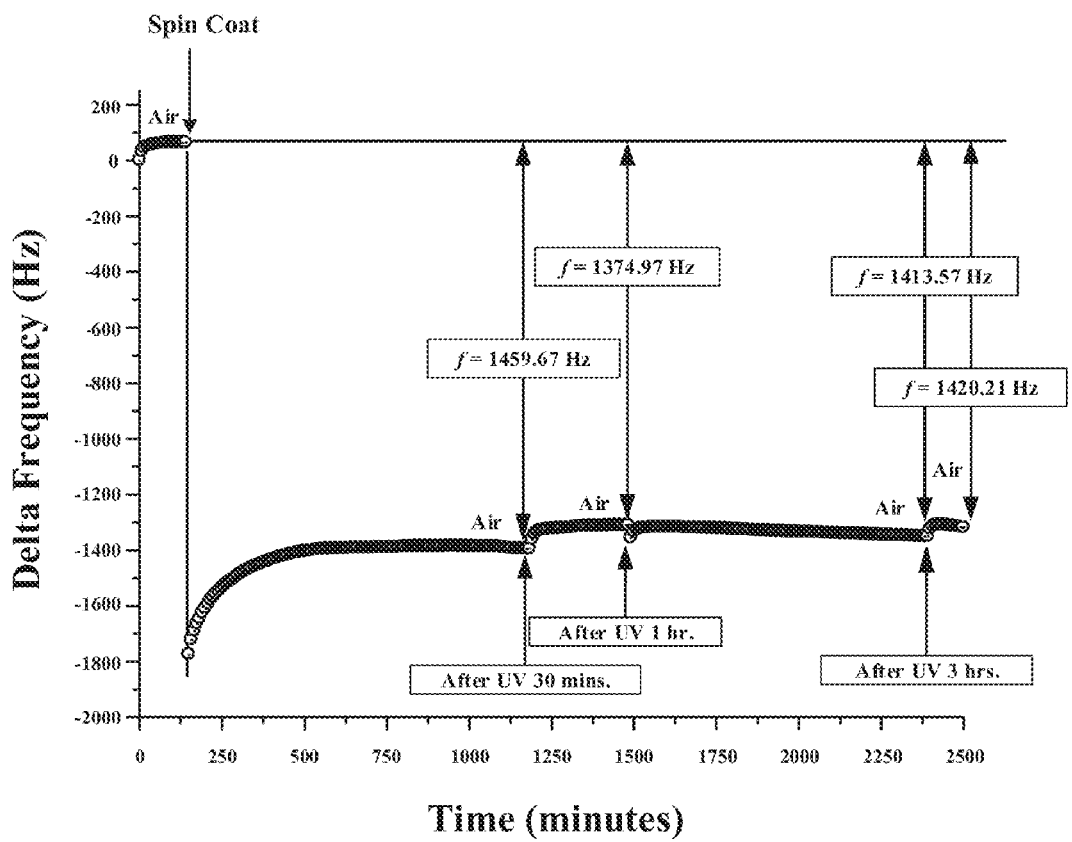

FIG. 25 depicts QCM measurements of BP-PAA:SiO$_2$:Al ratio 4:1:1, 2000 rpm, 60 sec, 1 Layer, and after UV Irradiation of the film for 30 min, 1 hr, and 3 hr.

Figure 26A:
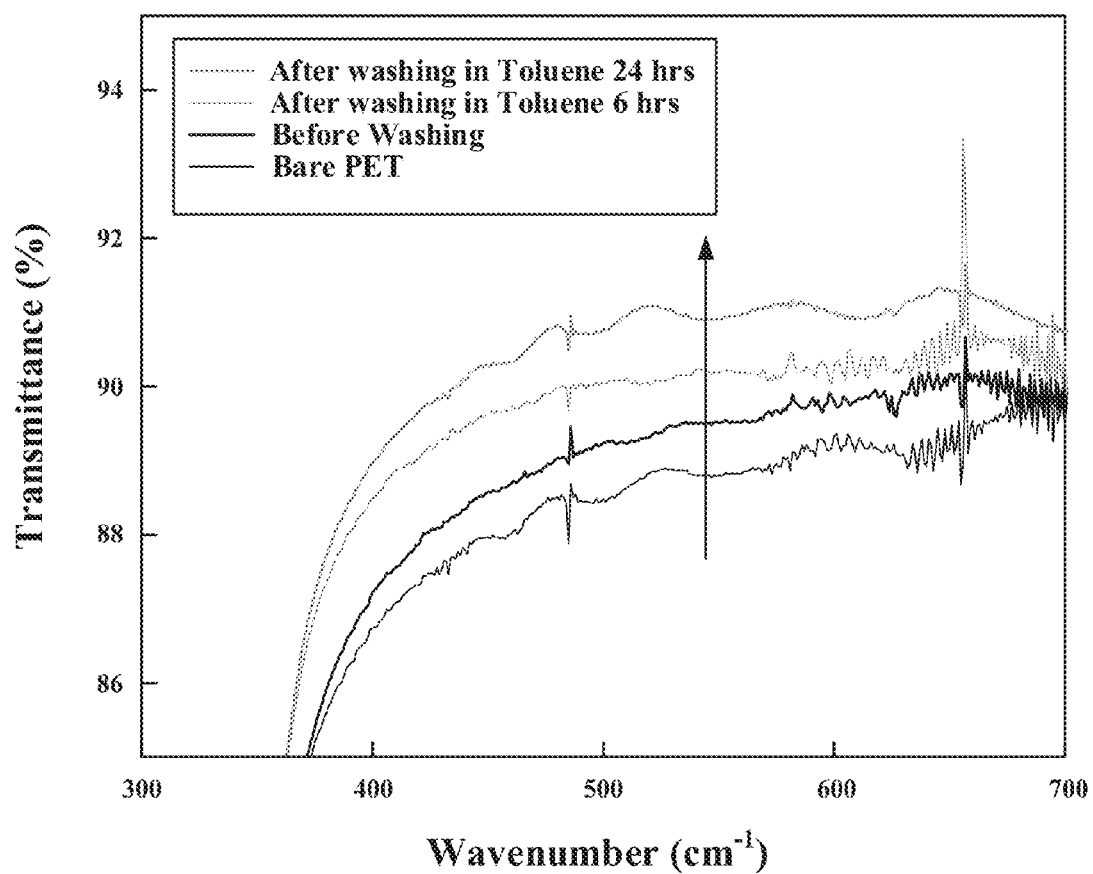
Figure 26B:
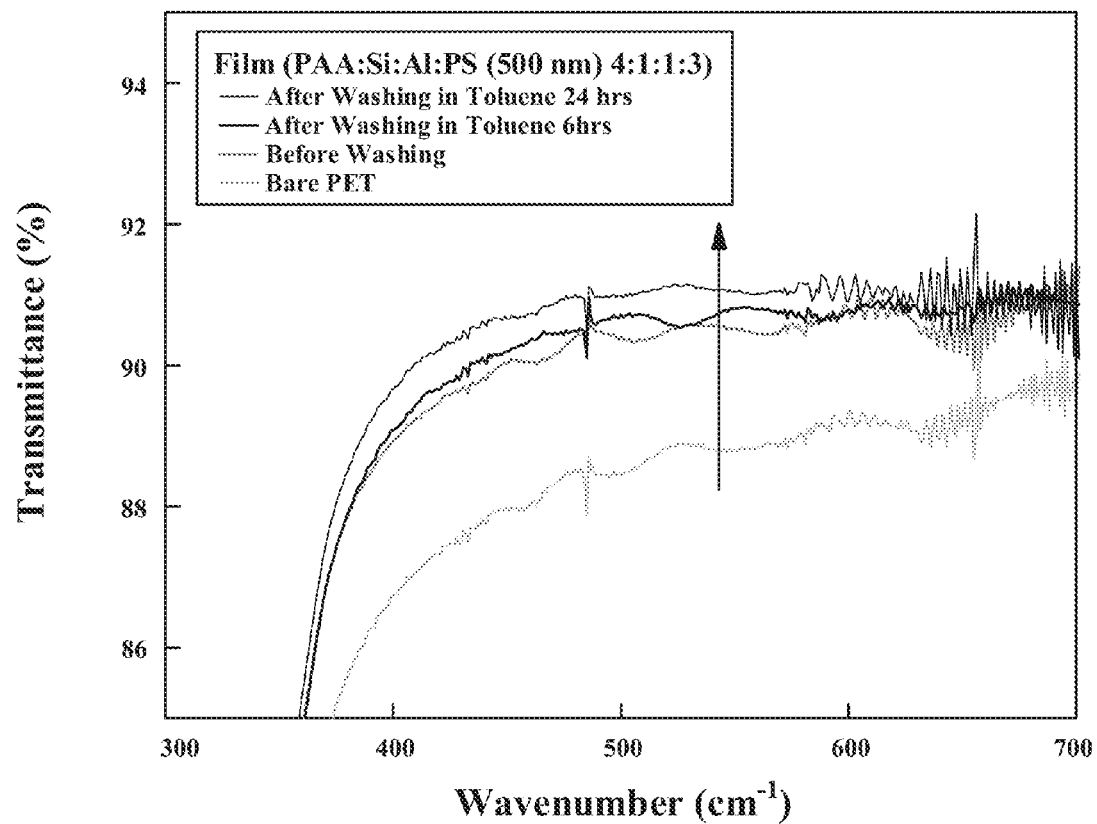

FIGS. 26A&B depict transmittance measurements for both sizes (100 and 500 nm) of PS particles after washing the PS particles from the film.

Figure 27:
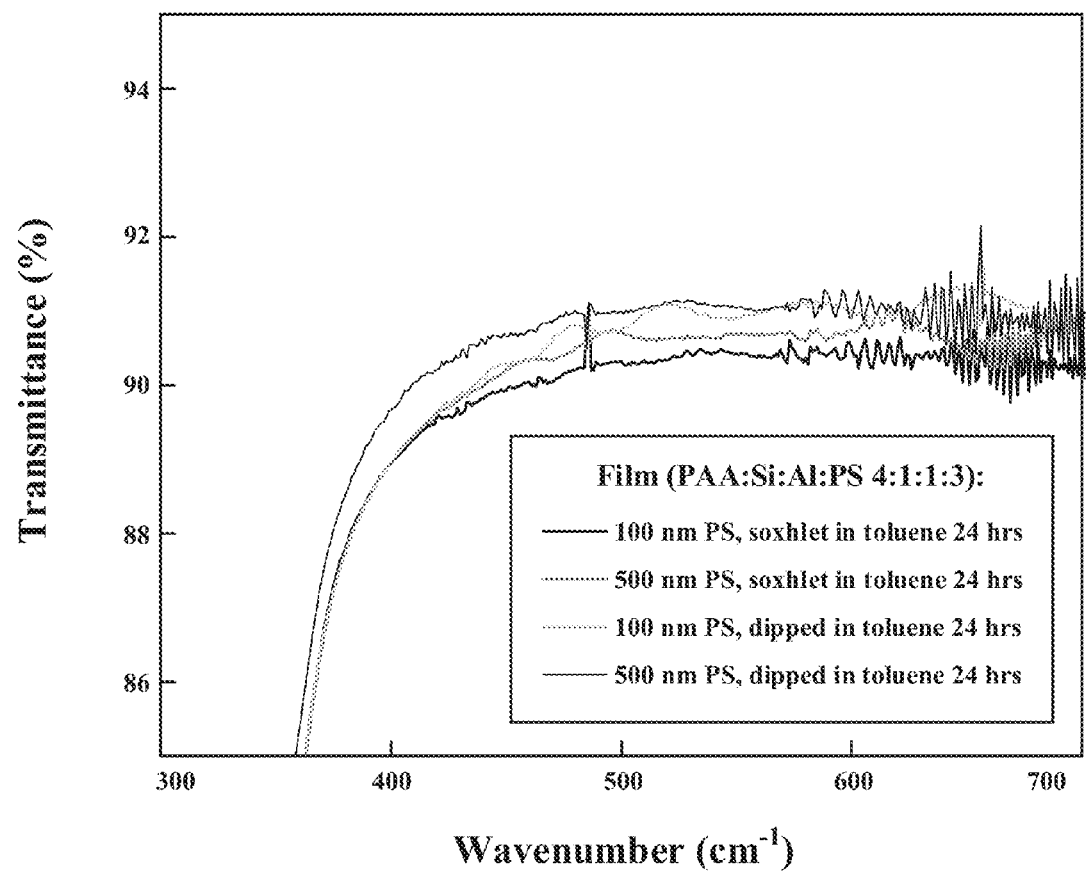

FIG. 27 depicts both 100 nm and 500 nm PS particles, normal solvent dipping is a better method of washing than soxhlet extraction using the same solvent (toluene).

Figure 28:
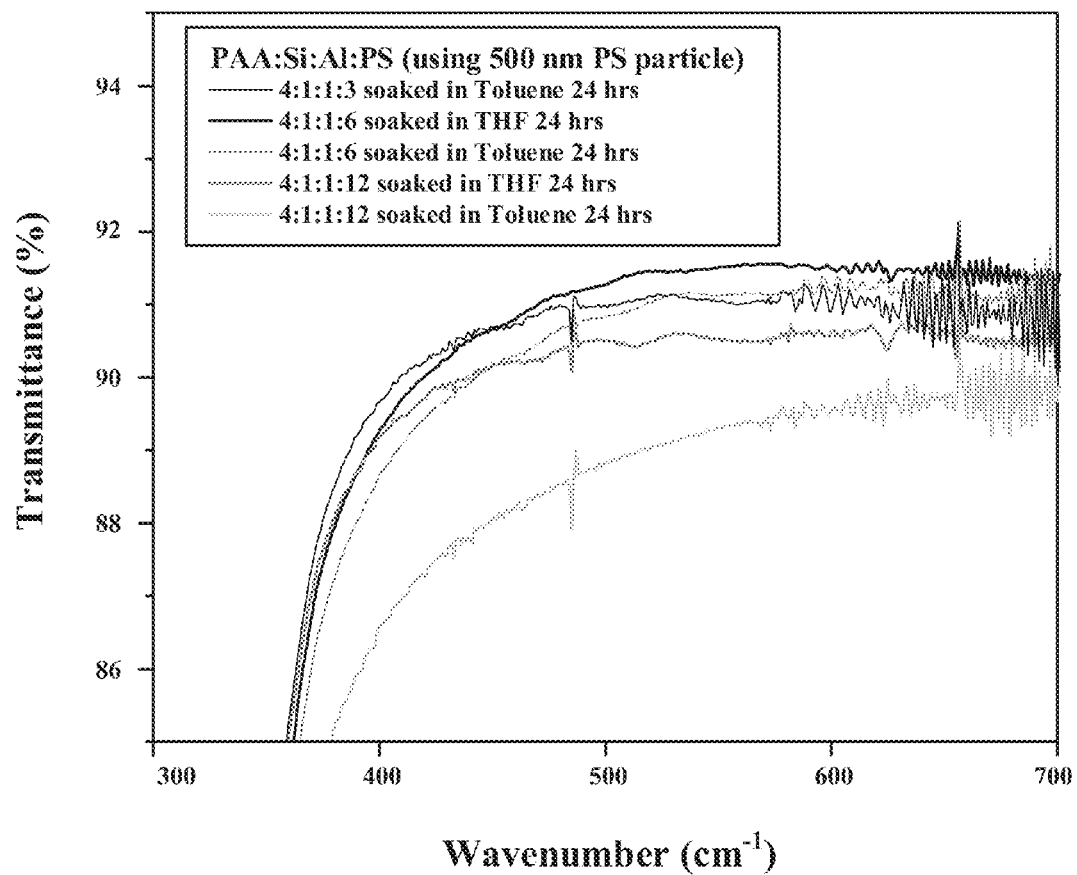
Figure 29A:
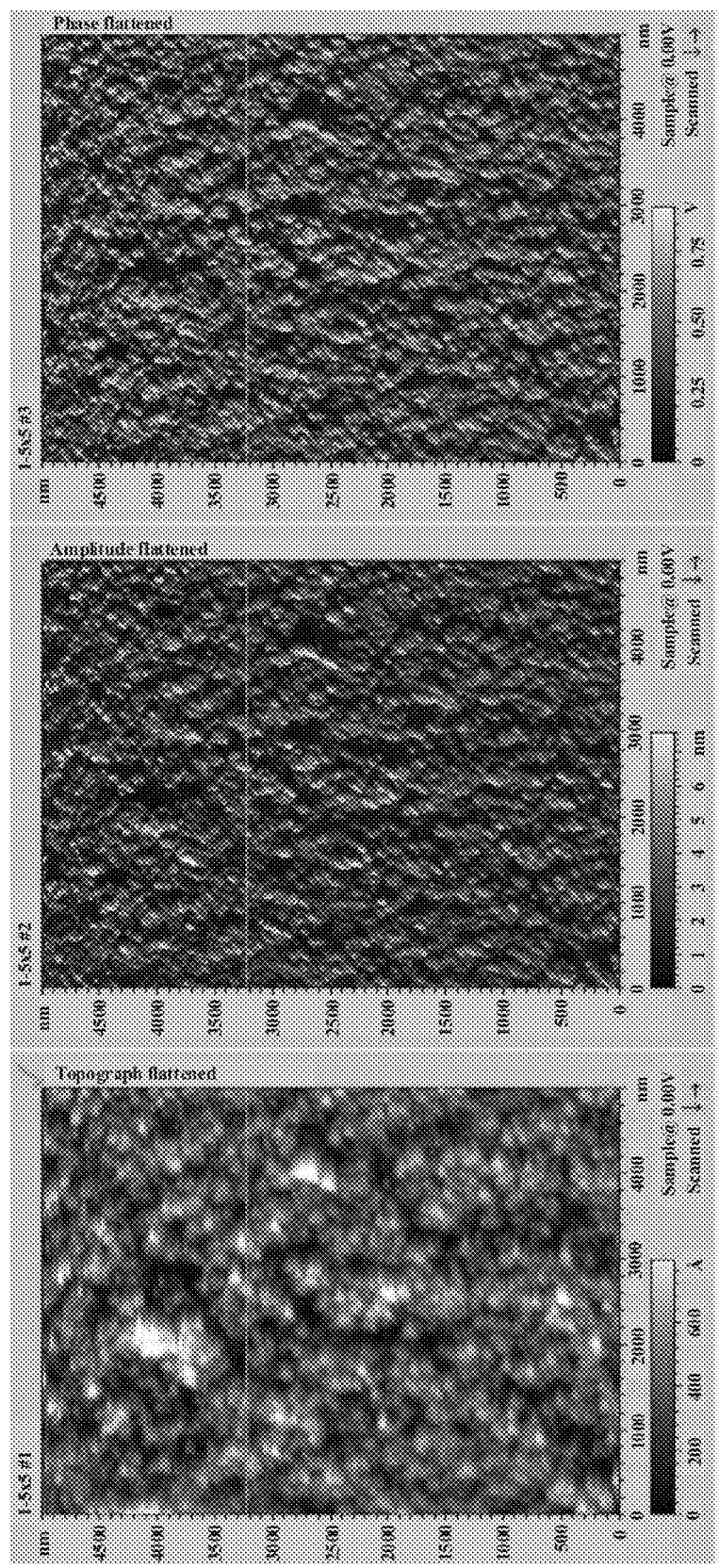
Figure 29B:
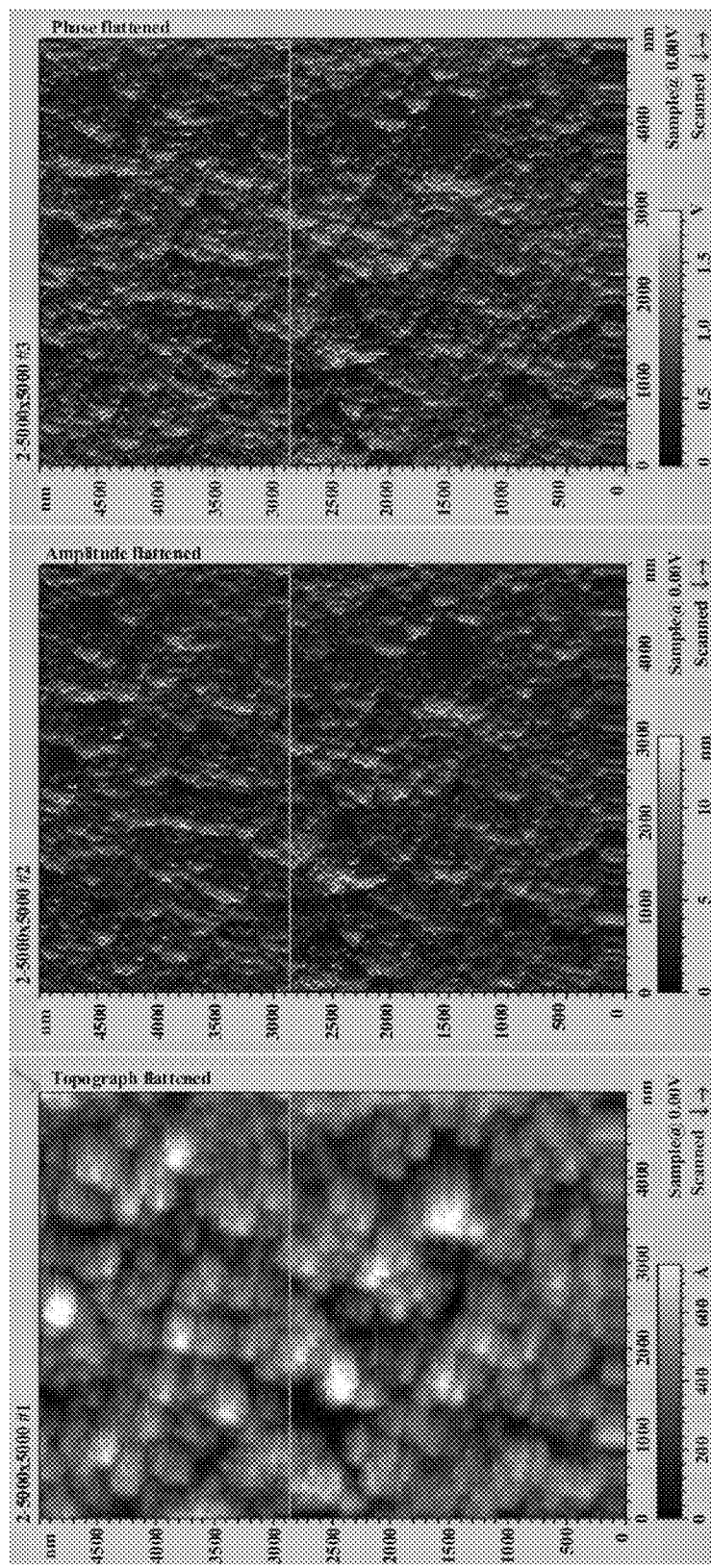
Figure 29C:
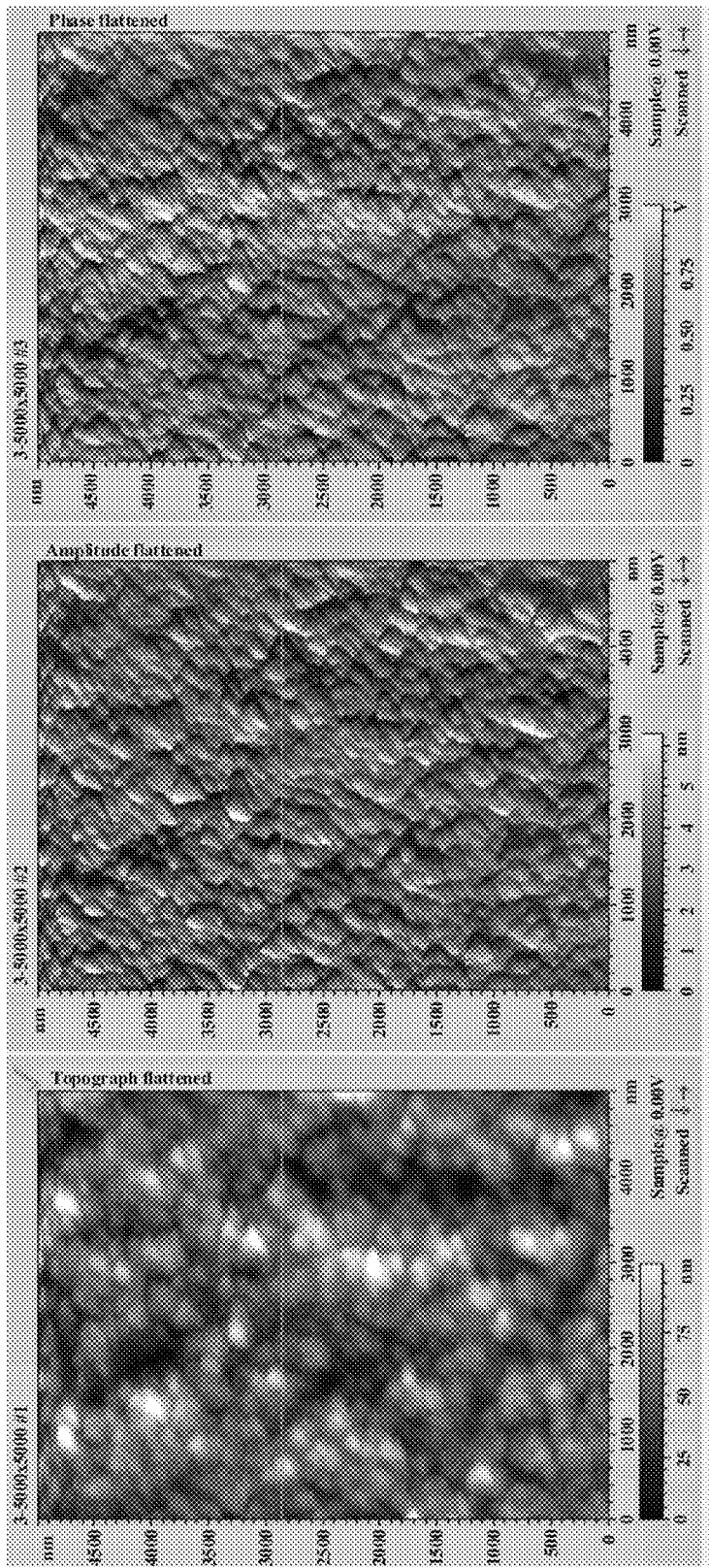
Figure 30A:
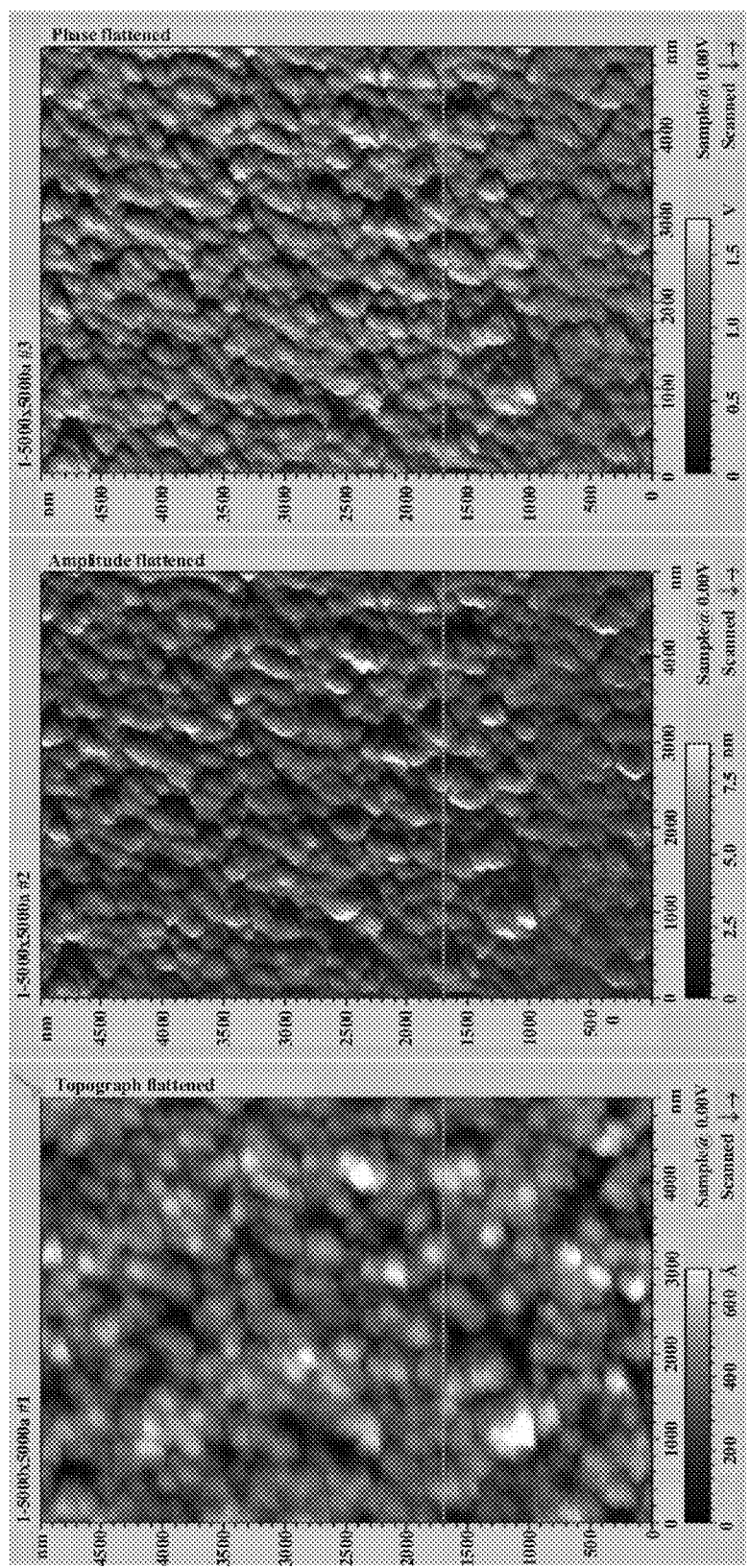
Figure 30B:
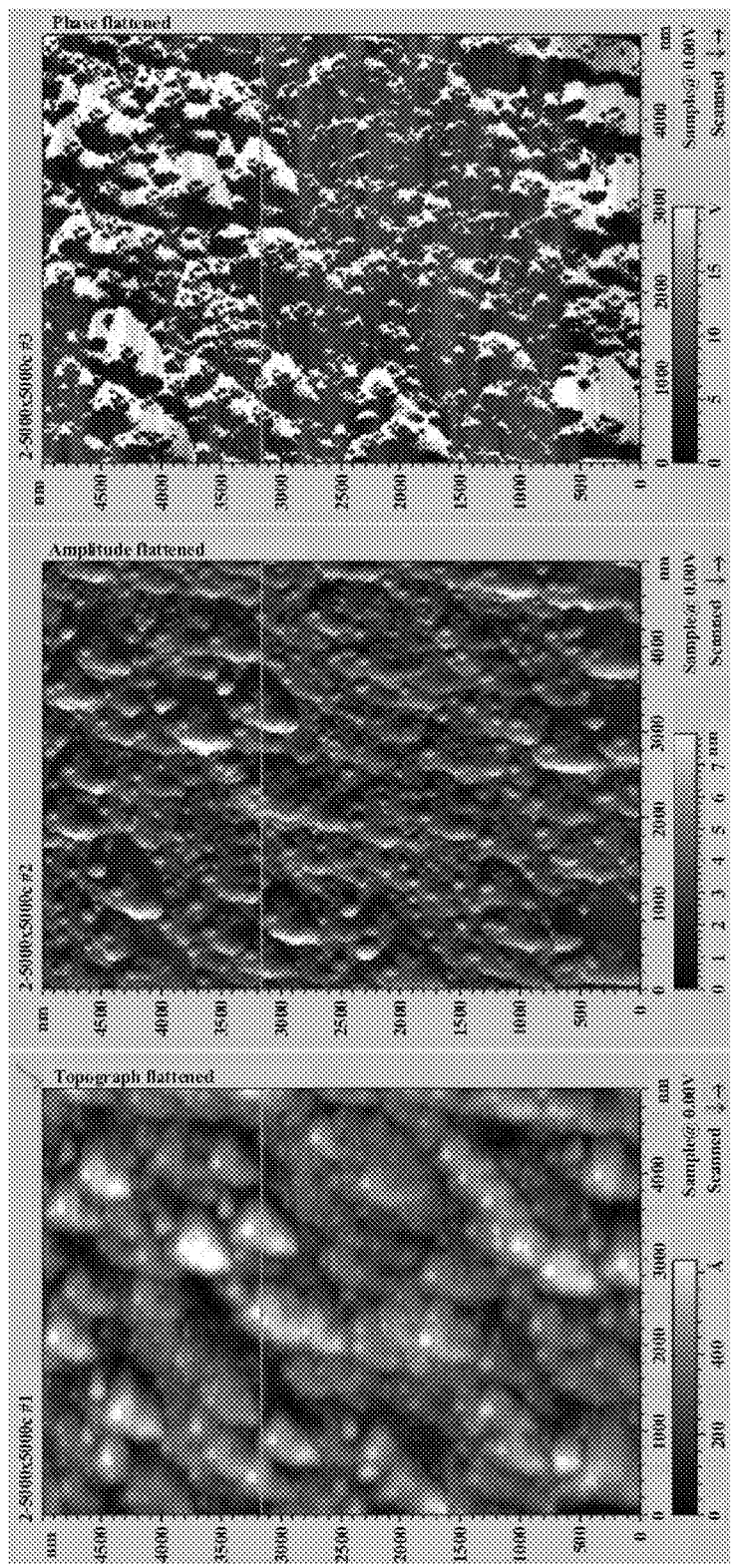
Figure 30C:
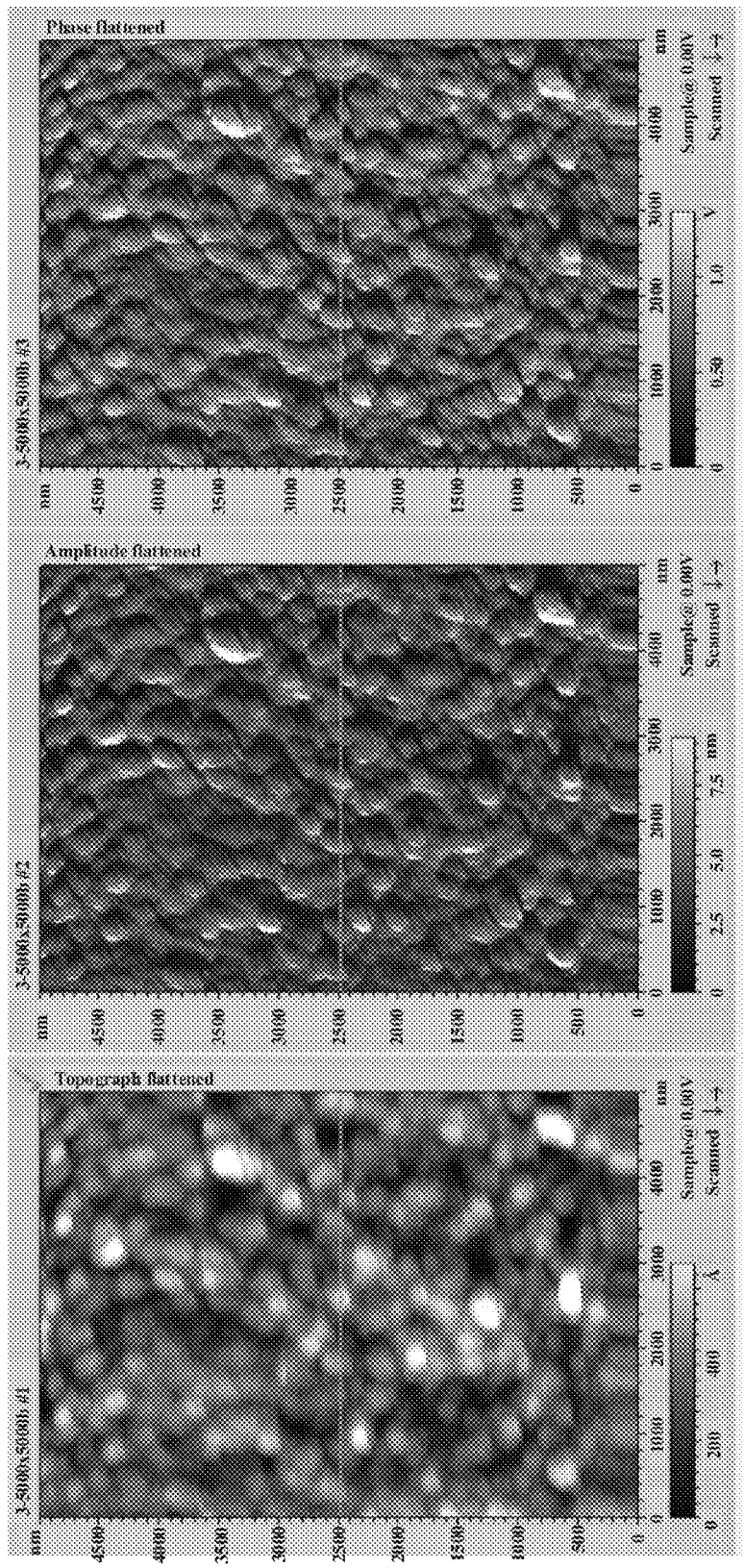

FIG. 28 depicts that increasing the concentration of PS particle to 12 significantly decreases the transmission of light through the film.

FIGS. 29A-C and FIGS. 30A-C show AFM images of a film made with 100 nm PS particles before washing, after dipping in toluene for 6 hours, and drying.

Figure 31:
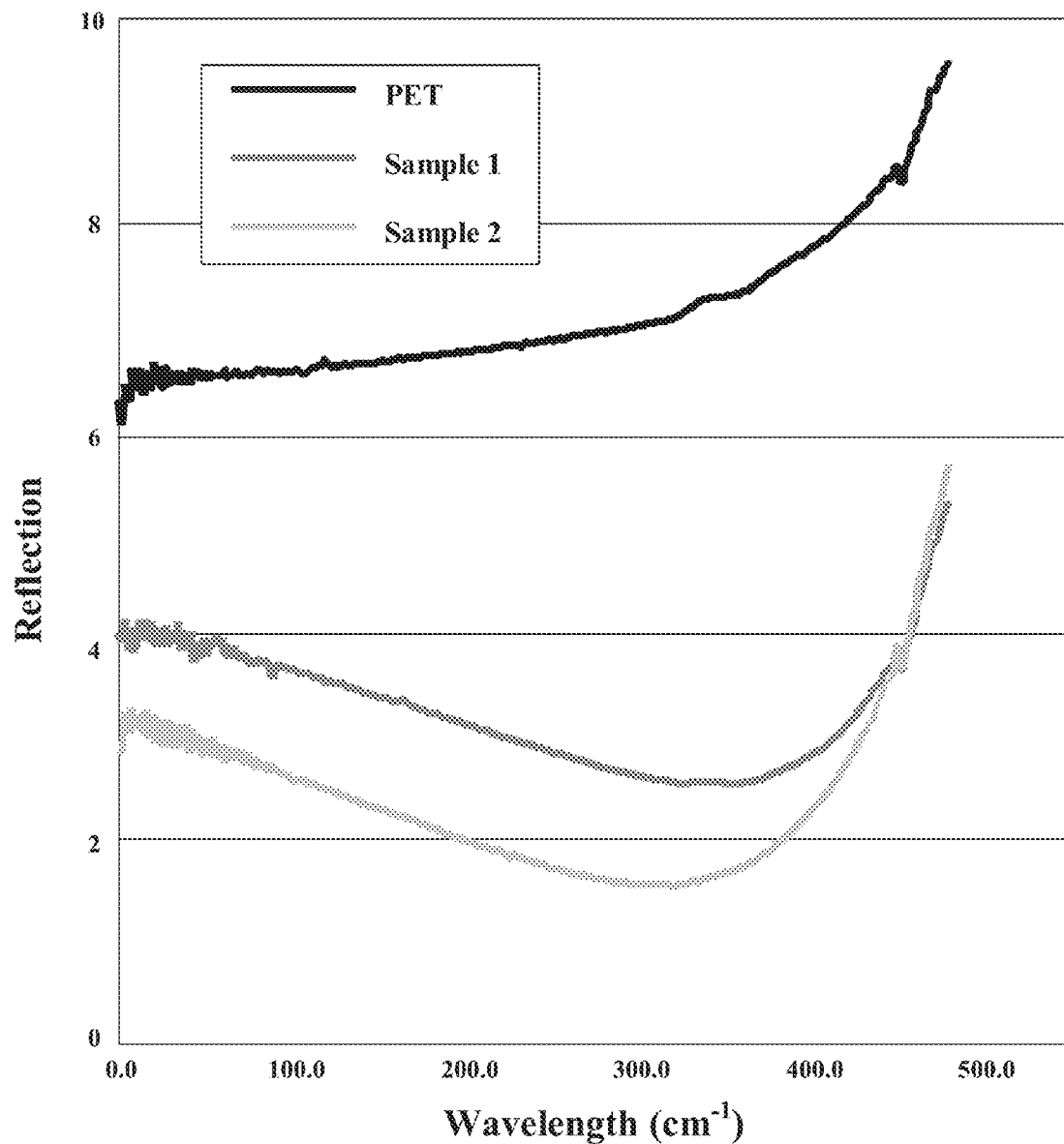

FIG. 31 depicts reflectance measurements of bare PET and samples 1 and 2.

Figure 32:
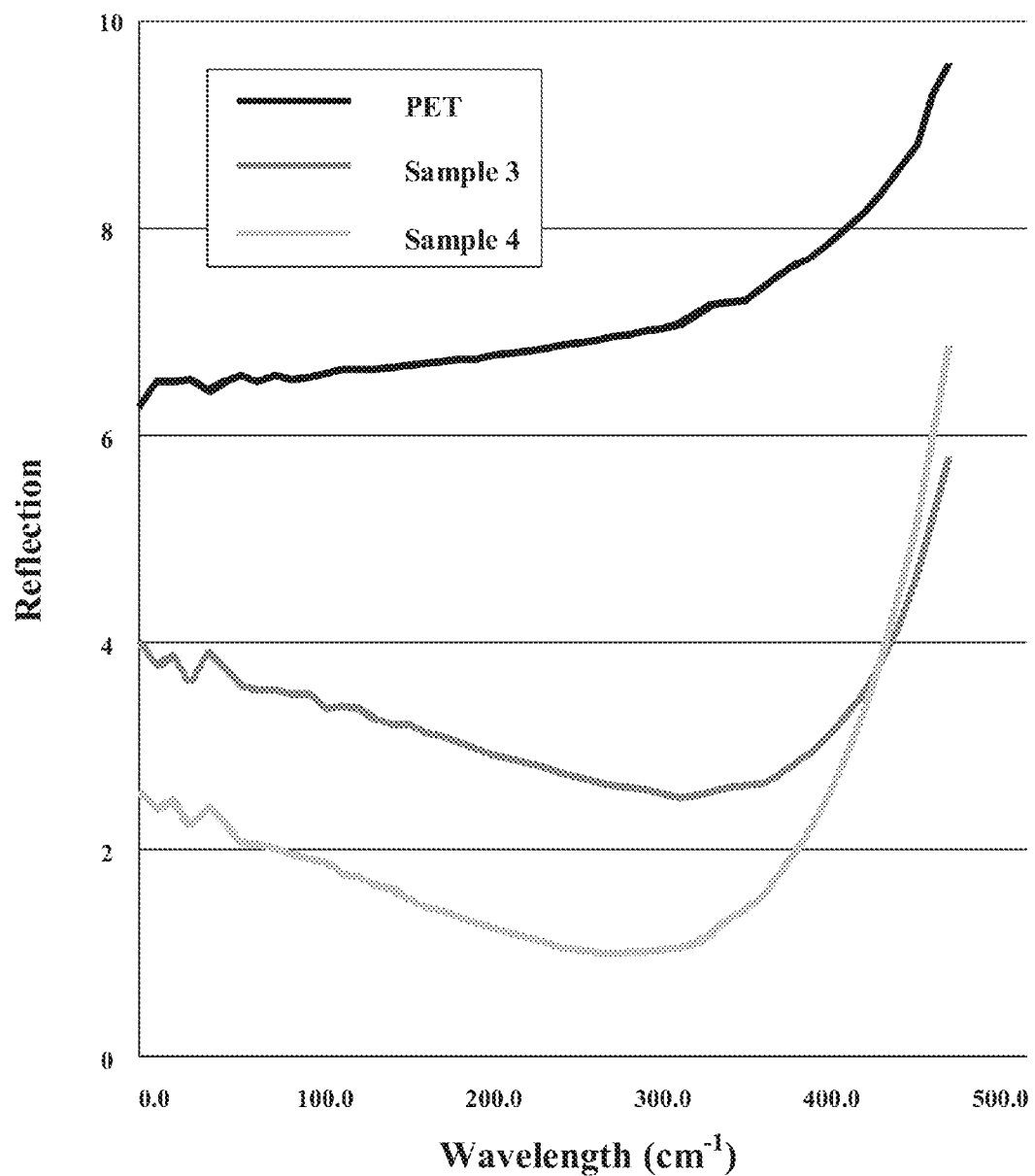

FIG. 32 depicts reflectance measurements of bare PET and samples 3 and 4.

Figure 33:
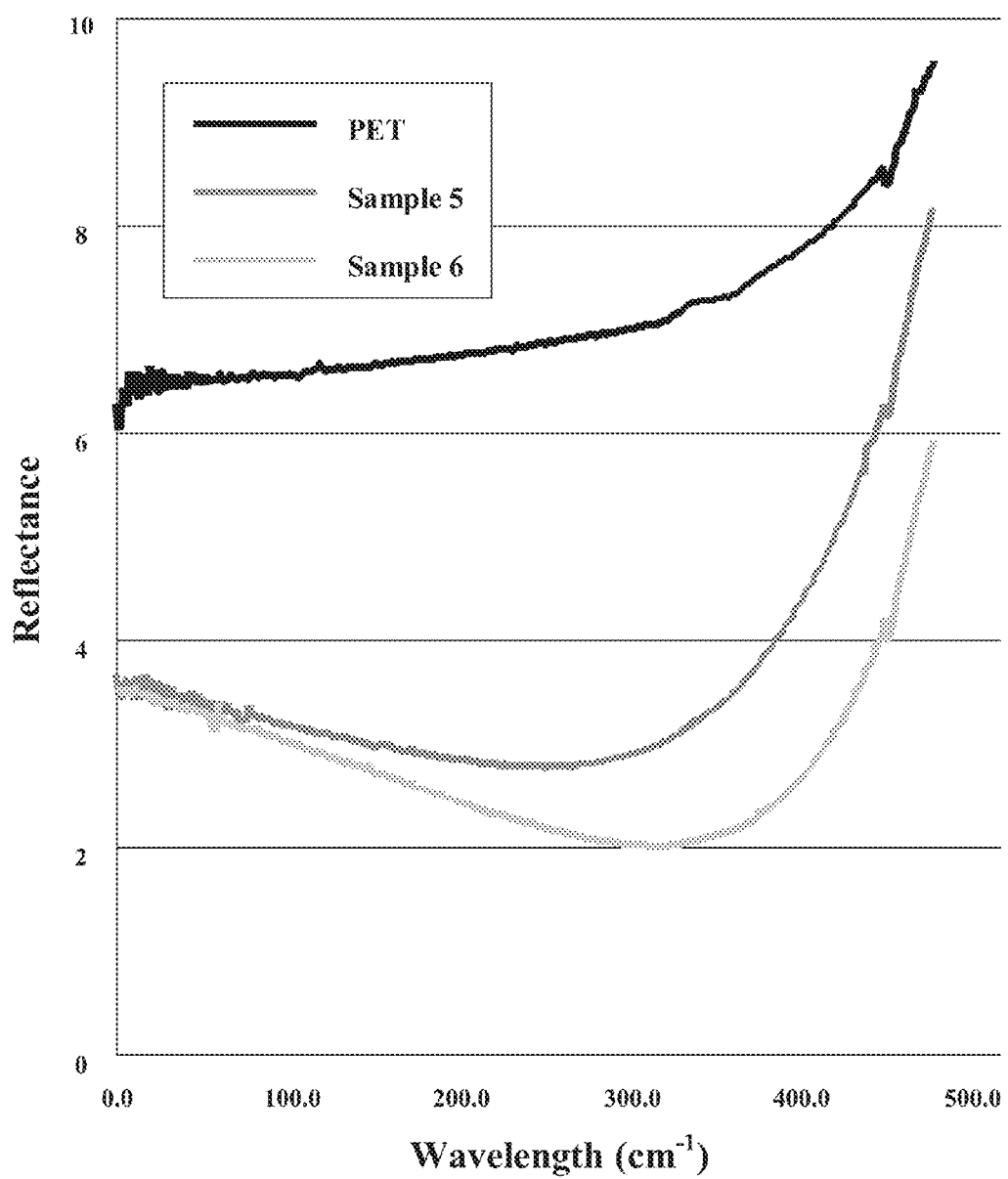

FIG. 33 depicts reflectance measurements of bare PET and samples 5 and 6.

DETAILED DESCRIPTION OF THE INVENTION

The inventors have developed three dimensional porous films that can be deposited or formed on the surfaces of substrates such as a polymeric substrates (e.g., poly(ethylene terephthalate) (PET)), glass substrates, ceramic substrates, metal oxide substrates, other non-metallic substrates and/or transparent or translucent metallic substrates, where the films have optical transmittance values of at least 86%, while maintaining the films anti-reflective properties.

Embodiments of the invention broadly relate to 3D polymeric network films or nanocomposites derived therefrom. The films include at least: (1) one network polymer or a plurality of network polymers capable of producing a non-covalently bonded, 3D polymeric network and optionally (2) one multivalent metal ion or a plurality of multivalent metal ions capable of non-covalently bonding to moieties or forming non-covalent cross-links between moieties in the 3D polymeric network increasing network stability. The films can also include (3) particles with a variety of sizes and/or compositions (e.g., nanoparticles) in the 3D polymeric network and/or (4) void volumes or spaces formed in the 3D polymeric network formed by solvent dissolution of added solvent dissolvable polymers or polymer particles or by the removal of template particles that con be removed by dissolution and/or other removal processes. In certain embodiments, the 3D polymeric network films include: (1) one polar polymer or a plurality of polar polymers, such as, but not limited to, polyacrylic acid (PAA) and (polyvinyl alcohol) PVOH, capable of forming a non-covalently bonded 3D polymeric network, optionally (2) one multivalent metal ion or a plurality of multivalent metal ions capable of non-covalently bonding to moieties of the polymeric network or capable of forming non-covalent cross-links between moieties of the 3D polymeric network, such as Ca$^{2+}$ and Al$^{3+}$, optionally (3) nanoparticles adapted to create a more opened 3D polymeric networks, and optionally (4) one solvent dissolvable polymer or a plurality of solvent dissolvable polymers, where the polymers can be removed solvent treatment increasing film porosity or increasing film void volume (i.e., increasing void spaces in the network). Polar polymers are thought to entangle to form an interpenetrating polymeric network. The addition of particles such as silica nanoparticles and solvent dissolvable polymers, into the polymeric network before the electrostatic crosslinking with metal ions causes the particles and dissolvable polymers to be effectively wrapped into polymeric networks. As a result, a highly porous three dimensional film generally a hydrogel film can be generated.

Embodiments of the disclosed method include forming 3D polymeric network films including depositing (1) one network polymer or a plurality of network polymers onto a surface of a substrate, where the polymer or polymers are capable of producing a non-covalently bonded, 3D polymeric network and optionally (2) non-covalently crosslinking the network with one multivalent metal ion or a plurality of multivalent metal ions, where the metal ions non-covalently bond to moieties on the network or form non-covalent cross-links between moieties in the network. The method can also include adding particles (e.g., nanoparticles) to the network polymers prior to metal ion crosslinking. The method can also include adding one solvent dissolvable polymer or a plurality of solvent dissolvable polymers to the network polymers prior to metal ion crosslinking. The particles and solvent dissolvable polymers are designed to create greater porosity and/or greater void volumes or spaces. In certain embodiments, the 3D polymeric network includes depositing (1) one polar network polymer or a plurality of polar network polymers, such as polyacrylic acid (PAA) and (polyvinyl alcohol) PVOH, capable of forming a non-covalently bonded 3D polymeric network, and optionally (2) one multivalent metal ion or a plurality of multivalent metal ions capable of non-covalently bonding to moieties of the polymeric network or capable of forming non-covalent cross-links between moieties of the 3D polymeric network, such as Ca$^{2+}$ and Al$^{3+}$. The method can also include (3) adding nanoparticles to the network polymers prior to crosslinking, where the nanoparticles are adapted to create a more opened 3D polymeric network, and/or (4) adding one solvent dissolvable polymer or a plurality of solvent dissolvable polymers to the network polymers prior to crosslinking and then treating the film with a solvent to dissolve away the solvent dissolvable polymers to increase the film porosity or to increase the void volume of the polymeric network (i.e., increase void spaces in the network). As a result, a highly porous three dimensional polymeric films and in particular 3D hydrogel films can be generated. The fabrication method can also include adding lower alcohols such as ethyl alcohol or isopropyl alcohol, to the polymeric network which now comprises a hydrogel in order to increase the water evaporation speed in the spin coating process.

A processing steps can be employed that include the steps of dissolving template particles and/or crosslinking the network chemically, photochemically, radiochemical, and/or thermally. Cross-linking can be done by using photo-irradiation of benzophenone (but not exclusive to) tethered to the polymer or particle. Other functional crosslinkers (acrylate, azide, cinnamate, and others) can be added to or included in the network compositions and methods can include the step of crosslinking the added crosslinkers. The added crosslinking steps are adapted to improve the stability of the films and improve the mechanical properties of the films. Dissolution or destruction of template particles like polystyrene (but is not exclusive to it) with good dissolution solvents is adapted to create void spaces in the film network structure or to increase the void volume of the film network structure. While dissolution of a polymer is demonstrated, the method can be extended to dissolution of small molecules and/or other methods of template particle removal based on chemical reactions, photochemical reactions, thermally induced reactions, leading to dissolution, gasification, and evaporation of template material.

Suitable Reagents

Suitable network polymers for use in the present invention include, without limitation, polyacrylic acid, polymethacrylic acid, polyvinyl alcohol, copolymers of maleic acid and acrylic acid, copolymers of maleic anhydride and acrylic acid, copolymers of maleic acid and methacrylic acid, copolymers of maleic anhydride and methacrylic acid, copolymers of alphaolefins and acrylic acid, methacrylic acid, maleic acid and/or maleic anhydride, or mixtures or combinations thereof.

Suitable multivalent metal ions include, without limitation, $Be^{2+}$, $Mg^{2+}$, $Ca^{2+}$, $Sr^{2+}$, $Ba^{2+}$, $Al^{3+}$, $Ga^{3+}$, $In^{3+}$, polyvalent transitions metals, actinide metals, polyvalent actinide metals, polyvalent lanthanide metals or mixtures or combinations thereof. In certain embodiments, polyvalent transitions metals, actinide metals, polyvalent actinide metals, polyvalent lanthanide metals are non-oxidizing or oxidation promoting polyvalent metal ions.

Suitable particles include, without limitation, particles of a non-conducting material, particles of conducting materials or mixtures or combinations thereof. Exemplary non-conducting particles include metal oxides, ceramics, fibrous polymers, carbon fibers, non-conducting nanotubes, or the like or mixtures or combinations thereof. Exemplary examples of metal oxides include, without limitation, silicas, aluminas, silica aluminates, alumina silicates, zeolites, titanias, magnesias, zirconias, or mixtures or combinations thereof. Exemplary conducting particles include metals, nanoshells, nanorods, conductive polymers, or mixture or combinations thereof. Other particles include polymer or organic particles (non metallic or non-metal oxides) based on addition or chain-reaction polymerized polystyrene, polyolefins, polyacrylates, condensation or step polymerization based polymers, carbon black, clays, mica, and other non-metallic particles. The purpose of the particles is to improve the mechanical, optical, electrical, chemical, catalytic, and thermal properties of the film, Another purpose of the particles is to use as templates for dissolution and subsequent formation of void spaces in the film. Particles with electro-optical properties and particles with magneto-optical properties. The compositions can include any mixture or combination of particles set forth above.

Suitable removable polymers or solvent dissolvable polymers include, without limitation, polyolefins, polydienes, olefin/diene copolymers and mixtures or combinations thereof. Exemplary polyolefins include polyethylene, polypropylene, ethylene and propylene copolymers, polystyrene, polyvinyl ethers such as polyvinyl methyl ethers, polystyrenes, styrene-maleic anhydride copolymers, vinyl-aromatic-alkylene copolymers, including styrene-butadiene copolymers, styrene-ethylene-butylene copolymers (e.g., a polystyrene-polyethylene/butylene-polystyrene (SEBS) copolymer, available as Kraton® series polymers), styrene-isoprene copolymers (e.g., polystyrene-polyisoprene-polystyrene), acrylonitrife-styrene copolymers, acrylonitrile-butadiene-styrene copolymers, styrene-butadiene copolymers and styrene-isobutylene copolymers (e.g., polyisobutylene-polystyrene and polystyrene-polyisobutylene-polystyrene block copolymers such as those disclosed in U.S. Pat. No. 6,545,097 to Pinchuk), or the like. Exemplary polydienes include polybutadiene, polyisoprene, or the like. Exemplary olefin/diene copolymers include SBR, SIS, SBS, or the like.

Suitable substrates include, without limitation, non-metallic inorganic substrates, metallic inorganic substrates, polymeric substrates, and mixtures or combinations thereof.

Exemplary examples of non-metallic inorganic substrates include, without limitation, materials containing one or more of the following: metal oxides, including aluminum oxides and transition metal oxides (e.g., oxides of titanium, zirconium, hafnium, tantalum, molybdenum, tungsten, rhenium, and indium); silicon; silicon-based ceramics, such as those containing silicon nitrides, silicon carbides and silicon oxides (sometimes referred to as glass ceramics); calcium phosphate ceramics (e.g., hydroxyapatite); carbon; and carbon-based, ceramic-like materials such as carbon nitrides, and mixtures or combinations thereof.

Exemplary examples of metallic inorganic substrates include, without limitation, metals (e.g., biostable metals such as gold, platinum, palladium, indium, osmium, rhodium, titanium, tantalum, tungsten, and ruthenium, and bioresorbable metals such as magnesium) and metal alloys, including metal alloys comprising iron and chromium (e.g., stainless steels, including platinum-enriched radiopaque stainless steel), alloys comprising nickel and titanium (e.g., Nitinol), alloys comprising cobalt and chromium, including alloys that comprise cobalt, chromium and iron (e.g., elgiloy alloys), alloys comprising nickel, cobalt and chromium (e.g., 3VIP 35N), alloys comprising cobalt, chromium, tungsten and nickel (e.g., L605), and alloys comprising nickel and chromium (e.g., inconel alloys) and mixtures or combinations thereof.

Exemplary examples of polymeric substrates include, without limitation, polycarboxylic acid polymers and copolymers including polyacrylic acids; acetal polymers and copolymers; acrylate and methacrylate polymers and copolymers (e.g., n-butyl methacrylate); cellulosic polymers and copolymers, including cellulose acetates, cellulose nitrates, cellulose propionates, cellulose acetate butyrates, cellophanes, rayons, rayon triacetates, and cellulose ethers such as carboxymethyl celluloses and hydroxyalkyl celluloses; polyoxymethylene polymers and copolymers; polyimide polymers and copolymers such as polyether block imides and polyether block amides, polyamidimides, polyesterimides, and polyetherimides; polysulfone polymers and copolymers including polyarylsulfones and polyethersulfones; polyamide polymers and copolymers including nylon 6,6, nylon 12, polycaprolactams and polyacrylamides; resins including alkyd resins, phenolic resins, urea resins, melamine resins, epoxy resins, allyl resins and epoxide resins; polycarbonates; polyacrylonitriles; polyvinylpyrrolidones (cross-linked and otherwise); polymers and copolymers of vinyl monomers including polyvinyl alcohols, polyvinyl halides such as polyvinyl chlorides, ethylene-vinyl acetate copolymers (EVA), polyvinylidene chlorides, polyvinyl ethers such as polyvinyl methyl ethers, crosslinked styrene-maleic anhydride copolymers, crosslinked vinyl-aromatic-alkylene copolymers, including crosslinked styrene-butadiene copolymers, crosslinked styrene-ethylene-butylene copolymers (e.g., crosslinked polystyrene-polyethylene/butylene-polystyrene (SEBS) copolymer, available as Kraton® G series polymers), crosslinked styrene-isoprene copolymers (e.g., polystyrenepolyisoprene-polystyrene), crosslinked acrylonitrile-styrene copolymers, crosslinked acrylonitrile-butadiene-styrene copolymers, crosslinked styrene-butadiene copolymers and crosslinked styrene-isobutylene copolymers (e.g., crosslinked polyisobutylene-polystyrene and crosslinked polystyrene-polyisobutylene-polystyrene block copolymers such as those disclosed in U.S. Pat. No. 6,545,097 to Pinchuk), polyvinyl ketones, polyvinylcarbazoles, and polyvinyl esters such as polyvinyl acetates; polybenzimidazoles; crosslinked ethylene-methacrylic acid copolymers and crosslinked ethylene-acrylic acid copolymers, where some of the acid groups can be neutralized with either zinc or sodium ions (commonly known as ionomers); polyalkyl oxide polymers and copolymers including polyethylene oxides (PEO); polyesters including polyethylene terephthalates and aliphatic polyesters such as polymers and copolymers of lactide (which includes lactic acid as well as d-, l- and meso lactide), epsilon-caprolactone, glycolide (including glycolic acid), hydroxybutyrate, hydroxyvalerate, para-dioxanone, trimethylene carbonate (and its alkyl derivatives), 1,4-dioxepan-2-one, 1,5-dioxepan-2-one, and 6,6-dimethyl-1,4-dioxan-2-one (a copolymer of poly(lactic acid) and poly(caprolactone) is one specific example); polyether polymers and copolymers including polyarylethers such as polyphenylene ethers, polyether ketones, polyether ether ketones; polyphenylene sulfides; polyisocyanates; crosslinked polyolefin polymers and copolymers, including crosslinked polyalkylenes such as crosslinked polypropylenes, polyethylenes (low and high density, low and high molecular weight), crosslinked polybutylenes (such as polybut-1-ene and polyisobutylene), crosslinked polyolefin elastomers (e.g., santoprene), ethylene propylene diene monomer (EPDM) rubbers, crosslinked poly-4-methyl-pen-1-enes, ethylene-alpha-olefin copolymers, ethylene-methyl methacrylate copolymers and ethylene-vinyl acetate copolymers; fluorinated polymers and copolymers, including polytetrafluoroethylenes (PTFE), poly(tetrafluoroethylene-co-hexafluoropropene) (FEP), modified ethylene-tetrafluoroethylene copolymers (ETFE), and polyvinylidene fluorides (PVDF); silicone polymers and copolymers; thermoplastic polyurethanes (TPU); elastomers such as elastomeric polyurethanes and polyurethane copolymers (including block and random copolymers that are polyether based, polyester based, polycarbonate based, aliphatic based, aromatic based and mixtures thereof; examples of commercially available polyurethane copolymers include Bionate®, Carbothane®, Tecoflex®, Tecothane®, Tecophilic®, Tecoplast®, Pellethane®, Chronothane® and Chronoflex®); p-xylylene polymers; polyiminocarbonates; copoly(ether-esters) such as polyethylene oxide-polylactic acid copolymers; polyphosphazines; polyalkylene oxalates; polyoxaamides and polyoxaesters (including those containing amines and/or amido groups); polyorthoesters; biopolymers, such as polypeptides, proteins, polysaccharides and fatty acids (and esters thereof), including fibrin, fibrinogen, collagen, elastin, chitosan, gelatin, starch, glycosaminoglycans such as hyaluronic acid; as well as further copolymers and blends of the above, and mixtures or combinations thereof.

Suitable monomers include, without limitation, radically-polymerizable monomers, cationic polymerizable monomers, anionic polymerizable monomers, or any other monomer that can be polymerized. Exemplary examples include all ethylenically unsaturated monomers, all diene monomers, siloxane monomers, epoxy monomers, carbonate monomers, urethane monomers, monomers used to prepare the polymers listed above, or other polymerizable monomers or mixtures or combinations thereof. The polymerized monomers can be cross linkable or non-crosslinkable.

Suitable oligomers include, without limitation, short polymers (from 2 to about 1000 repeat units) or any one of monomers set forth above or mixtures or combinations thereof. The oligomers can be polymerizable and/or crosslinkable or non-cross linkable.

Suitable polymerization initiators include, without limitation, radical initiators such as peroxides, peroxyacids, azo-compounds, or similar radical initiators, epoxy initiators, metallocene initiators, or mixtures or combinations thereof.

Suitable solvents include, without limitation, any polymer capable of dissolving or swelling the network polymers used to prepare the coatings or films of this invention. Exemplary polar solvent include water, lower alcohol water mixtures, water lower ketone mixtures, water and other miscible water solvents, lower alcohols, lower ketones, DMSO, DMF, HMPA, morpholine, 2-methylpyrrolidone, acetates, THF, or mixtures or combinations thereof. Exemplary non-polar solvents include, without limitation, any organic solvent capable of swelling and/or dissolving the network polymer(s) and capable of being removed after network crosslinking either non-covalently or non-covalently and covalently.

Section I

Embodiments of the present invention relate to a method for making three dimensional anti reflection porous films on substrates such as poly(ethylene terephthalate) or PET, having an optical transmittance higher than 86%. The films comprise one polar polymers such as PAA PVOH via H-bonding and PAA, and electrostatic crosslinkage by multivalent metal ions such as, but not limited to $Ca^{2+}$ and $Al^{3+}$. Different sized silica nanoparticles (obtained from Nissan Chemicals for example) are used: SNOWTEX-UP (or ST-UP) contains elongated silica nanoparticles of 9 to 15 nm in diameter and 40 to 300 nm in length, SNOWTEX-N (or ST-N) of size 10 to 20 nm, SNOWTEX-XL (or ST-XL) of size 60 nm, SNOW-TEX-PS-S (or ST-PS) of size 100 nm, and SNOWTEX-OS (or ST-OS) of size 7 to 9 m-n. These solutions are colloids of silica particles in water. All nanoparticles are spherical particles except for ST-UP, which is an elongated particle.

First Embodiment

One embodiment of the present invention includes a general procedure for the physical crosslinking of polyacrylic acid (PAA) using $Ca^+$ cations as crosslinking agents. Positively charged bivalent $Ca^{2+}$ cations induce physical crosslinking of negatively charged acids of the polyacrylic acid matrix. Furthermore, $Ca^{2+}$ cations attract negatively charged $SiO_2$ nanoparticles. One embodiment of the present invention includes hydrogels prepared from four chemicals, namely PVOH, PAA, $CaCl_2$, and $SiO_2$ particles having a size between about 7 nm and about 9 nm in diameter (largest particle dimension). Table 1 shows the composition of each of the basic chemicals used for the preparation of hydrogels.

TABLE 1

Basic Chemicals Used for Preparing Hydrogels

| Solution A | Solution B | Solution C | Solution D |
|---|---|---|---|
| PVOH[a] | PAA[b] | $CaCl_2$ | $SiO_2$ |
| 0.05 g/mL | 0.0105 g/mL | 0.1 g/mL | 0.05 g/mL |

[a]PVOH means,
[b]PAA means polyacrylic acid

These solutions are then used to prepare six hydrogels named solutions 1 to 6 as described in Table 2.

TABLE 2

Amount of Each Solution Used in Hydrogel Preparation

| Designation | Solution A | Solution B | Solution C | Solution D |
|---|---|---|---|---|
| Solution 1 | 1 mL | 1 mL | 1 mL | 1 mL |
| Solution 2 | 1 mL | 1 mL | 2 mL | 0.5 mL |
| Solution 3 | 2 mL | 1 mL | 1 mL | 0.5 mL |
| Solution 4 | 1 mL | 2 mL | 1 mL | 0.5 mL |
| Solution 5 | 0.5 mL | 1 mL | 2 mL | 1 mL |
| Solution 6 | 0.5 mL | 2 mL | 1 mL | 1 mL |

Hydrogels 1 through 6 were prepared of the same initial chemicals, but mixed in different proportions and sonicated for one minute. These hydrogels are subsequently used to form films on PET substrates. In certain embodiments, the solutions are made compatible, but not necessarily totally miscible.

Example 1 a) Effect of the Preparation of the Hydrogels on Transmittance

Figure 1:
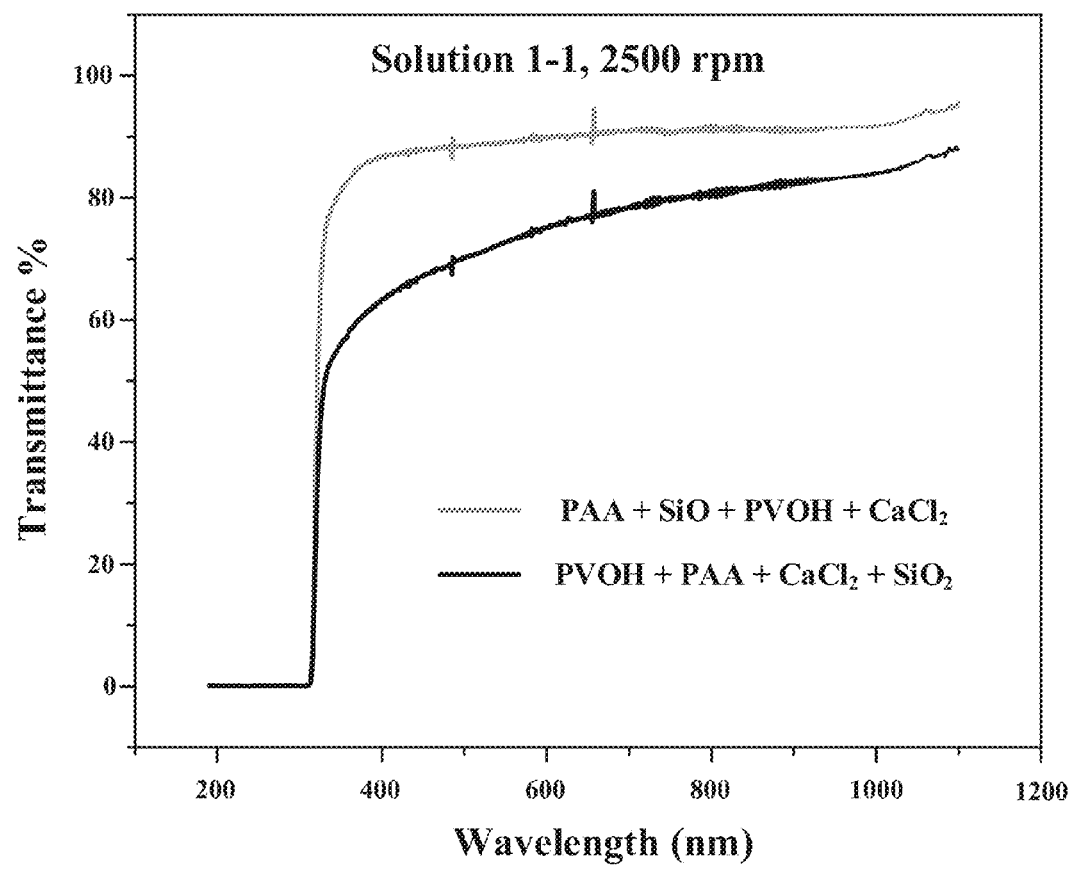
FIG. 1 shows different antireflective effects of hydrogels made using different adding sequences.

Two types of hydrogels were prepared using the same chemicals, namely PAA, PVOH, $CaCl_2$, and $SiO_2$, but where the chemicals were mixed in different sequences. As illustration of the compositions of this invention, the following two hydrogels were prepared. According to the first sequence, the chemicals were mixed in the following order. PAA followed by $SiO_2$, followed by PVOH, and finally $CaCl_2$. According to the second sequence, the chemicals were mixed in the following order: first PVOH, followed by PAA, $CaCl_2$, and finally $SiO_2$. These two hydrogels were then spin-coated, using a speed spin of 2500 rpm and a spin time of 1 minute. FIG. 1 illustrates the effect of the spin-coated films on their measured transmittance. Results show that the hydrogel made using the sequence PAA+$SiO_2$+PVOH+$CaCl_2$ exhibits a higher transmittance in the whole UV-Vis range, hence represented films with superior anti-reflective properties than the other hydrogel, but both still showed relatively high anti-reflective properties. The other film made from the hydrogel using the sequence PVOH+PAA+$CaCl_2$+$SiO_2$ has a lower transmittance in the UV-Vis range.

The observed difference in anti-reflective response of the spin-coated films results from the porous structure of the hydrogel. Thus, the porosity of the films are influenced by the sequence in which the chemicals are mixed together to form their corresponding hydrogels. In the case of the first sequence (PAA+$SiO_2$+PVOH+$CaCl_2$) shown in FIG. 1, the addition of $SiO_2$ nanoparticles prior to PVOH and $Ca^{2+}$ allowed the $SiO_2$ nanoparticles to get entrapped in a crosslinked polymer network composed of PAA-PVOH complex formed through H-bonding and PAA-$Ca^{2+}$-PAA complex or ionic cross-links formed through electrostatic forces. In such instance, the incorporation of $SiO_2$ nanoparticles into the crosslinked and hydrogen-bonded polymer network generates a porous structure, which lowers the effective refractive index of the film and makes it closer to 1.23, the ideal refractive index for anti reflection coatings when PET is used as substrate. In the case of the second sequence (PVOH+PAA+$CaCl_2$+$SiO_2$), the initial addition of PVOH to PAA prior to $CaCl_2$ and $SiO_2$ nanoparticles leads to a hydrogen-bonding network between PVOH and PAA. The addition of $Ca^{2+}$ cations to such a PAA-PVOH complex triggers the physical crosslinkage of negatively charged PAA. The subsequent addition of $SiO_2$ nanoparticles to such a crosslinked network is challenging as the $SiO_2$ nanoparticles cannot easily penetrate the polymer network, considering that the size of the particles of between about 9 and about 15 nm in diameter and 40 to 300 nm in length.

b) Effect of the Size of $SiO_2$ Nanoparticle on Transmittance

Figure 2:
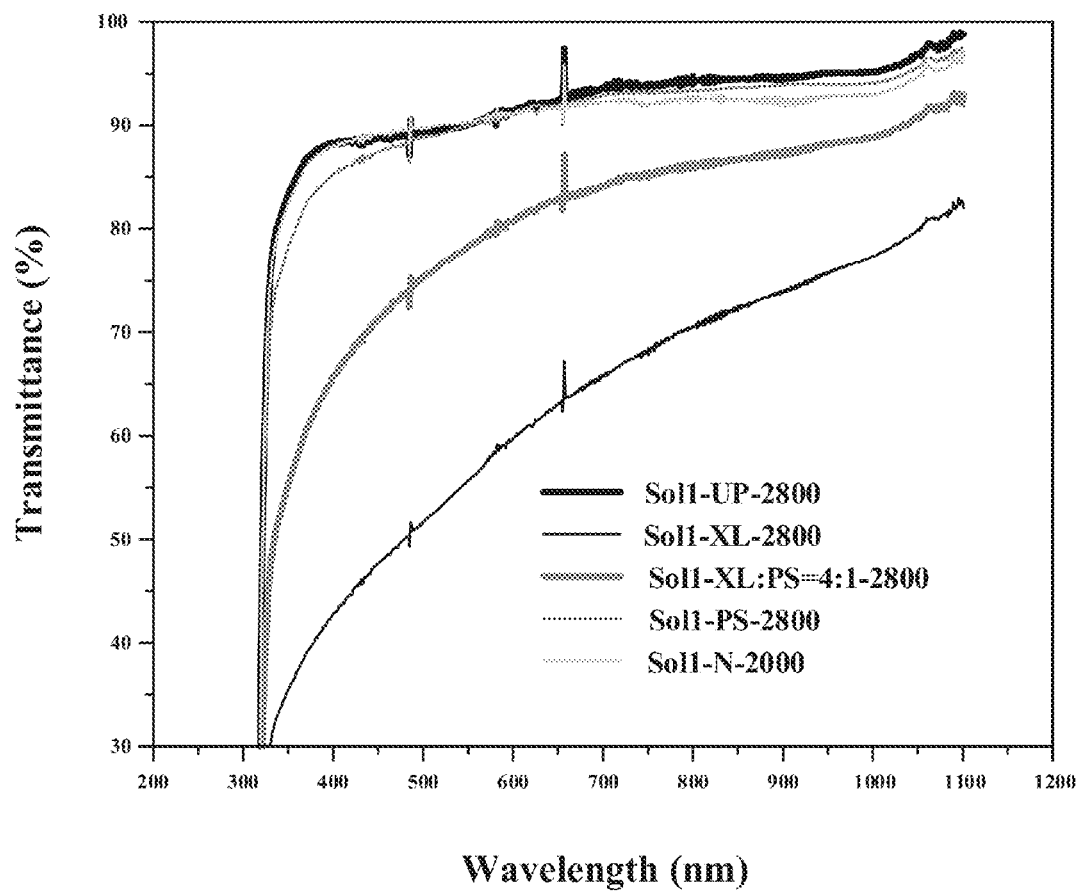
FIG. 2 shows the size effect of $SiO_2$ nanoparticles on antireflection films.

The effect of the size of $SiO_2$ nanoparticles on transmittance was examined on spin-coated films formed from hydrogels using the following preparation sequence: 1 mL of PVOH at 0.05 g/mL+1 mL of PAA at 0.0105 g/mL+1 mL of $CaCl_2$ at 0.1 g/mL, to which four different sizes of $SiO_2$ nanoparticles, namely 9 to 15 nm diameter and 40 to 300 nm length (ST-UP), 60 nm (ST-XL), 100 nm (ST-PS), and 10 to 20 nm (ST-N) were added. In addition, one hydrogel was composed of 1 mL of PVOH at 0.05 g/mL+1 mL of PAA at 0.0105 g/mL+1 mL of $CaCl_2$ at 0.1 g/mL, to which a mix of two different sized of $SiO_2$ nanoparticles were added, namely ST-XL and ST-PS in a ratio of 4:1. For all of these experiments, the spin coating speed is 2800 rpm and the spin time is one minute. FIG. 2 shows that hydrogels containing $SiO_2$ nanoparticles of size ST-UP (i.e., 9 to 15 nm diameter, 40 to 300 nm length), ST-PS (100 nm), and ST-N (10 to 20 nm) exhibit 10 to 15% higher transmittance in the range of 450-800 nm compared to the hydrogel with the mixture of ST-XL (60 nm) and ST-PS (100 nm); and 40 to 25% higher transmittance compared to the hydrogel with ST-XL only.

c) Effect of Spin Speed on Transmittance

Spin speed in spin coating was shown to be an effective factor to control the film thickness and solvent evaporation rate, and thereby an effective means to control the structure of the film. Five hydrogels (solution 1, 3, 4, 5, and 6) having different compositions as shown in Table 2 were used to examine the spin speed effect on the transmittance of spin-coated films. While various spin speeds were used, the spin time remained constant at one minute.

Figure 3:
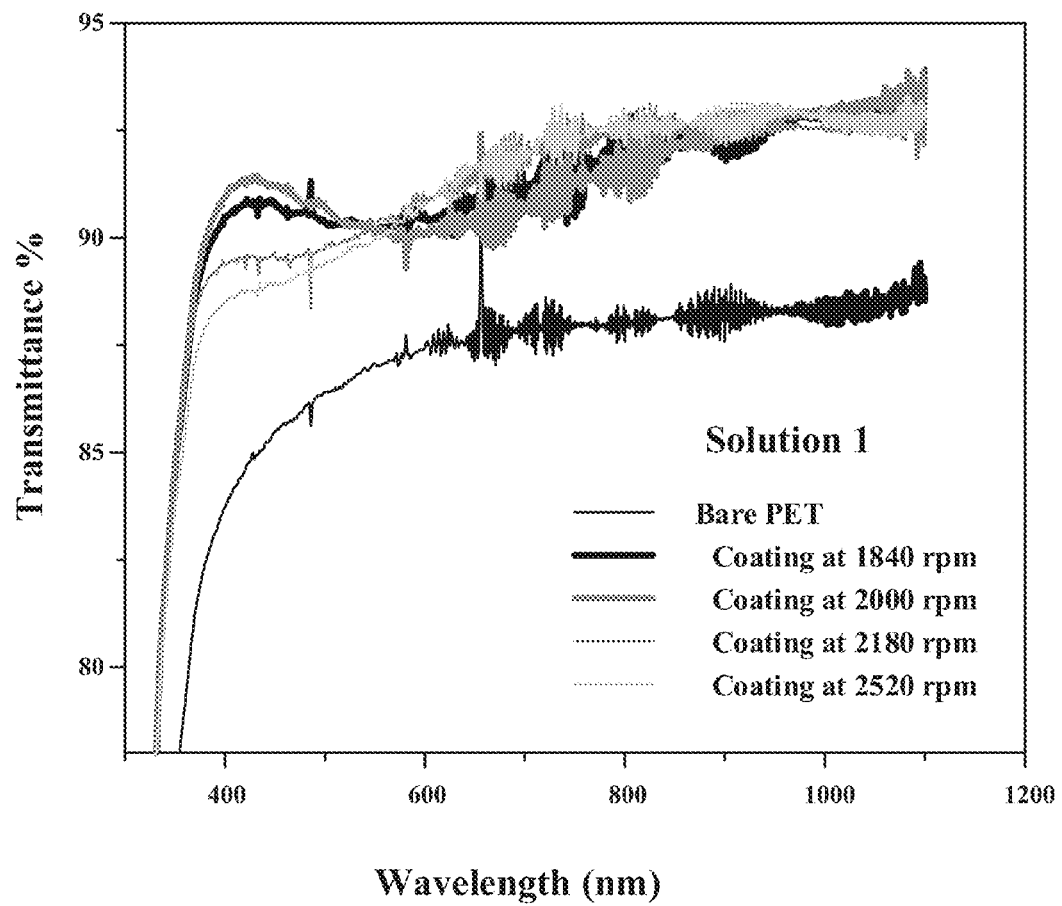
FIG. 3 shows the effect of spin speed on transmittance for Solution 1 from FIG. 2. The black curve shows the transmittance for bare PET.

FIG. 3 shows the transmittance obtained from a spin-coated film made of solution 1 at various spin speeds. The transmittance of bare PET was shown as reference. The results show that regardless of the spin speed, the transmittance of spin-coated films increased greatly in the UV-Vis range of 400-1000 nm compared to bare PET. The largest observed increase in transmittance is 4.6% and occurs at around 815 nm. Films made at 2180 rpm and 2520 rpm give similar transmittance and overall exhibit better anti reflective properties than the films made at 1840 rpm and 2000 rpm.

Figure 4A:
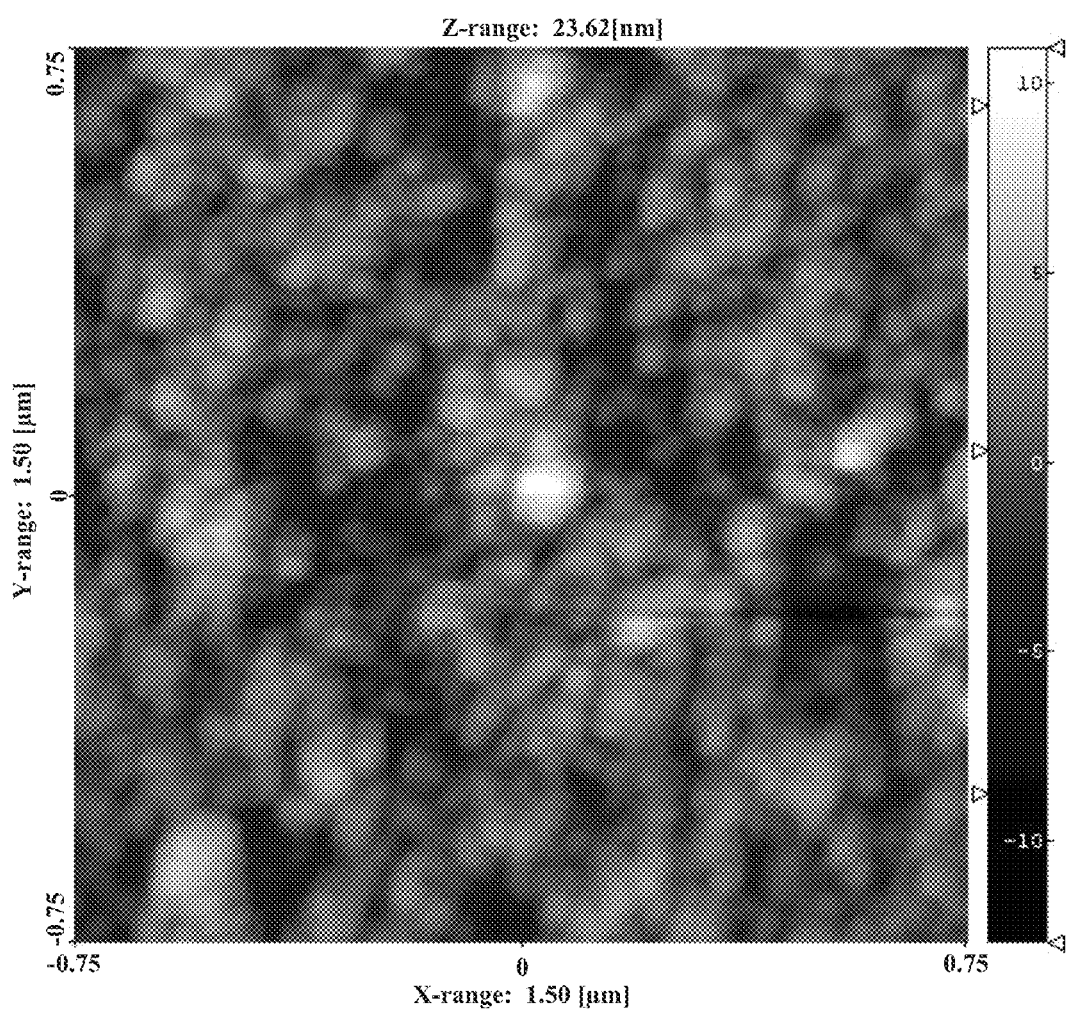
FIGS. 4A&B depict Atomic Force Microscopy (AFM) topography and phase images for the film spin coated for 1 min at 2000 rpm using Solution 1.
Figure 4B:
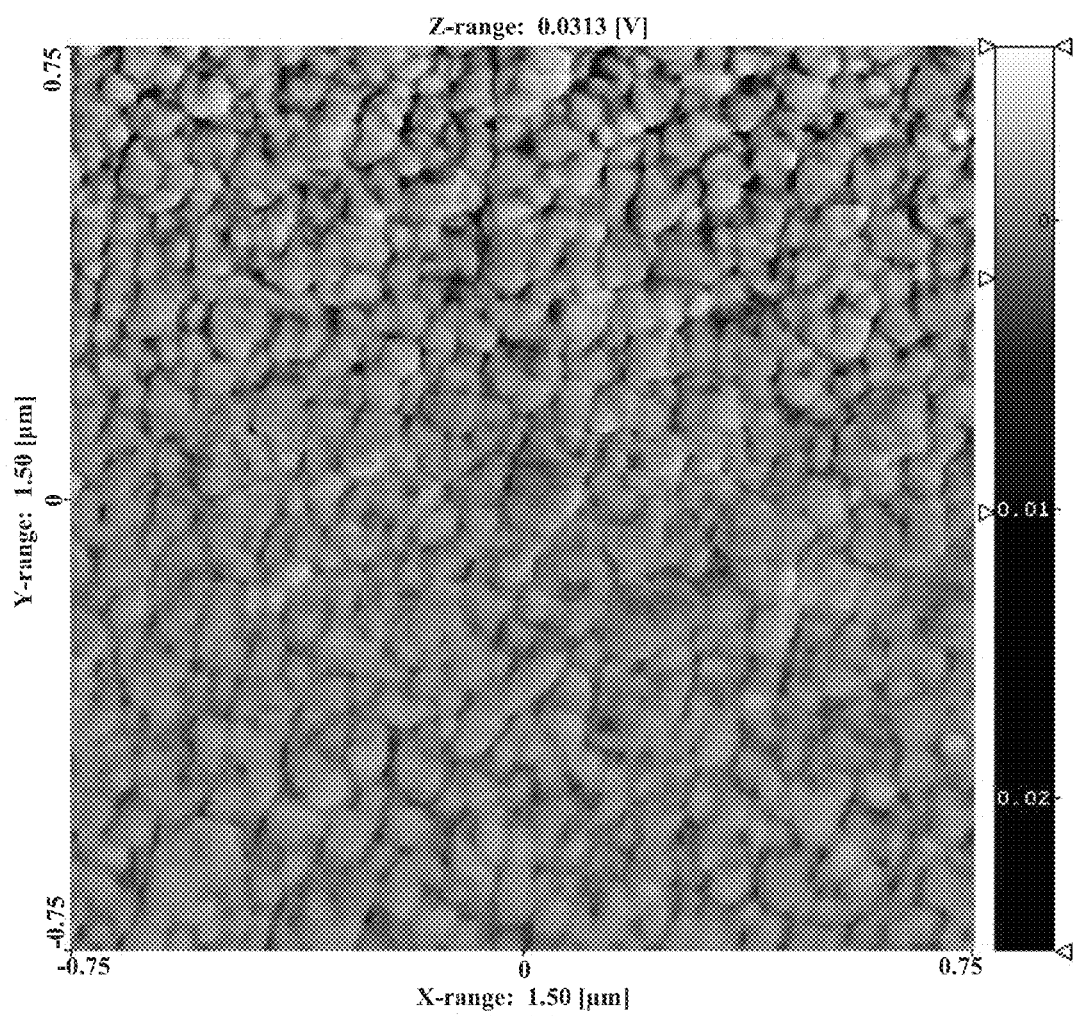
Figure 5A:
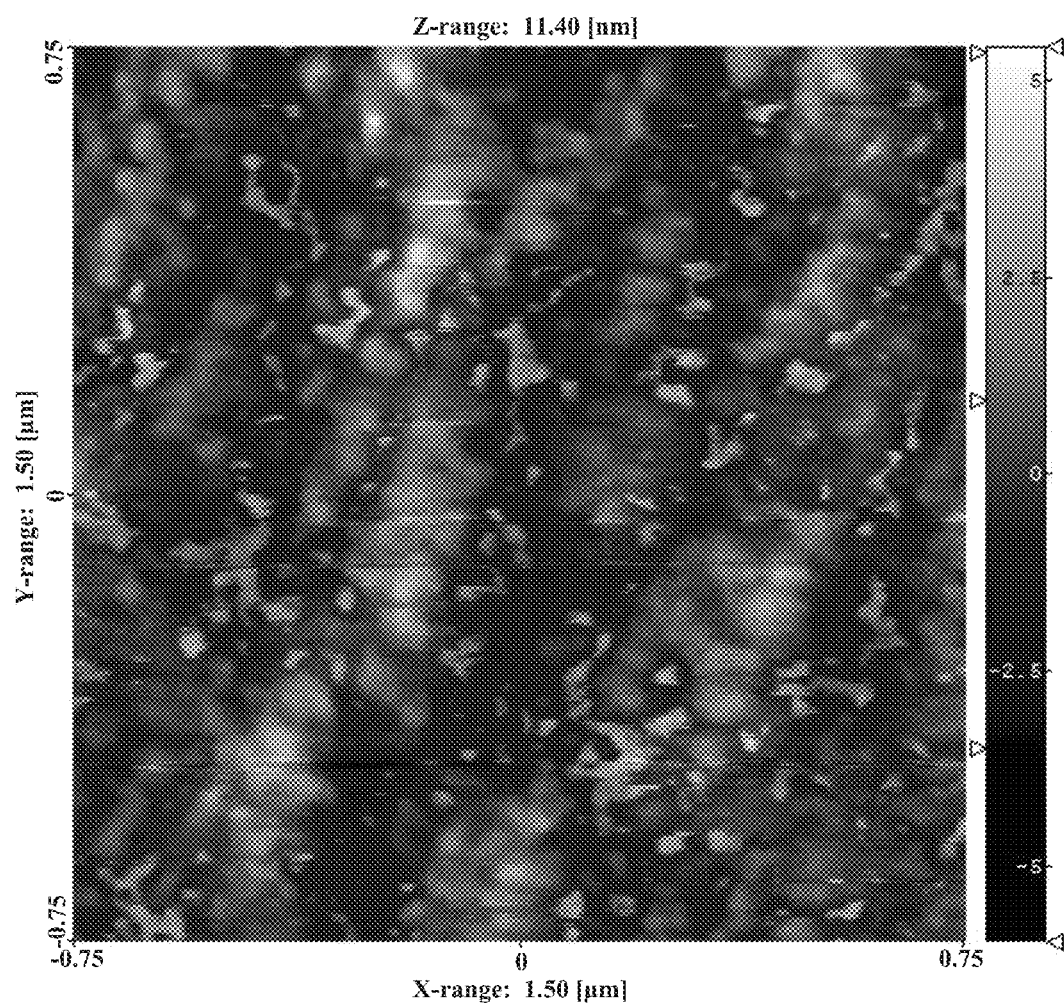
FIGS. 5A&B depict AFM topography and phase images for the film spin coated for 1 min at 2520 rpm using Solution 1 from Table 2.
Figure 5B:
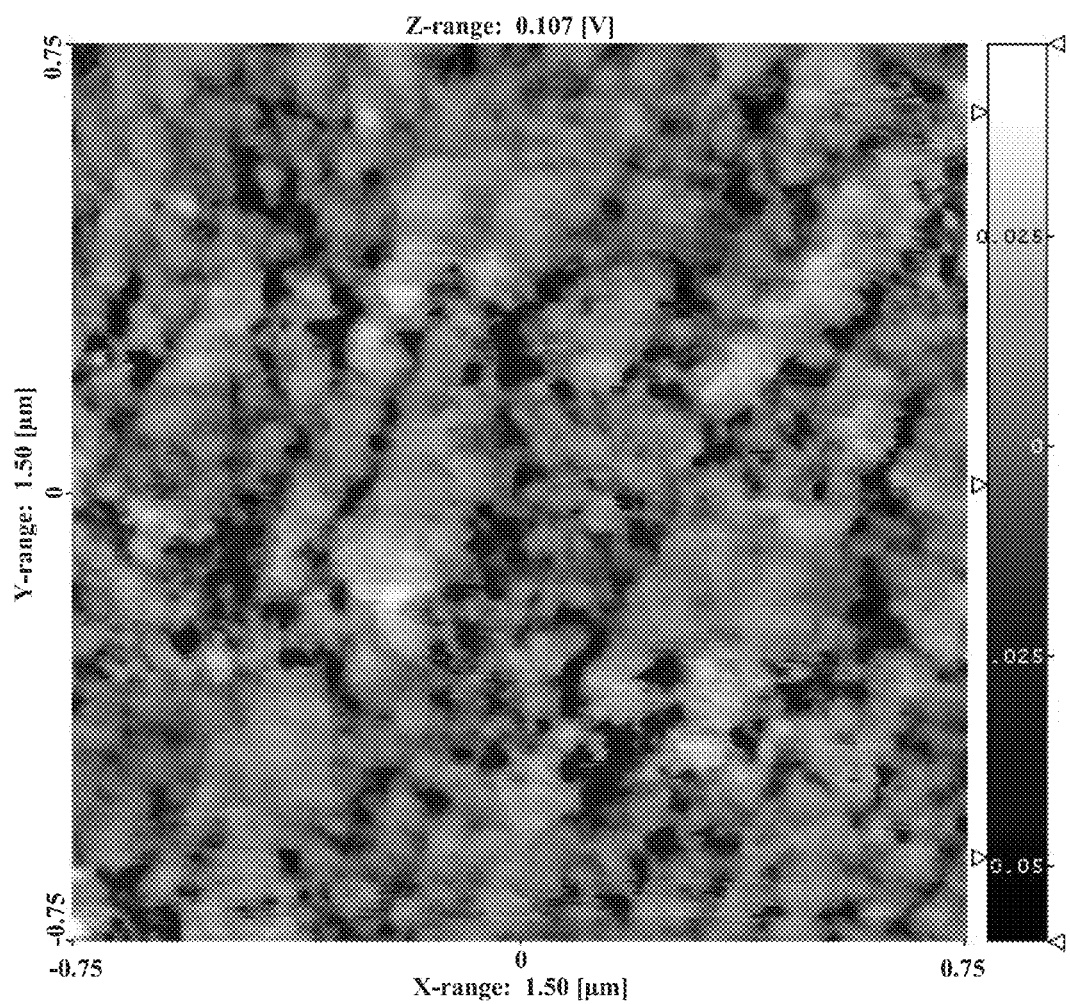
Figure 6A:
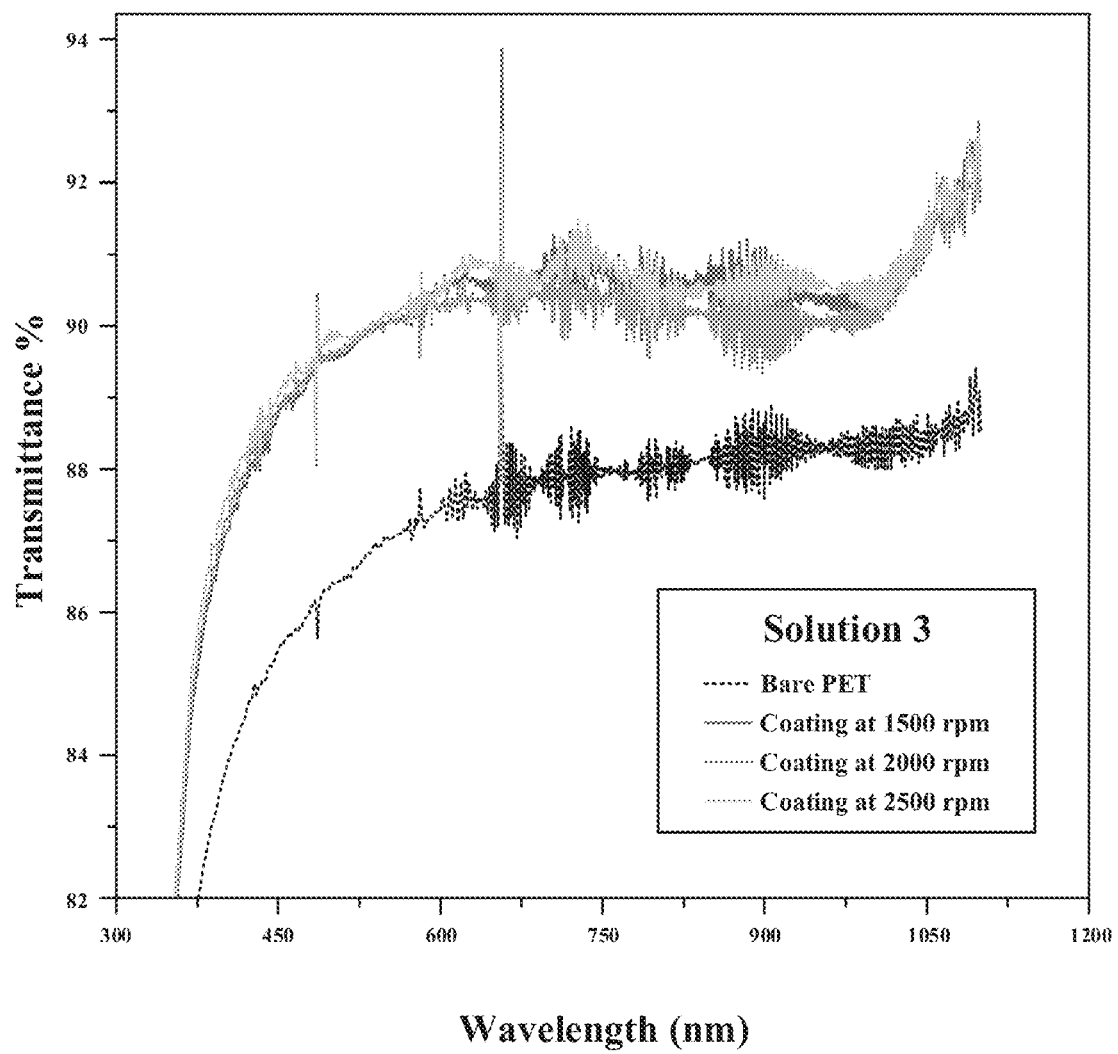
FIGS. 6A-D show the effect of spin speed on transmittance for different hydrogels. (A) Solution 3, (B) Solution 4, (C) Solution 5, and (D) Solution 6 from FIG. 2
Figure 6B:
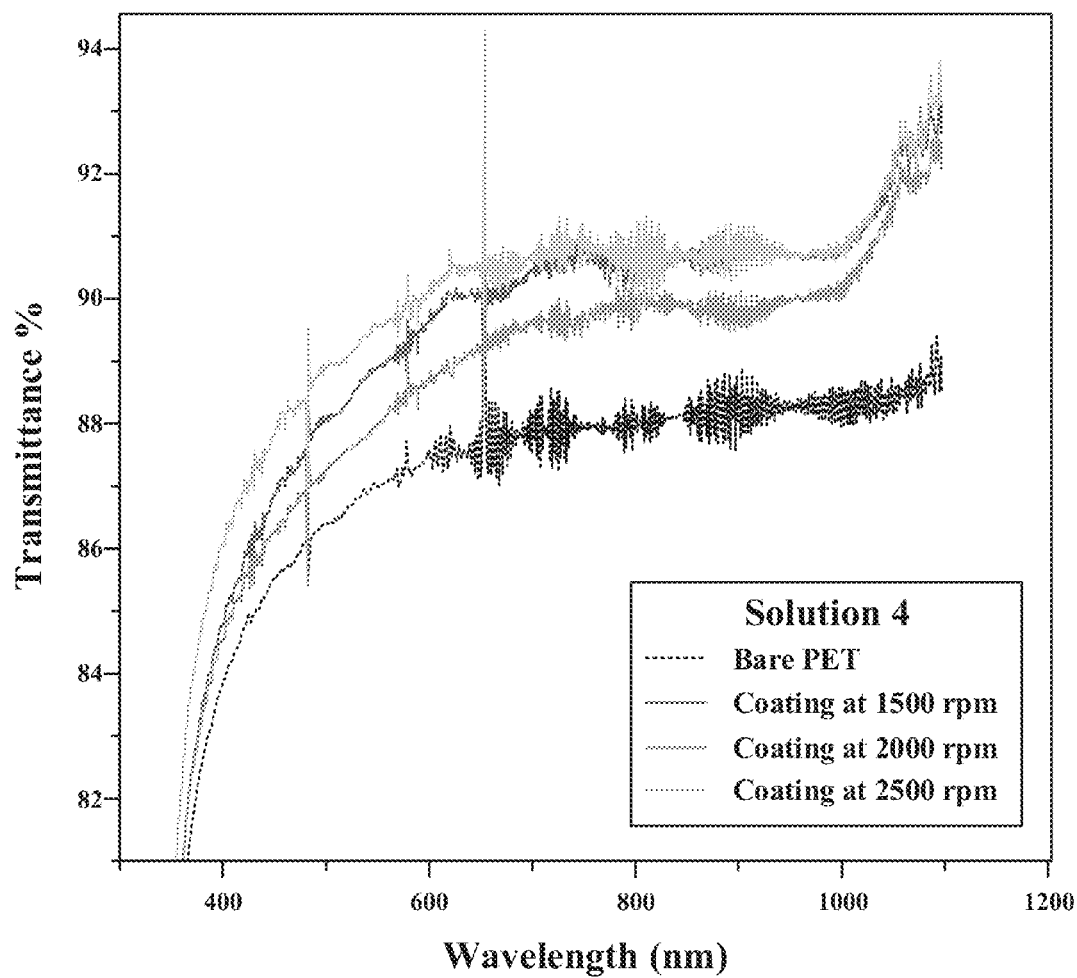
Figure 6C:
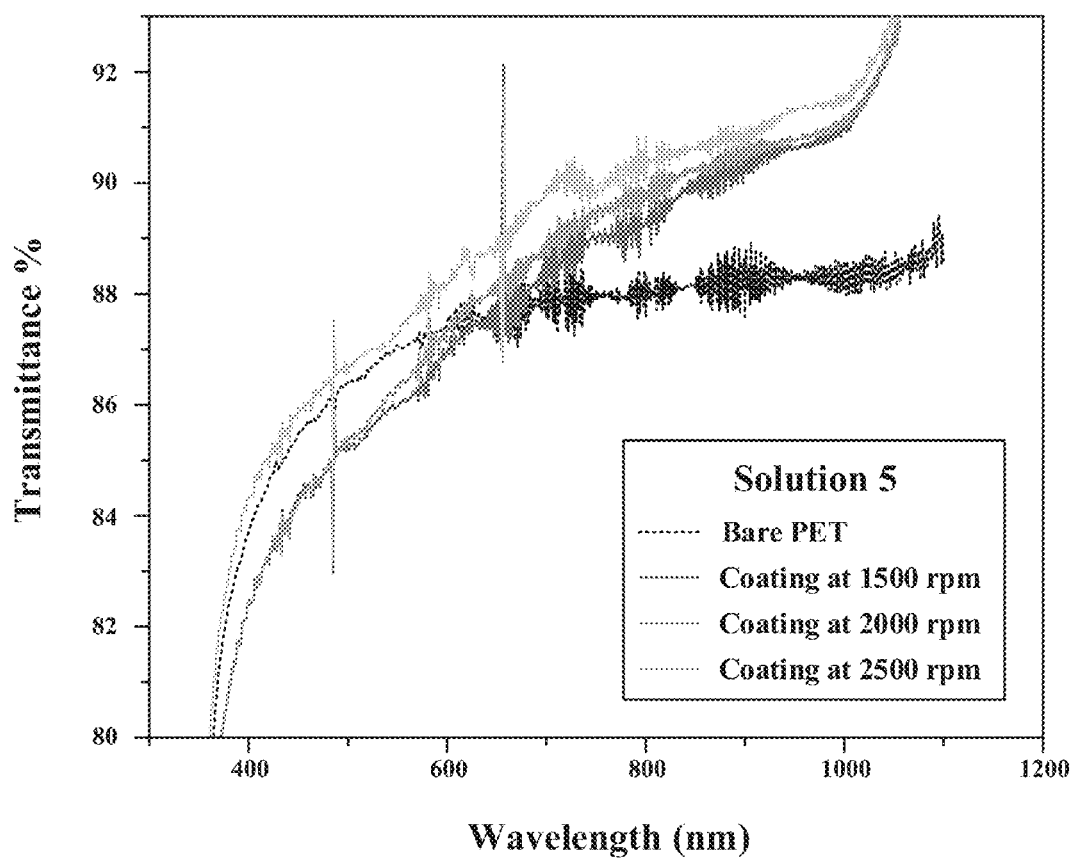
Figure 6D:
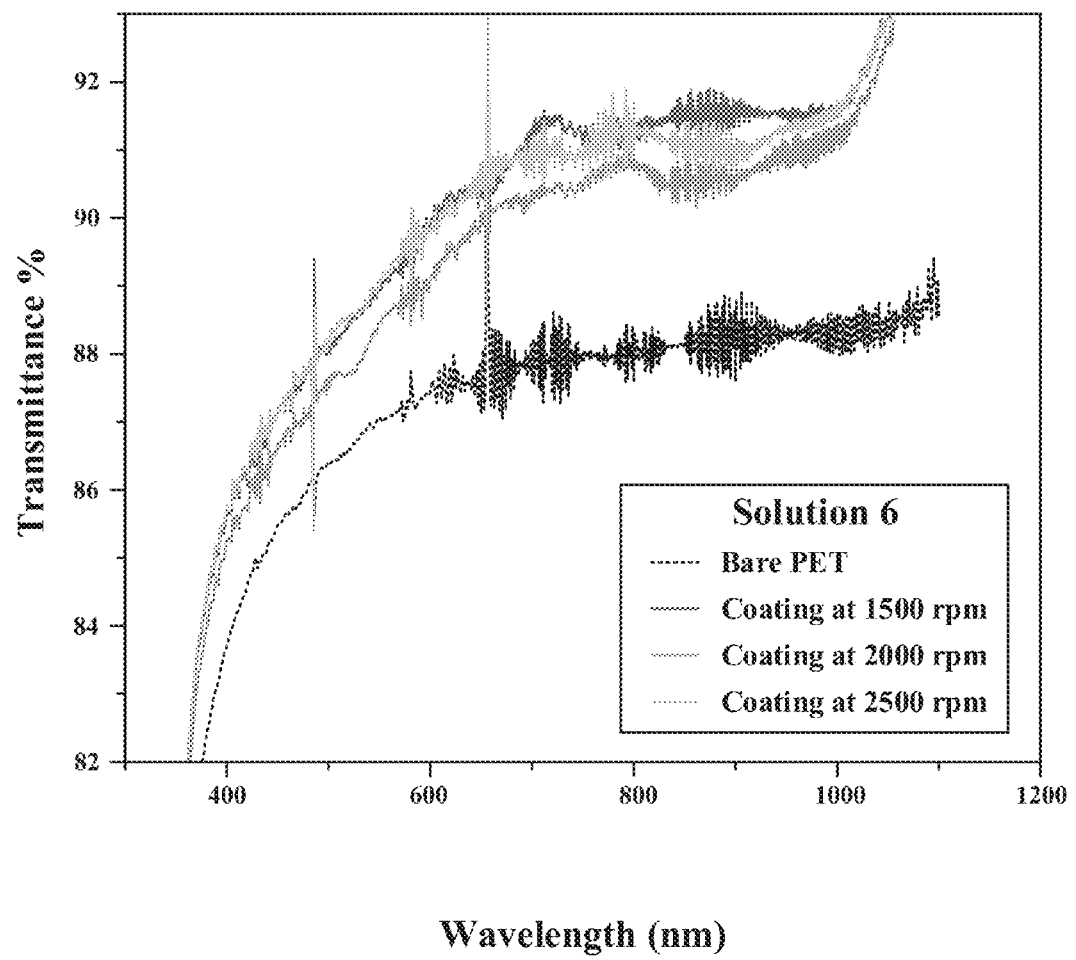

The topography and phase image for the film made of solution 1 at 2000 rpm was shown in FIGS. 4A&B, while those for the film made of same solution 1 at 2520 rpm was shown in FIGS. 5A&B. The root mean square (RMS) surface roughness for the film at 2000 rpm was 2.16 nm, while the RMS surface roughness for the film at 2520 rpm was 1.07 nm. It means that a higher spin speed leads to a flatter surface. The topography and phase images showed that nanosized domains with less porosity are observed at 2000 rpm. A more porous sponge-like structure is observed at 2520 rpm, which was consistent with the transmittance behaviors at 2520 rpm compared to that at 2000 rpm. The transmittance in the range of 600-800 nm at 2520 rpm was about 1 to 1.2% higher than that at 2000 rpm.

FIGS. 6A-D show the effect of speed spin on transmittance for different hydrogels made of solutions 3 to 6. In all cases, the best results in UV-Vis range were obtained at speed 2500 rpm, except for solution 6.

d) Effect of the Solution Composition at 2500 Rpm on Transmittance

Figure 7:
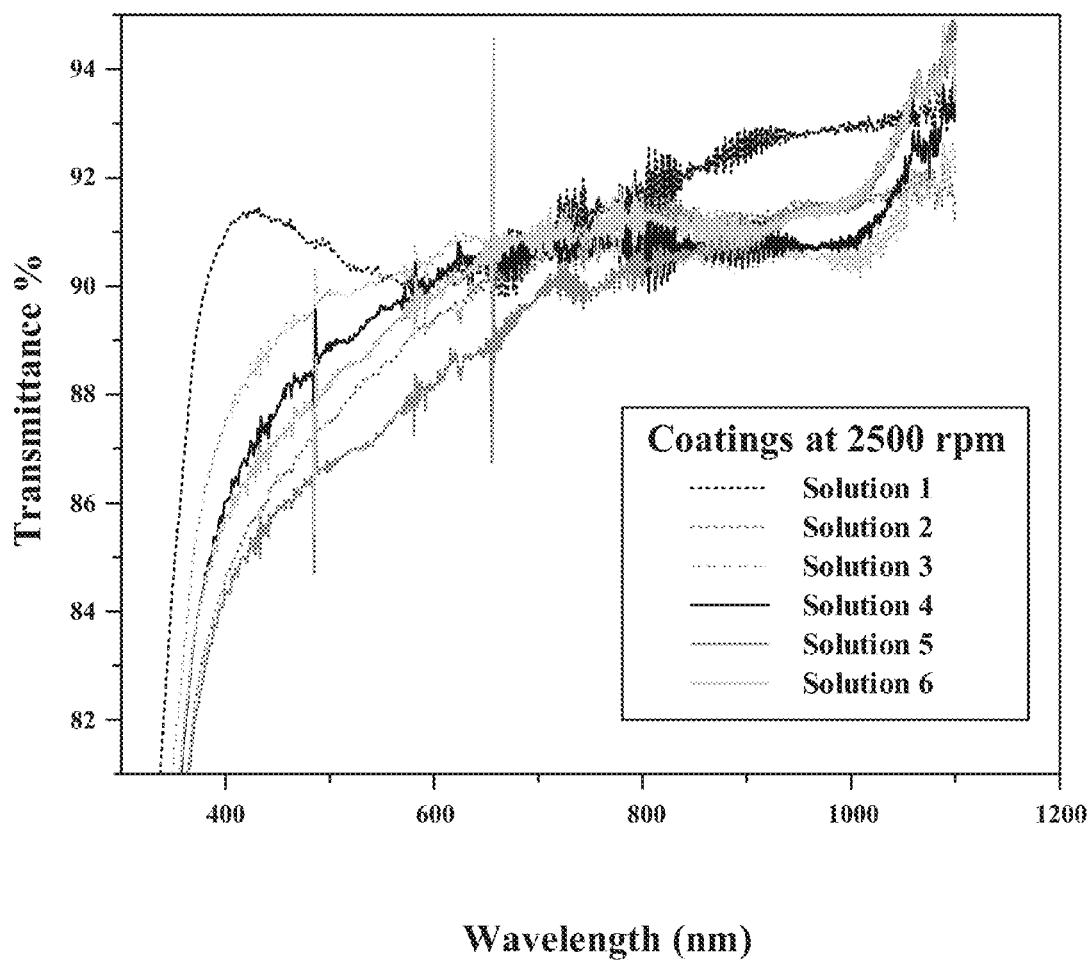
FIG. 7 shows the effect of composition on transmittance at 2500 rpm for various hydrogels, Solution 1 to 6 from Table 2.

FIG. 7 shows the effect of the solution composition on transmittance when films were spin-coated at 2500 rpm. The transmittance of the spin-coated film using Solution 1 behaves differently from all others. In the UV-Vis range, the transmittance of the film prepared from Solution 2 reaches its peak of 91.4% at 825 nm; for Solution 3, 90.0% at 630 nm; for Solution 4, 90.9% at 742 nm; for Solution 5, 90.7% at 876 nm; and for Solution 6, a peak of 91.3% appears at 794 nm. For Solution 1, the transmittance increases sharply up to 91.4% at 422 nm, slowly decreases to 90% at 579 nm, and then gradually increases again to 92.6% at 900 nm. In a range of 400 nm to 700 nm, the best transmittance is obtained using Solution 1, while in the range of 600 nm to 800 nm, Solution 6 exhibits the best transmittance.

Second Embodiment

Another embodiment of the present invention includes a general procedure for the physical crosslinking of polyacrylic acid (PAA) using $Al^{3+}$ cations as reagent. Positively charged trivalent $Al^{3+}$ cations induce physical crosslinking of negatively charged PAAs, and also attracts negatively charged $SiO_2$ nanoparticles. Compared to $Ca^{2+}$, $Al^{3+}$ renders a larger probability of crosslinking to the three PAA chains by a single Al metal ion. As a result, it created a more complicated three dimensional crosslink network where $SiO_2$ nanoparticles were wrapped inside, as well as with the PVOH hydrogen-bonding with PAA.

Example 2

In the following experiment, $SiO_2$ nanoparticles of size 7 to 9 nm in diameter were used to prepare the hydrogels and was referred to as D solution as shown in Table 1. An $AlC_3$ solution at a concentration of 0.1 g/mL is used as the original $Al^{3+}$ source, and is referred to as solution C. A and B solutions shown in Table 1 were used to prepare different silica incorporated PAA and PVOH hydrogel composition. The sequence for adding components to make the hydrogel was the same as described above, namely by adding PVOH to PAA first, followed by $SiO_2$ nanoparticles, and then Al metal ions.

a) Effect of the Cation on the Physical Crosslinking of PAA

Figure 8A:
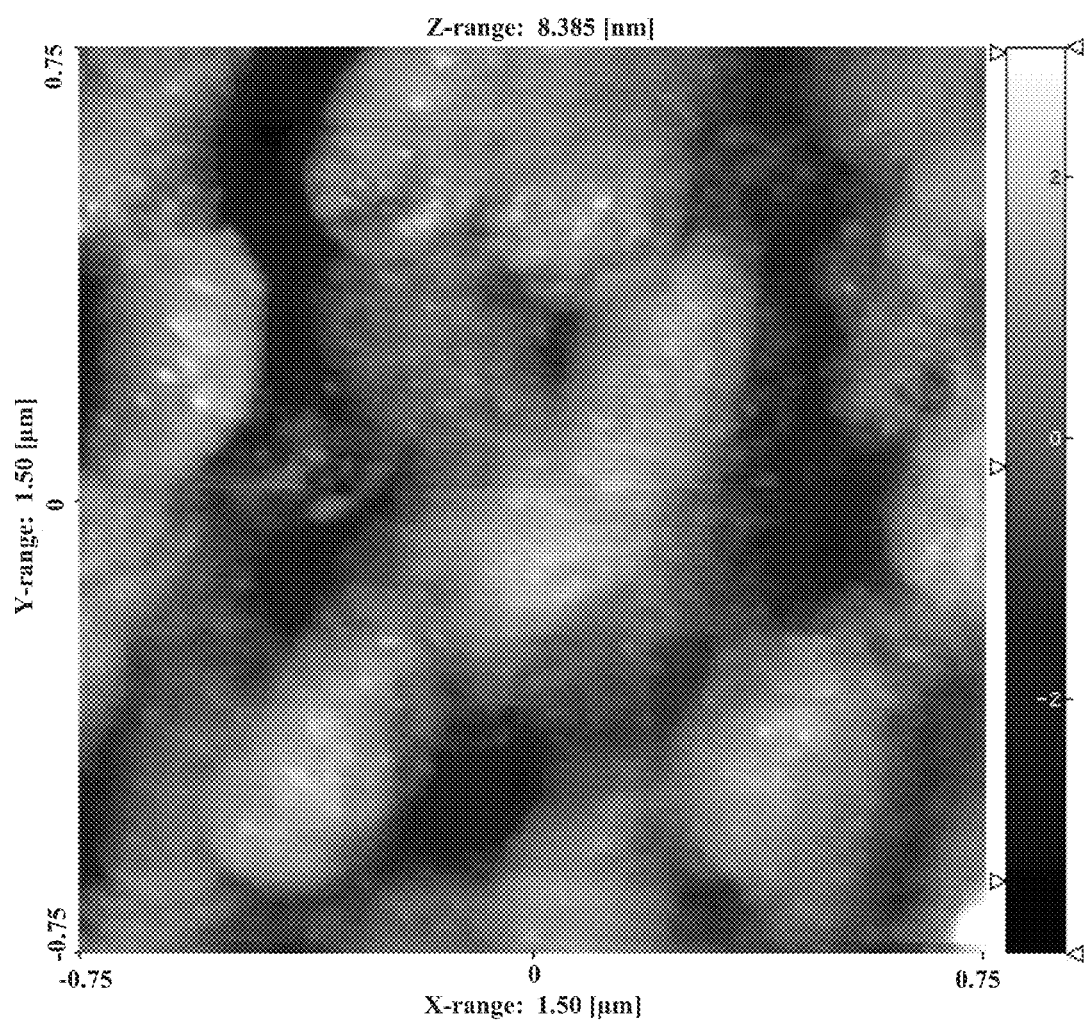
FIGS. 8A&B depict AFM topography and phase images for the film spin coated for 1 min at 2000 rpm using $Al^{3+}$ as the physical crosslinking reagent of PAA.
Figure 8B:
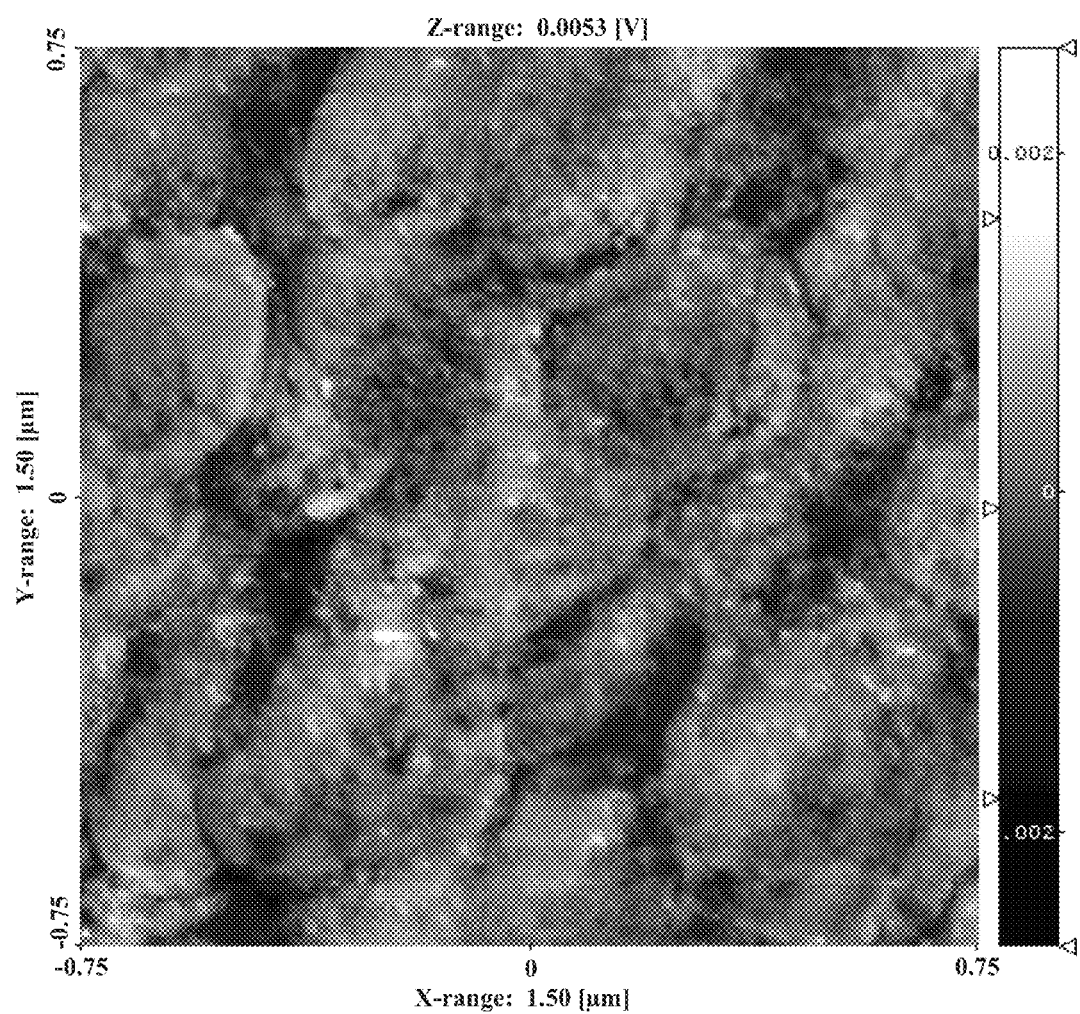

FIGS. 8A&B shows the AFM topography and phase images for films obtained from spin coating using the following hygrogel made in the following sequence: 1 mL of PVOH at 0.05 g/mL+1 mL of PAA at 0.0105 g/mL+1 mL of $AlCl_3$ at 0.1 g/mL and 1 ml of $SiO_2$ (size 7 to 9 nm) at 0.05 g/mL solution A. A spin speed of 2000 rpm and a spin time of one minute were used for spin coating. A smaller RMS surface roughness of 0.985 nm was obtained when $Al^{3+}$ is used as crosslinking reagent, compared to the film of the same chemicals using $Ca^{2+}$ cations as crosslinking agents. A smaller RMS value indicates a flatter surface. Moreover, the topography of $Al^{3+}$ film shows significantly larger domains than those formed when $Ca^{2+}$ was used as crosslinking reagent. The phase images indicate that the polymer network formed with $Al^{3+}$ as crosslinking reagent has a looser structure compared to that formed with $Ca^{2+}$. This looser structure generates more nanosized pores.

b) Effect of Spin Speed on Film Porosity

Figure 9A:
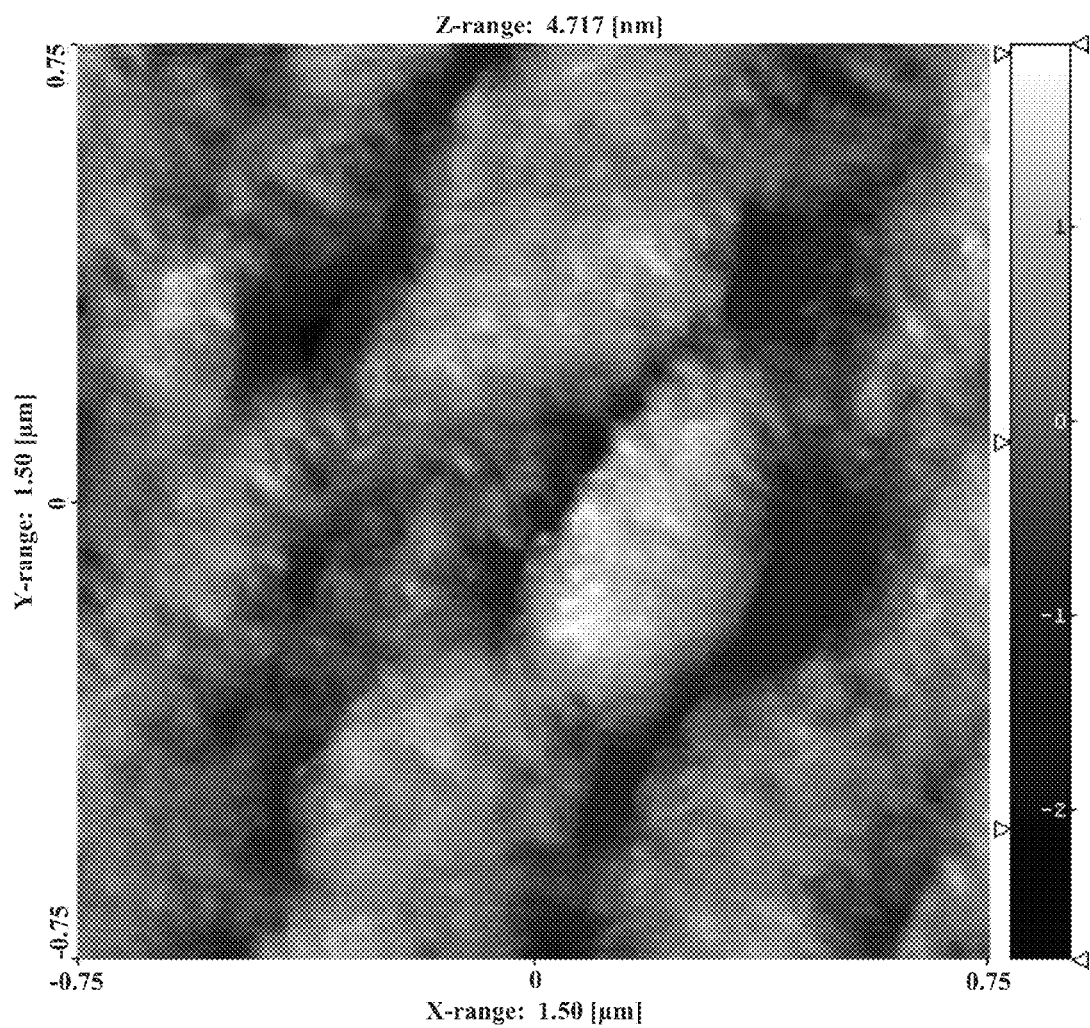
FIGS. 9A&B depict AFM topography and phase images for the film spin coated for 1 min at 3500 rpm using $Al^{3+}$ as the physical crosslinking reagent of PAA.
Figure 9B:
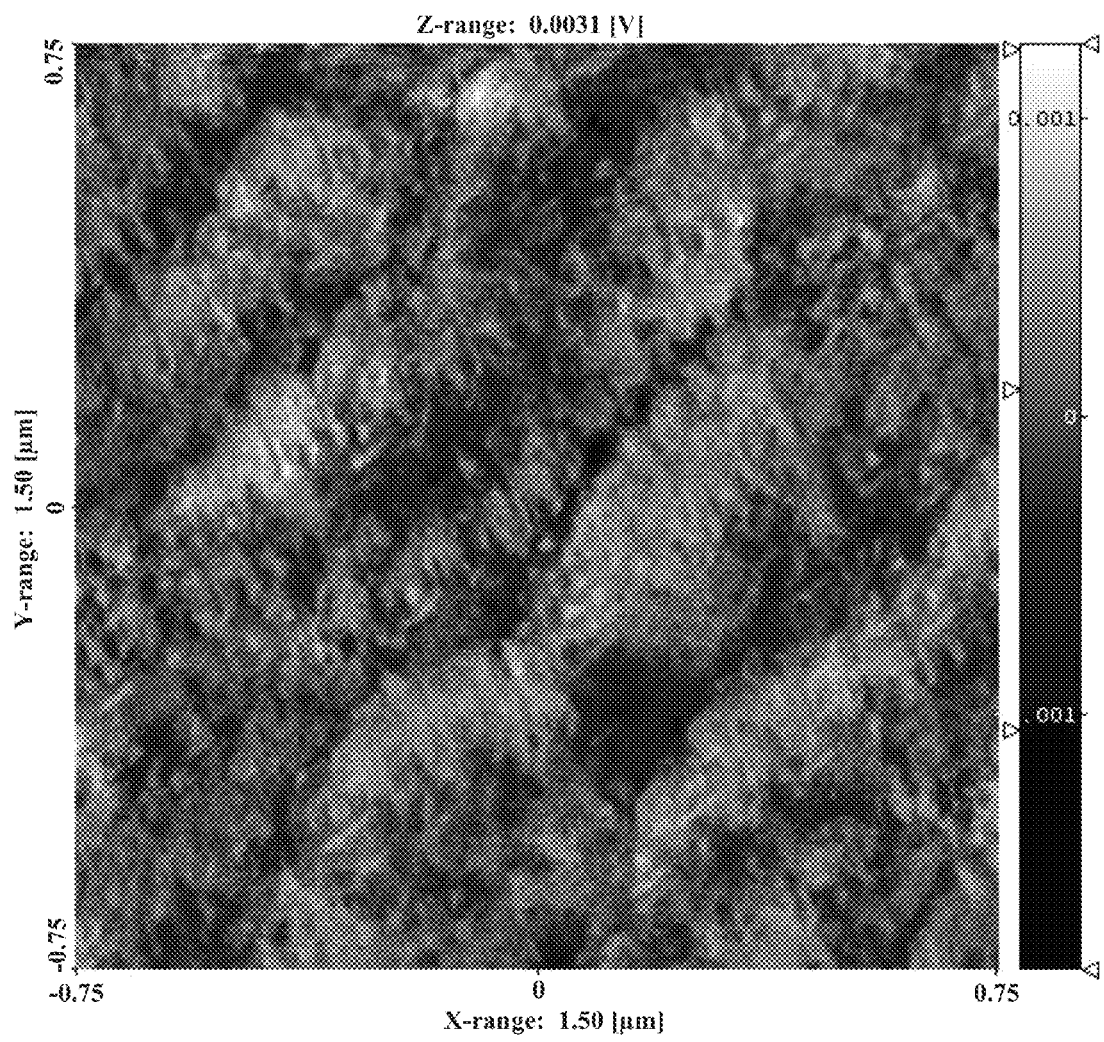
Figure 10:
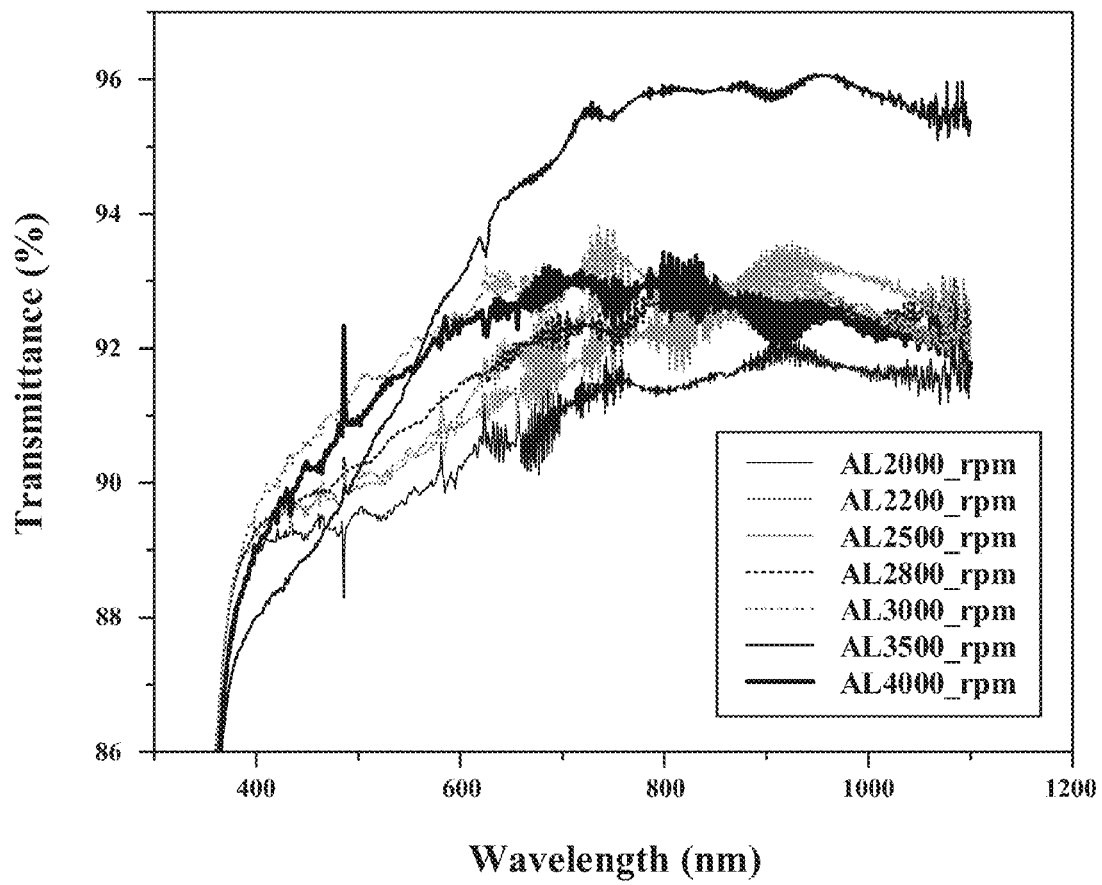
FIG. 10 shows the effect of spin speed on transmittance for $Al^{3+}$ polymer network FIGS. 11A&B show the effect of different spin speed on transmittance of the films using a 4:1:2:1 (PAA:PVOH:$SiO_2$:$Al^{3+}$) hydrogel.

FIGS. 9A&B shows the AFM topography and phase images for the same film, that is 1 mL of PVOH at 0.05 g/mL+1 mL of PAA at 0.0105 g/mL+1 mL of AlCl3 at 0.1 g/mL and 1 ml of $SiO_2$ (size 7 to 9 nm) at 0.05 g/mL when the hydrogel was spin coated at a higher speed, namely 3500 rpm. Results showed that the RMS surface roughness is 0.573 nm, which was almost half the value of that obtained with the same film formed at 2000 rpm. As seen from the topography and phase image, the edges of the large domains blurs out compared to the film obtained at 2000 rpm. The phase image as shown in FIG. 10 also shows a fiber-like porous network structure when the film is made at a speed of 3500 rpm.

c) Effect of the Hydrogel Composition on Transmittance and Spin Time

Different volume ratios of $PAA:PVOH:SiO_2:Al^{3+}$ results in films of different porosity. Films of various PAA:PVOH:$SiO_2:Al^{3+}$ or A:B:C:D ratios 2:2:3:1, 2:2:4:1, 2:2:3:2, 3:1:2:1, 3:2:3:2, and 3:3:1:1 were used. The film with the highest porosity was found when the ratio for A:B:C:D is 4:1:2:1. Other possible ratios and compositions are possible depending on the processability and property to be optimized.

Figure 11A:
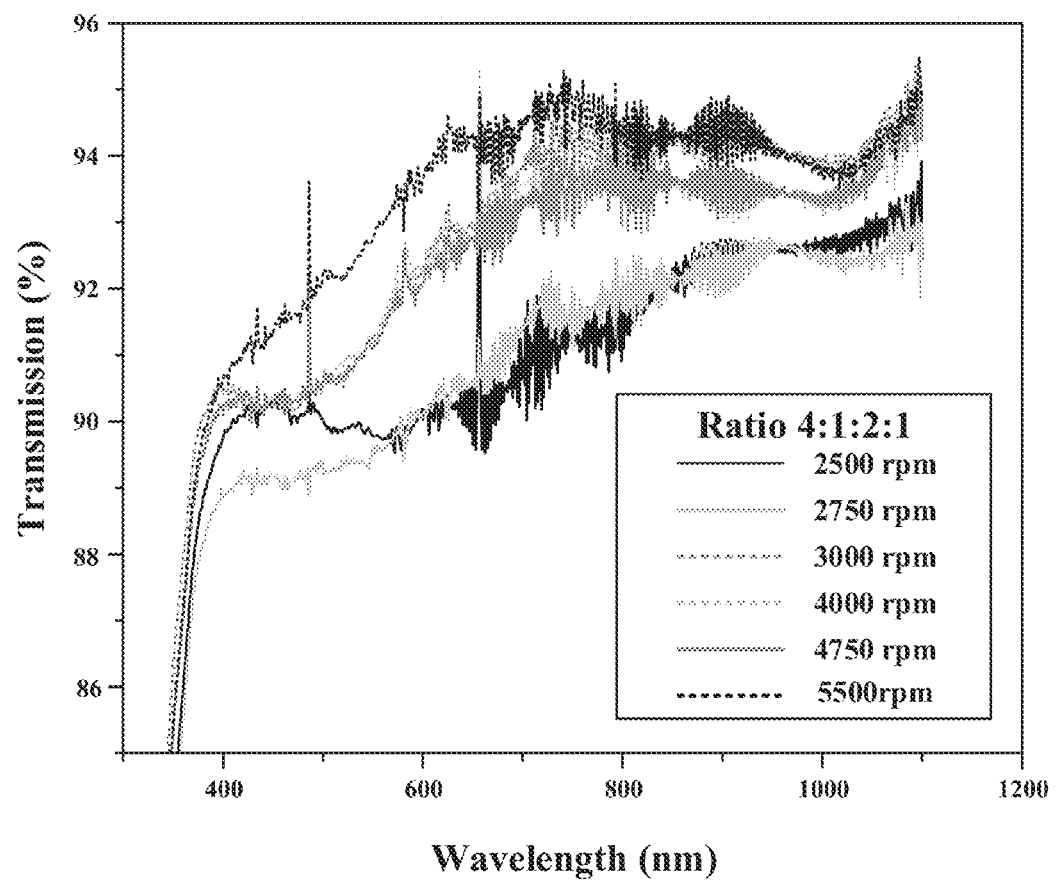
Figure 11B:
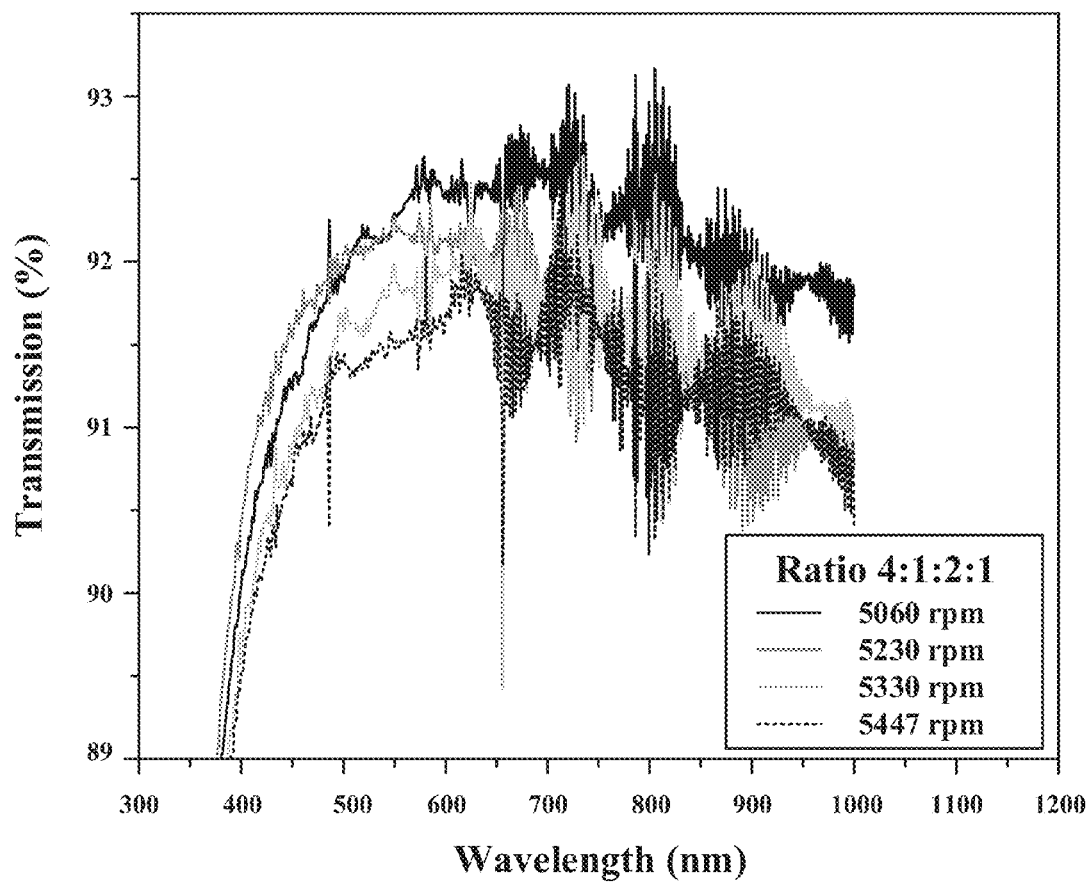

Hydrogels of volume ratio A:B:C:D=4:1:2:1 were used to form films at various spin time, namely 15 seconds, 45 seconds, and 1 minute. Results show that a spin time of one minute exhibits the best transmittance response. Overall, the results show that films that exhibit the best anti reflective properties were obtained under the following conditions: 1) hydrogel composition is $PAA:PVOH:SiO_2:Al3^+$ at a ratio of 4:1:2:1, and 2) spin time was one minute. Using these film composition and spin time, FIG. 11B shows that optimal transmittance was obtained when the spin speed was 5060 rpm.

d) Effect of the Number of Film Layers on Transmittance

Figure 12A:
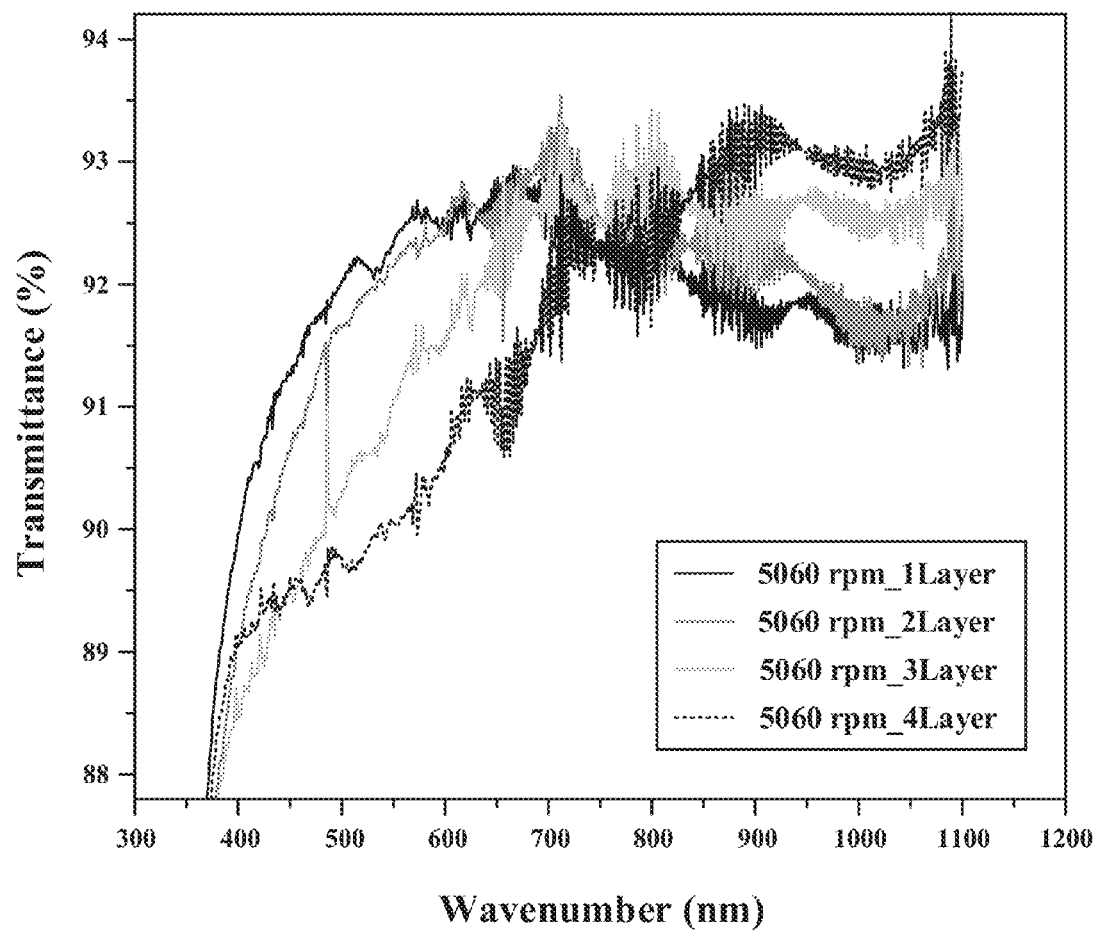
FIGS. 12A&B show (A) the effect of different number of layers on one side of the PET slides on transmittance, and (B) the effect of one-side coating and two-side coating on PET slides on transmittance.

Using hydrogels of composition $PAA:PVOH:SiO_2:Al3^+$ at a ratio of 4:1:2:1, films were made by spin-coating with an increasing number of layers. FIG. 12A shows the effect of the number of layers (all deposited on the same side of the PET substrate) on transmittance. The number of layers was gradually increased from one to four layers. Results show that the maximum transmittance barely increases as the number of layers increases. Red shifts of the maximum transmittances were observed from 668 nm to 712 nm, then 712 nm and 895 nm as the layer number was gradually increased from one layer to four layers. The 3-layer and 4-layer coating showed a drastic decrease in transmittance in a range of 360-700 nm. The best transmittance in the 400-800 nm region was obtained with the 1-layer and 2-layer coatings.

Figure 12B:
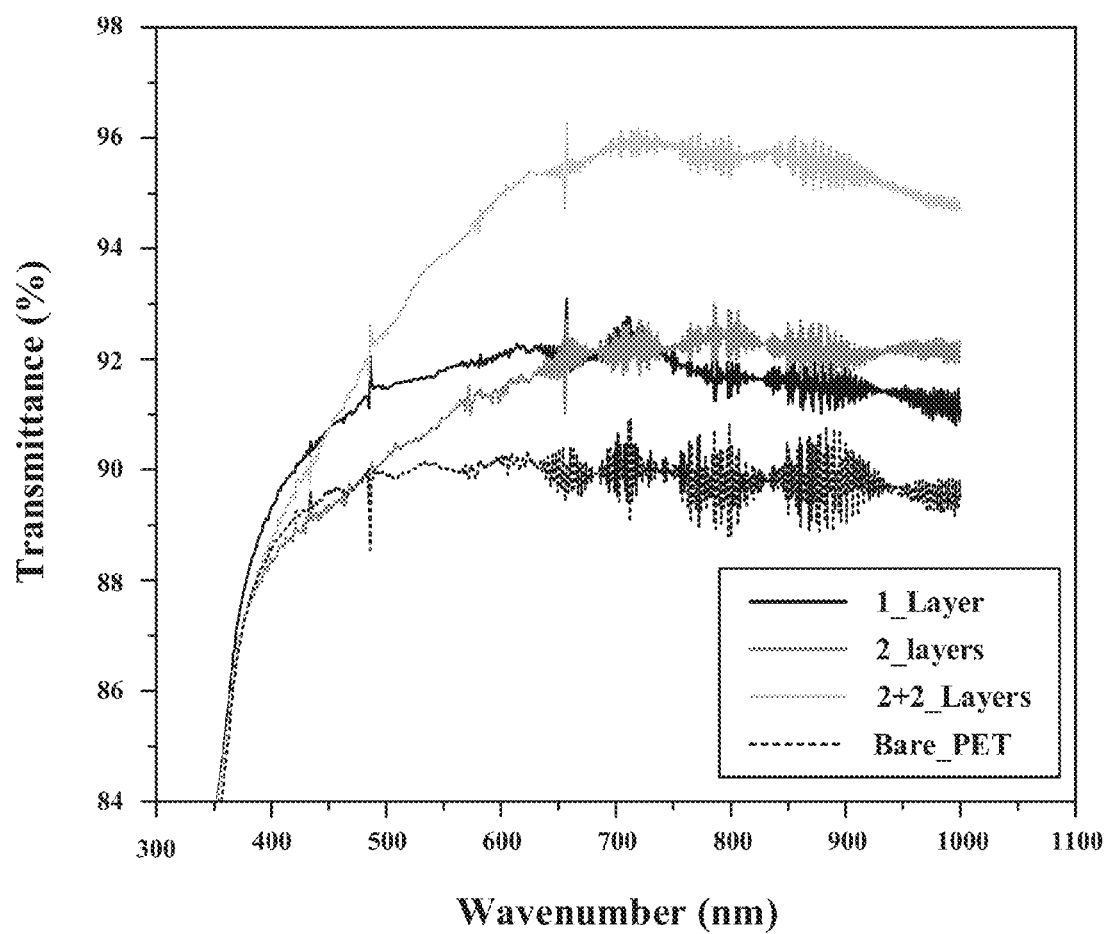

FIG. 12B shows the effect of one-side coating and two-side coating (on PET substrate) on transmittance. The increasing of number of layers on one side of PET slide produces a red shift of the maximum transmittance, as well as a decrease in transmittance in the range of 350-660 nm. However, a large increase of 3.4% in the maximum transmittance was obtained when additional two layers were coated on the other side of the PET substrate. The wavelength range of increase in transmittance by adding two layers on the other side of PET slides spans from 450 to 1000 nm and higher.

e) Effect of Ethyl Alcohol and Isopropyl Alcohol

Figure 13A:
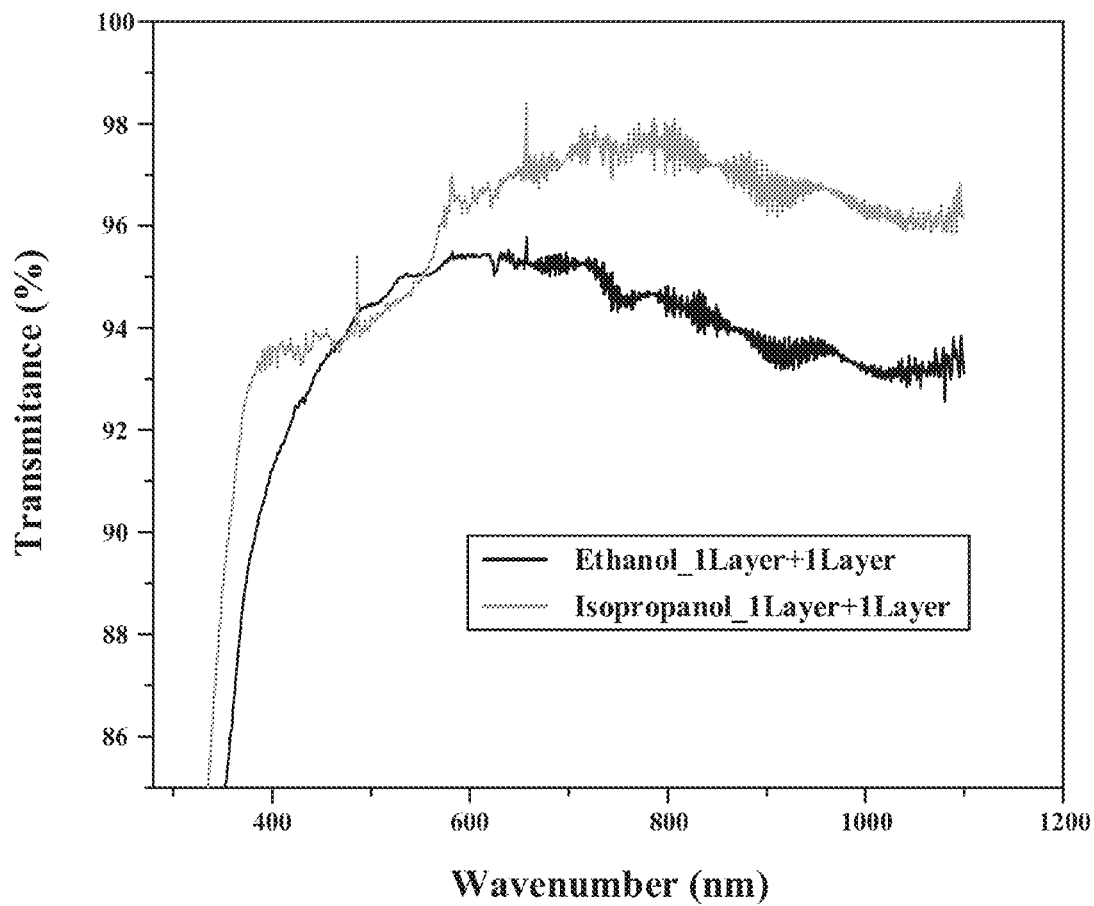
FIGS. 13A&B show (A) the effect of adding ethyl alcohol and isopropynol on the transmittance of two-side coatings on PET slides, and (B) the effect of one-side coating and two-side coating on transmittance using isopropanol.
Figure 13B:
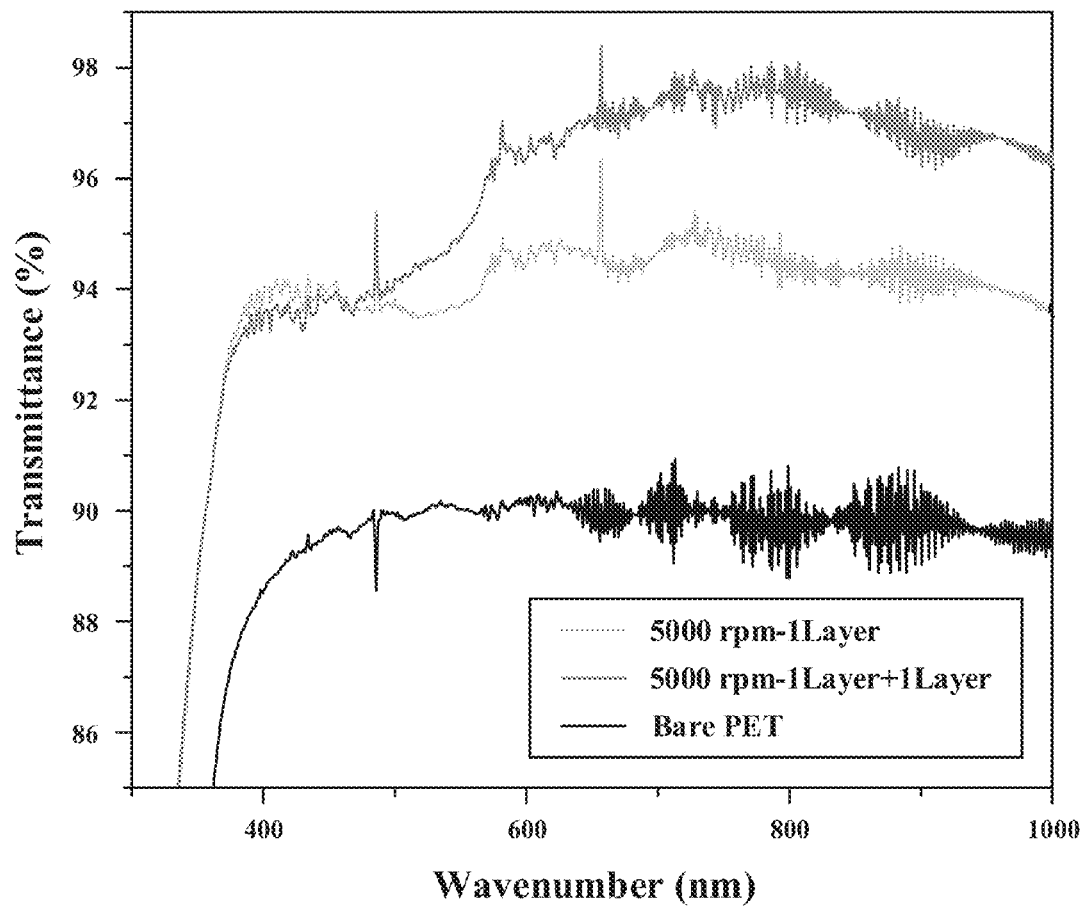

Either ethyl alcohol or isopropyl alcohol can be incorporated into hydrogels of composition $PAA:PVOH:SiO_2:Al3^+$ at a ratio of 4:1:2:1 in order to accelerate water evaporation, leading to the formation of films of higher porosity. FIG. 13A shows a comparison of the transmittance when both sides of the PET substrate are coated with the film. Results show that the transmittance of the film made from the hydrogel containing isopropyl alcohol was greatly increased over the range of 570 to 1000 nm, compared to the film containing ethanol. A 2.3% increase in the maximum transmittance was observed. FIG. 13B shows a comparison when one side and then two sides of the PET substrate were coated with the same hydrogel containing isopropanol. In both cases, the transmittance greatly increases compared to a film made under the same condition but with no isopropanol. An increase of 3.1% in maximum transmittance was observed when one layer of a film containing isopropanol was deposited on one side of the PET substrate. The largest transmittance (95%) was obtained with a single-side coating. The average transmittance over the range of 400 to 900 nm was above 94%. Another increment of 2.8% in transmittance was obtained by adding another layer to the other side of the substrate, in which 97.7% maximum transmittance at about 800 nm was observed.

Section II

Experiments of Section II

Example 3

This example illustrates the formulation and fabrication of an ATR film of this invention with an additional post-film formation cross-linking step and or dissolution of particle template. In this case, a polyacrylic acid benzophenone (PAA-BP) derivative was used as well as polystyrene (PS) particle for void space templating by dissolution. It should be recognized that other crosslinkers or crosslinking mechanisms are possible. It should be also recognized that other dissolution or template particle destruction methods are possible.

The hydrogel solution for ATR coating was prepared by mixing the following solution according to the desired volume ratio and addition sequence: 2 mg BP-PAA/8 ml Water (Milli-Q, 18MW), solution of silica particles (Snowtex-PSS, 100 nm particle size), and 1 g aluminum chloride in 10 mL Milli-Q water us one composition. These solutions were freshly prepared separately in small vials (20 mL). For the other film, PAA (0.105 g/10 mL Milli-Q water) was used instead of BP-PAA. The polystyrene (PS) particles (100 nm) were also added in the hydrogel formulation for making some of the ATR film, and its concentration was 0.125 wt. % in water.

The ATR coating was prepared by spin coating (P6000 Spin Coater, Speedline Technologies) for 60 seconds the hydrogel solution using a bare PET, which was plasma treated after sonicating in acetone, ethanol and Milli-Q water for 15 minutes each. The rotation speed (rpm) of the spin coating was varied. Prior to UV measurements, the spin coated film was completely dried naturally under ambient conditions. For the film with BP-PAA, it was photo cross-linked by means of UV irradiation with varying time. All irradiation experiments were performed with filter at a distance of 15 cm using an Oriel Hg—Xe lamp with a typical power of 50 mW/cm$^2$. This step was then followed by UV transmittance measurements of the film.

Example 4

This example illustrates UV transmittance measurements of the film of Example 3 or films prepared according to Example 3.

All UV measurements were performed in PET under dry and ambient conditions. No blank was used prior to the measurements of the spin coated film. The UV-vis spectra were recorded in Agilent 8453 spectrophotometer.

Example 5

This example illustrates AFM measurements the film of Example 3 or films prepared according to Example 3.

The analyses were carried out using a piezo scanner capable of scanning an area of ~10×10 mm$^2$ at room temperature. The scanning rate was 0.8-1.0 lines/s. Commercially available tapping mode tips (TAP300, Silicon AFM Probes, Ted Pella, Inc.) were used on cantilevers with a resonance frequency in the range of 290-410 kHz. Prior to AFM scanning, all spin coated films were allowed to dry naturally at ambient conditions.

Example 6

This example illustrates ellipsometric measurements the film of Example 1 or films prepared according to Example 3.

The refractive index of the spin coated film was determined by ellipsometry using the Multiskop ellipsometer (Optrel GmbH, Germany) equipped with a 632.8 nm laser beam. The measurement was all done at 60° angle of incidence at dry and ambient conditions. Several measurements were performed for each film at various areas. The measured values of delta and psi with thickness from AFM were used to calculate for the refractive index of the film using an integrated specialized software (Elli, Optrel) that was provided with the instrument.

Example 7

This example illustrates QCM measurements the film of Example 3 or films prepared according to Example 3.

The mass of the spin coated film was measured by QCM in an AT-cut polished QCM crystals (5 MHz) with 13 mm diameter. The QCM apparatus, probe, and crystals were made available from Maxtek Inc. The data acquisition was done with an R-QCM system equipped with a built-in phase lock oscillator and the R-QCM Data-Log software. Prior to use, the QCM crystals were cleaned immediately with an oxygen plasma etcher (Plasmod, March).

Results and Discussions

The concept of making an ATR film is accomplished by spin coating the carefully formulated hydrogel solution into the bare PET. The components of the hydrogel solution are always freshly prepared prior to mixing and spin coating under ambient conditions. Referring now to FIG. 14, Scheme 1A is shown, which details an ATR coated film of this invention including PAA, silica particles, and metal cation (e.g., $Al^{3+}$). Referring now to FIG. 15, Scheme 1B is shown, which details another ATR coated film of this invention including BP modified PAA (BP-PAA), silica particles, and metal cation (e.g., $Al^{3+}$).

Referring now to FIG. 16, the transmittance of the bare PET film (control) has improved after spin coating the hydrogel solution for 60 sec. The spin coated films has shown higher transmittance at the visible range demonstrating an anti-reflection property. Referring now to FIG. 17, Scheme 2 pictorially illustrates the photo induced cross-linking of a spin coated BP-PAA:$SiO_2$:Al film by UV irradiation to form a cross-linked BP-PAA:$SiO_2$:Al film on the PET substrate. The photo cross-linked film according to Scheme 2 via the photo reactive benzophenone has similar transmittance with the PAA:$SiO_2$:Al.

However, the photo cross-linked film is expected to be more robust and mechanically stable as a result of stronger cross-linking. Also, the photo cross-linking of the spin coated film has increased the porosity of the film, therefore enhancing the transmittance values. As evidence, the surface morphology of the film has changed after 3 hour of UV irradiation, and more void spaces were clearly seen in the AFM images as shown in FIGS. 18A&B and FIGS. 19A&B. The root-mean-square (rms) roughness values were calculated to be 4 nm and 10 nm for the BP-PAA:$SiO_2$:Al film before and after UV-irradiation, respectively.

The actual thickness of the spin coated films was determined by AFM using a line profile technique for several measurements. The PAA:$SiO_2$:Al and BP-PAA:$SiO_2$ films have a thickness of ~112 nm and ~114 nm, respectively. With the thickness from AFM, the refractive index of the films was easily known by ellipsometric measurements. The delta and psi values were simulated by integrated specialized software (Elli, Optrel) with a Fresnel equation model to calculate for their refractive indexes. The calculated refractive index of the films was lower than the refractive index of the bare PET (1.575). This result explains the anti-reflection property of the spin coated films.

TABLE 3

Summary of Thickness and Refractive Index Measurements of Film 1 and Film 2

| Film | Thickness Average* (nm) | Refractive index** |
|---|---|---|
| 1[a] | 111.514 ± 10.49 | 1.4368 |
| 2[b] | 113.524 ± 25.64 | 1.4764 |

[a]PAA:SiO$_2$:Al ratio 4:1:1, 8000 rpm, 60 sec 1 Layer
[b]BP-PAA:SiO$_2$:Al ratio 4:1:1, 2000 rpm, 60 sec 1 Layer, 3 hr-UV irradiation
*From AFM Line Profile
**From Ellipsometry

TABLE 4

Summary of QCM Mass Deposition and Calculation of Density of Film 1 and Film 2

| Film | Mass* (µg) | Thickness Average** (nm) | Density (g·cm$^{-3}$) |
|---|---|---|---|
| 1 | 17.4 | 111.514 ± 10.49 | 0.522 |
| 2 | 31.7 | 113.524 ± 25.64 | 0.934 |

[a]PAA:SiO$_2$:Al ratio 4:1:1, 8000 rpm, 60 sec 1 Layer
[b]BP-PAA:SiO$_2$:Al ratio 4:1:1, 2000 rpm, 60 sec 1 Layer
*From QCM Measurement
**From AFM Line Profile
Note:
Area of the spin coated film (on Si Wafer) = 1.3 cm × 2.3 cm = 2.99 cm$^2$ The total mass deposition of the spin coated film was determined by quartz crystal microbalance (QCM). The modification of the QCM crystal by spin coating will cause a corresponding change in the resonant frequency. The resulting change in frequency can then be used to calculate for the mass change due to the adsorbed material on the film using the Sauerbrey Equation (1)

$$\Delta F = \frac{-2 F_q^2 \Delta m}{A \sqrt{\rho_q \mu_q}} \quad (1)$$

where $\Delta F$ is the change in frequency, $\Delta m$ is the mass change, $F_q$ (=5 MHz) is the resonant frequency of the QCM crystal, A (=1.227 cm$^2$) is the area of the electrode, $\rho_q$ (=2.65 g/cm$^3$) is the density of the quartz, and $\mu_q$ is the shear modulus of the quartz. The PAA:SiO$_2$:Al and BP-PAA:SiO$_2$ films resulted a mass of 17.4 and 31.7 µg, respectively. Using the mass from QCM and thickness from ellipsometer, the density of the films was calculated as shown in Table 4. The BP-PAA:SiO$_2$ has shown a more dense film than the PAA:SiO$_2$:Al.

The use of water dispersable nanoparticles was also exploited in making hydrogel for ATR coating. The particle used was polystyrene (PS), which is easily removed from the spin coated film by simple washing with an organic solvent (e.g., THF or toluene). Removal of the PS particles would result to the formation of more void spaces within the spin coated film depicted in Scheme 3 as shown in FIG. 20, thus further lowering of the refractive index of the film. It should be recognized that other particles or dissolution or destruction methods for these template particles are possible to remove them after film formation. FIG. 21 shows the UV measurements of the spin coated film with PS particles compared to the earlier films. The films with PS particles have dramatically improved the transmittance at 350 to 600 nm range. This result is accounted for the formation of a more porous film. The PAA:SiO$_2$:Al:PS with volume ratio of 4:1:1:3 has shown the highest transmittance followed by the BP-PAA:SiO$_2$:Al:PS.

FIG. 20 depicts Scheme 3 pictorially detailing an ATR film fabrication using the previous hydrogel formulation plus PS particles (100 nm size) and formation of a more porous spin.
Conclusion The spin coated film of PAA/BP-PAA, silica particle, and alumina has shown an anti-reflection property as a result of the formation of a more porous film with refractive index lower than the bare PET. Furthermore, the incorporation of PS particles has improved its anti-reflection due to more void spaces created during the removal of the particles from the spin coated polymer film.
Supporting Information Additional data for these above examples are shown in FIGS. 22A&B, FIGS. 23A&B, FIG. 24, and FIG. 25.

Section III

The spin coated film shows an anti-reflection property and has higher transmittance as compared to the bare PET (control). In both sizes (100 and 500 nm), washing the PS particle from the film improves the transmittance as shown in FIGS. 26A&B. This proves our hypothesis that removing the nanoparticles from the matrix creates void spaces or pores within the film resulting to the lowering of the effective refractive index of the film, and thus higher transmission of light or good anti-reflection property. Moreover, increasing the washing time to 24 hrs enhances the transmittance of the film and shows the best anti-reflection property. It should be recognized that other particles or dissolution or destruction methods for these template particles are possible.

In both 100 nm and 500 nm PS particles, normal solvent dipping is a better method of washing than soxhlet extraction using the same solvent (toluene) as shown in FIG. 27. Moreover, the film with the bigger PS particle shows higher transmission of light than the smaller particle. For instance, the film with 500 nm particle size that was dipped in toluene for 24 hrs has the best anti reflection property.

Increasing the concentration of the PS particle in solution (from 3 to 6 by volume) decreases the transmittance between the range ~360 to ~530 cm$^{-1}$, and further increasing the concentration of PS particle to 12 significantly decreases the transmission of light through the film as shown in FIG. 28.

The film washed in toluene has lower transmittance than when washed in THF for different concentration of PS particle. Therefore, washing the film in THF improves the transmittance measurement of the AR film.

The film with 4:1:1:6 ratio (PAA:Si:Al:PS 500 nm) that is washed in THF for 24 hrs has the best anti-reflection property.

FIGS. 29A-C and FIGS. 30A-C show AFM images of a film made with 100 nm PS particles before washing, after dipping in toluene for 6 hours, and drying.

Section IV

Example 8

This example illustrates the sample preparation and measurement for reflection, where the sample is prepared in 2-butanone, a non-aqueous solvent system.
Coating Solution A base polymer, Lumiflon LF-200 (available from AGC Chemicals, Inc.), was mixed with a crosslinking agent, Desmodur N3300A (available from Bayer MaterialScience LLC), and a nanoparticle, MEK-ST-UP (available from Nissan Chemical Industries, Ltd.) in 2-Butanone (Sigma-Aldrich INC.) as the solvent. Two samples were prepared as set forth in Table 5.

TABLE 5

Sample Compositions

| Sample | Polymer (g) | Crosslinker (g) | Nanoparticle (g) | Solvent (g) | Solid Content (%) |
|---|---|---|---|---|---|
| 1 | 10.00 | 1.10 | 0.00 | 334.24 | 2.04 |
| 2 | 10.00 | 1.10 | 43.05 | 713.25 | 2.04 |

Coating & Drying

A 2 mil PET foil was coated with the samples solutions by hand drawing with a wire round rod #4. After 1 minute of drying at room temperature, the foil was baked with 90° C. for one minute. The other side of the PET foil was completely coated with black paint.

Measurement

The reflectance of the samples were measured by using UV-Vis spectrometer within an integrating sphere as shown in FIG. 31.

Example 9

This example illustrates the sample preparation and measurement for reflection, where the sample is prepared in 2-butanone, a non-aqueous solvent system.

Coating Solution

A base polymer, Lumiflon LF-200 (available from AGC Chemicals, Inc.), was mixed with a crosslinking agent, Desmodur N3300A (available from Bayer MaterialScience LLC), and a nanoparticle, MEK-ST-UP (available from Nissan Chemical Industries, Ltd.) in 2-Butanone (Sigma-Aldrich INC.) as the solvent. Two samples were prepared as set forth in Table 6.

TABLE 6

Sample Compositions

| Sample | Polymer (g) | Crosslinker (g) | Nanoparticle (g) | Solvent (g) | Solid Content (%) |
|---|---|---|---|---|---|
| 3 | 10.00 | 1.10 | 0.00 | 334.24 | 2.04 |
| 4 | 10.00 | 1.10 | 65.42 | 910.20 | 2.04 |

Coating & Drying

A 2 mil PET foil was coated with the samples solutions by hand drawing with a wire round rod #4. After 1 minute of drying at room temperature, the foil was baked with 90° C. for one minute. The other side of the PET foil was completely coated with black paint.

Measurement

The reflectance of the samples were measured by using UV-Vis spectrometer within an integrating sphere as shown in FIG. 32.

Example 10

This example illustrates the sample preparation and measurement for reflection, where the sample is prepared in 2-butanone, a non-aqueous solvent system.

Coating Solution

A base polymer, MW 350 poly(methyl methacrylate) (available from Sigma-Aldrich, Inc.), was mixed with a nanoparticle, MEK-ST-UP (available from Nissan Chemical Industries, Ltd.) in 2-Butanone (Sigma-Aldrich, Inc.) as the solvent. Two samples were prepared as set forth in Table 7.

TABLE 7

Sample Compositions

| Sample | Polymer (g) | Nanoparticle (g) | Solvent (g) | Solid Content (%) |
|---|---|---|---|---|
| 5 | 10.00 | 0.00 | 480.20 | 2.04 |
| 6 | 10.00 | 65.42 | 910.20 | 2.04 |

Coating & Drying

A 2 mil PET foil was coated with the samples solutions by hand drawing with a wire round rod #4. After 1 minute of drying at room temperature, the foil was baked with 90° C. for one minute. The other side of the PET foil was completely coated with black paint.

Measurement

The reflectance of the samples were measured by using UV-Vis spectrometer within an integrating sphere as shown in FIG. 33.

All references cited herein are incorporated by reference. Although the invention has been disclosed with reference to its embodiments, from reading this description those of skill in the art may appreciate changes and modification that may be made which do not depart from the scope and spirit of the invention as described above and claimed hereafter.

We claim:

1. A method for forming coatings or films comprising the steps of:
   contacting a composition including: one polymer or a plurality of polymers selected from the group consisting of polyacrylic acid, polymethacrylic acid, polyvinyl alcohol, copolymers of maleic acid and acrylic acid, copolymers of maleic anhydride and acrylic acid, copolymers of maleic acid and methacrylic acid, copolymers of maleic anhydride and methacrylic acid, copolymers of alphaolefins and acrylic acid, methacrylic acid, maleic acid and/or maleic anhydride, and mixtures or combinations thereof, and one particle or a plurality of particles, in a solvent or a mixture of solvents to form a particle entangled, non-crosslinked network, and
   removing the solvent or the mixture of solvents to form a three dimensional (3D) particle filled coating or film having a transmittance value of at least 86% or a reflectance value of at most 4% and having a refractive index lower than that of bare polyethylene terephthalate (PET).

2. The method of claim 1, wherein the polymers and particles in the coating or film are held in place via H-bonds, ionic interactions, dipole-dipole interactions, and/or electrostatic interactions.

3. The method of claim 1, wherein the contacting is performed under mixing conditions.

4. The method of claim 3, wherein the mixing comprises mechanical mixing, sonic mixing, vortex mixing or mixtures or combinations thereof.

5. The method of claim 1, wherein the solvent removing step comprises evaporating, vacuum evaporating, lyophilizing, freeze drying, or mixtures or combinations thereof.

6. The method of claim 1, wherein the composition further includes one ionic crosslinking agent or a plurality of ionic crosslinking agents and the method further comprising the step of:
   ionically crosslinking the film or coating, where the ionic crosslinking may occur before, during, and/or after the solvent removing step.

7. The method of claim 6, wherein the polymers carry negative charges and the crosslinking agents carry positive charges.

8. The method of claim 7, wherein at least one of the ionic crosslinking agents is a polyvalent metal cation or at least one of the crosslinking agents is capable of reacting with the negatively charged functional groups of the polymers to form the ionic crosslinks.

9. The method of claim 1, wherein the composition further includes one template or a plurality of templates and the method further comprising the step of:
removing the templates from the coating or film to increase a void volume of and/or spaces in the film or coating.

10. The method of claim 9, wherein the template agent removing step comprises solvent dissolution, vacuum removal and/or decomposition, thermal decomposition, or mixtures or combinations of these treatments.

11. The method of claim 1, further comprising the step of:
adding a component adapted to augment, change, enhance, or alter the properties of the network to provide the network with properties including electrostatic properties, catalytic properties, electro-optical properties, magneto-optical properties, electric properties, magnetic properties, optical properties, and/or other physical and/or chemical properties.

12. The method of claim 1, further comprising the step of:
covalently crosslinking the coating or film before, during and/or after solvent removal.

13. The method of claim 12, wherein the covalent crosslinking step comprises radiochemically crosslinking via irradiating the film with ionizing radiation, photochemically crosslinking, where at least one of the polymers includes photoactive moieties or the film includes photoactive crosslinking agents and crosslinking via irradiating the film with radiation sufficient to activate the photoactive moieties and/or photoactive crosslinking agents, thermally crosslinking via heating the film to a temperature sufficient to thermally crosslinking thermal crosslinkable moieties in the polymers or added thermal crosslinking agents, or combinations thereof.

14. The method of claim 1, wherein the particles are nanoparticles.

15. The method of claim 14, wherein the nanoparticles are silica particles having various sizes in the nanometer range.

16. The methods of claim 1, wherein the solvent or mixtures of solvents form aqueous or non-aqueous solvent systems.

17. The method of claim 1, further comprising the step of:
depositing or coating the film prior to solvent removal onto a substrate or onto a surface of a substrate.

18. The method of claim 17, wherein the depositing or coating step comprises spin coating.

19. The method of claim 17, wherein the depositing or coating step comprises spray coating.

20. The method of claim 1, further comprising the step of:
depositing or coating a single layer of the film onto one side of a substrate.

21. The method of claim 1, further comprising the step of:
depositing or coating multiple layers of the film onto one side of a substrate.

22. The method of claim 1, further comprising the step of:
depositing or coating a single layer of the film onto both sides of the substrate.

23. The method of claim 1, further comprising the step of:
depositing or coating a single layer of the film on one side of a substrate, and multiple layers of the film on the other side of the substrate.

24. The method of claim 1, further comprising the step of:
depositing or coating multiple layers of the film onto one side of the substrate, and multiple layers of the film onto the other side of the substrate.

25. The method of claim 1, wherein the composition further includes:
one oligomer or a plurality of oligomers,
one monomer or a plurality of monomers,
one initiator or a plurality of initiators; and
wherein the method further comprises the step of:
polymerizing the oligomers and/or monomers before, during, and/or after solvent removal.

26. A method for forming coatings or films comprising the steps of:
contacting a composition including:
one polymer or a plurality of polymers selected from the group consisting of polyacrylic acid, polymethacrylic acid, polyvinyl alcohol, copolymers of maleic acid and acrylic acid, copolymers of maleic anhydride and acrylic acid, copolymers of maleic acid and methacrylic acid, copolymers of maleic anhydride and methacrylic acid, copolymers of alphaolefins and acrylic acid, methacrylic acid, maleic acid and/or maleic anhydride, and mixtures or combinations thereof,
one particles or a plurality of particles,
one ionic crosslinking agent or a plurality of ionic crosslinking agents, and
a solvent or a mixture of solvents to form a particle entangled, non-crosslinked network;
removing the solvent or the mixture of solvents; and
before, during, and/or after solvent removal, ionically crosslinking the coating or film to form a three dimensional (3D) particle entangled, ionically crosslinked coating or film having a transmittance value of at least 86% or a reflectance value of at most 4% and having a refractive index lower than that of bare polyethylene terephthalate (PET).

27. The method of claim 26, further comprises the step of:
covalently crosslinking the particle entangled, ionically crosslinked coating or film to form a particle entangled, non-covalently and covalently crosslinked coating or film.

28. The method of claim 27, wherein the composition further includes:
one template or a plurality of templates; and
wherein the method further comprises the step of:
removing the templates from the coating or film to increase a void volume of and/or spaces in the film or coating.

29. The method of claim 26, wherein the composition further includes:
one oligomer or a plurality of oligomers,
one monomer or a plurality of monomers,
one initiator or a plurality of initiators; and
wherein the method further comprises the step of:
before, during, and/or after solvent removal, polymerizing the oligomers and/or monomers.

30. The method of claim 29, wherein the composition further includes:
one template or a plurality of templates; and
wherein the method further comprises the step of:
removing the templates from the coating or film to increase a void volume of and/or spaces in the film or coating.

31. The method of claim 26, wherein the composition further includes:
one template or a plurality of templates; and
wherein the method further comprises the step of:
removing the templates from the coating or film to increase a void volume of and/or spaces in the film or coating.

32. A method for forming coatings or films comprising the steps of:
contacting a composition including:
one polymer or a plurality of polymers selected from the group consisting of polyacrylic acid, polymethacrylic acid, polyvinyl alcohol, copolymers of maleic acid and acrylic acid, copolymers of maleic anhydride and acrylic acid, copolymers of maleic acid and methacrylic acid, copolymers of maleic anhydride and methacrylic acid, copolymers of alphaolefins and acrylic acid, methacrylic acid, maleic acid and/or maleic anhydride, and mixtures or combinations thereof, one particles and/or a plurality of particles, one ionic crosslinking agent or a plurality of ionic crosslinking agents, one covalent crosslinking agent or a plurality of covalent crosslinking agents, one oligomer or a plurality of oligomers, one monomer or a plurality of monomers, one initiator or a plurality of initiators, one template or a plurality of templates, and a solvent or a mixture of solvents; and removing the solvent or the mixture of solvents to form a three dimensional (3D) particle entangled coating or film;

crosslinking the film or coating, before, during, and/or after solvent removal, to form a 3D, crosslinked particle entangled coating or film, where the crosslinks comprise ionic crosslinks and covalent crosslinks;

polymerizing the oligomers and/or the monomers by initiating the initiators, before, during and/or after crosslinking; and removing the templates from the coating or film to increase a void volume of and/or spaces in the film or coating, where the film or coating has a transmittance value of at least 86% or a reflectance value of at most 4% and having a refractive index lower than the that of bare polyethylene terephthalate (PET).

\* \* \* \* \*